United States Patent
Lee et al.

(10) Patent No.: US 11,138,943 B2
(45) Date of Patent: Oct. 5, 2021

(54) ELECTRONIC COVER, ELECTRONIC DEVICE COMPRISING SAME, AND CONTROL METHOD THEREOF

(71) Applicant: Samsung Electronics Co., Ltd., Gyeonggi-do (KR)

(72) Inventors: Na-Kyoung Lee, Gyeonggi-do (KR); Harim Kim, Gyeonggi-do (KR); Min-Sung Lee, Gyeonggi-do (KR); Song Hee Jung, Gyeonggi-do (KR); Na-Young Kim, Gyeonggi-do (KR); Dong Hun Kim, Seoul (KR); Youngsang Jang, Gyeonggi-do (KR); Seongwon Cha, Gyeonggi-do (KR); Hyun Soo Kim, Gyeonggi-do (KR); Dong-Hyun Yeom, Gyeonggi-do (KR); Chang-Ryong Heo, Gyeonggi-do (KR)

(73) Assignee: Samsung Electronics Co., Ltd., Suwon-si ( * ) Notice: Subject to any disclaimer, the term of this patent is extended or adjusted under 35 U.S.C. 154(b) by 0 days.

(21) Appl. No.: 16/643,614

(22) PCT Filed: Aug. 31, 2018

(86) PCT No.: PCT/KR2018/010165
§ 371 (c)(1),
(2) Date: Mar. 2, 2020

(87) PCT Pub. No.: WO2019/045527
PCT Pub. Date: Mar. 7, 2019

(65) Prior Publication Data
US 2020/0211487 A1    Jul. 2, 2020

(30) Foreign Application Priority Data

Sep. 1, 2017  (KR) .......................... 10-2017-0111740

(51) Int. Cl.
*G09G 3/36* (2006.01)
*G02F 1/1335* (2006.01)
(Continued)

(52) U.S. Cl.
CPC ..... *G09G 3/3607* (2013.01); *G02F 1/133514* (2013.01); *G02F 1/133553* (2013.01);
(Continued)

(58) Field of Classification Search
CPC ......... G02F 1/133553; G02F 1/134309; G02F 1/133514; G02F 2201/122; G02F 1/1368;
(Continued)

(56) References Cited

U.S. PATENT DOCUMENTS 10,036,928 B2 *  7/2018  Lan .................. G02F 1/137
10,082,707 B2 *  9/2018  Tsao .................. G02F 1/1368
(Continued)

FOREIGN PATENT DOCUMENTS

JP      4485339 B2     6/2010
JP      2011-30158 A   2/2011
(Continued)

*Primary Examiner* — Vinh T Lam
(74) *Attorney, Agent, or Firm* — Cha & Reiter, LLC

(57) ABSTRACT

An electronic cover according to an embodiment of the disclosure may include a light-transmissive first electrode layer, a light-transmissive second electrode layer disposed below the first electrode layer, a liquid crystal layer disposed between the first electrode layer and the second electrode layer and including a liquid crystal reacting to an electrical field generated when power is supplied to the first electrode layer and the second electrode layer, a color layer disposed below the second electrode layer and including a light-transmissive color material, and a reflective layer disposed below the color layer and including a light-reflective material. Various other embodiments are also possible.

13 Claims, 38 Drawing Sheets

(51) Int. Cl.
  *G02F 1/1343* (2006.01)
  *G06F 1/16* (2006.01)
  *H04M 1/02* (2006.01)
  *G02F 1/1368* (2006.01)
(52) U.S. Cl.
  CPC ...... G02F 1/134309 (2013.01); G06F 1/1626 (2013.01); H04M 1/0283 (2013.01); *G02F 1/1368* (2013.01); *G02F 1/133567* (2021.01); *G02F 2201/121* (2013.01); *G02F 2201/122* (2013.01); *G02F 2201/123* (2013.01); *G09G 2354/00* (2013.01)
(58) Field of Classification Search
  CPC ....... G02F 1/1334; G02F 2001/133567; G02F 2201/123; G02F 2201/121; G09G 3/3607; G09G 2354/00; H04M 1/02; H04M 1/0283; G06F 1/1626
  See application file for complete search history.

(56) References Cited

U.S. PATENT DOCUMENTS

| | | | |
|---|---|---|---|
| 2008/0129699 A1* | 6/2008 | Cho | H04M 1/0243 345/168 |
| 2009/0109371 A1* | 4/2009 | Mitamura | H04M 1/0245 349/62 |
| 2009/0180051 A1* | 7/2009 | Lee | G02F 1/133308 349/58 |
| 2011/0117955 A1 | 5/2011 | Lee et al. | |
| 2013/0265525 A1 | 10/2013 | Dunn et al. | |
| 2014/0218856 A1 | 8/2014 | Raff et al. | |
| 2014/0310643 A1* | 10/2014 | Karmanenko | G06F 1/1647 715/784 |
| 2015/0362776 A1* | 12/2015 | Jikumaru | G02F 1/133553 349/12 |
| 2016/0369976 A1 | 12/2016 | Lee | |
| 2017/0038641 A1* | 2/2017 | Yamazaki | G02F 1/133308 |
| 2017/0269400 A1* | 9/2017 | Northrup | G02F 1/1334 |
| 2018/0286322 A1* | 10/2018 | Nade | G09G 3/3406 |

FOREIGN PATENT DOCUMENTS

| | | | | |
|---|---|---|---|---|
| JP | 2015-529069 A | | 10/2015 | |
| JP | 2018022036 | * | 2/2018 | ....... G02F 1/133553 |
| KR | 10-0594090 B1 | | 6/2006 | |
| KR | 10-2006-0078639 A | | 7/2006 | |
| KR | 10-2012-0083659 A | | 7/2012 | |
| KR | 10-2014-0096284 A | | 8/2014 | |
| KR | 10-2015-0138637 A | | 12/2015 | |
| KR | 10-1627207 B1 | | 6/2016 | |

* cited by examiner

ELECTRONIC COVER, ELECTRONIC DEVICE COMPRISING SAME, AND CONTROL METHOD THEREOF

CLAIM OF PRIORITY

This application is a National Phase Entry of PCT International Application No. PCT/KR2018/010165, which was filed on Aug. 31, 2018 and claims a priority to Korean Patent Application No. 10-2017-0111740, which was filed on Sep. 1, 2017, the contents of which are incorporated herein by reference.

TECHNICAL FIELD

Various embodiments of the disclosure relate to an electronic cover constituting an exterior of an electronic device, the electronic device including the electronic cover, and a control method thereof.

BACKGROUND ART

With the development of digital technologies, electronic devices are provided in various forms, such as a smart phone, a tablet Personal Computer (PC), a Personal Digital Assistant (PDA), or the like. The electronic device is also developed such that it is worn by a user to improve portability and user accessibility.

The electronic device may include a cover which constitutes an exterior. The electronic device may be provided in various modes identified by covers expressing different representations (e.g., color).

DISCLOSURE OF INVENTION

Technical Problem

A user may selectively purchase an electronic device having a cover according to preference. However, while using an electronic device of a corresponding model, the user can only experience a determined representation through the cover. In addition, a manufacturer may have a burden of providing electronic devices of various models identified by different covers.

Various embodiments of the disclosure may provide an electronic cover capable of various representations such as a color, density, depth, pattern, or the like, and an electronic device including the electronic cover.

Various embodiments of the disclosure may provide a method of controlling a representation through an electronic cover in an electronic device including the electronic cover according to user's preference.

Solution to Problem

An electronic cover according to an embodiment of the disclosure may include a light-transmissive first electrode layer, a light-transmissive second electrode layer disposed below the first electrode layer, a liquid crystal layer disposed between the first electrode layer and the second electrode layer and including a liquid crystal reacting to an electrical field generated when power is supplied to the first electrode layer and the second electrode layer, a color layer disposed below the second electrode layer and including a light-transmissive color material, and a reflective layer disposed below the color layer and including a light-reflective material.

According to various embodiments of the disclosure, an electronic device may include a housing including a first face facing a first direction, a second face facing a second direction opposite to the first direction, and a third face at least partially surrounding a space between the first face and the second face, a display disposed inside the housing and disposed along the first face and at least part of the third face, an electronic cover disposed inside the housing and disposed along at least part of the second face, and a power management module electrically coupled with the display and the electronic cover. The electronic cover may include a light-transmissive first electrode layer disposed between the first face and the second face, a light-transmissive second electrode layer disposed between the first face and the second electrode layer, a liquid crystal layer disposed between the first electrode layer and the second electrode layer, and including a liquid crystal reacting to an electrical field generated when the power management module supplies power to the first electrode layer and the second electrode layer, a color layer disposed between the first face and the second electronic layer, and including a light-transmissive color material, and a reflective layer disposed between the first face and the color layer, and including a light-reflective material.

According to various embodiments of the disclosure, a method of operating an electronic device including an electronic cover having a plurality of areas may include selecting a representation mode, based at least in part on a user input, an executed application, or a set trigger, and adjusting a light transmittance for at least one area among the plurality of areas depending on the selected representation mode.

Advantageous Effects of Invention

An electronic device according to an embodiment of the disclosure can allow a user to experience various representations through an electronic cover, thereby improving satisfaction and usability of the electronic device. In addition, since the electronic device according to the embodiment of the disclosure can provide a representation depending on user's preference through the electronic cover, a manufacturing cost thereof can be reduced, compared to the conventional case of providing various models identified by covers.

BEST MODE FOR CARRYING OUT THE INVENTION

Figure 1A:
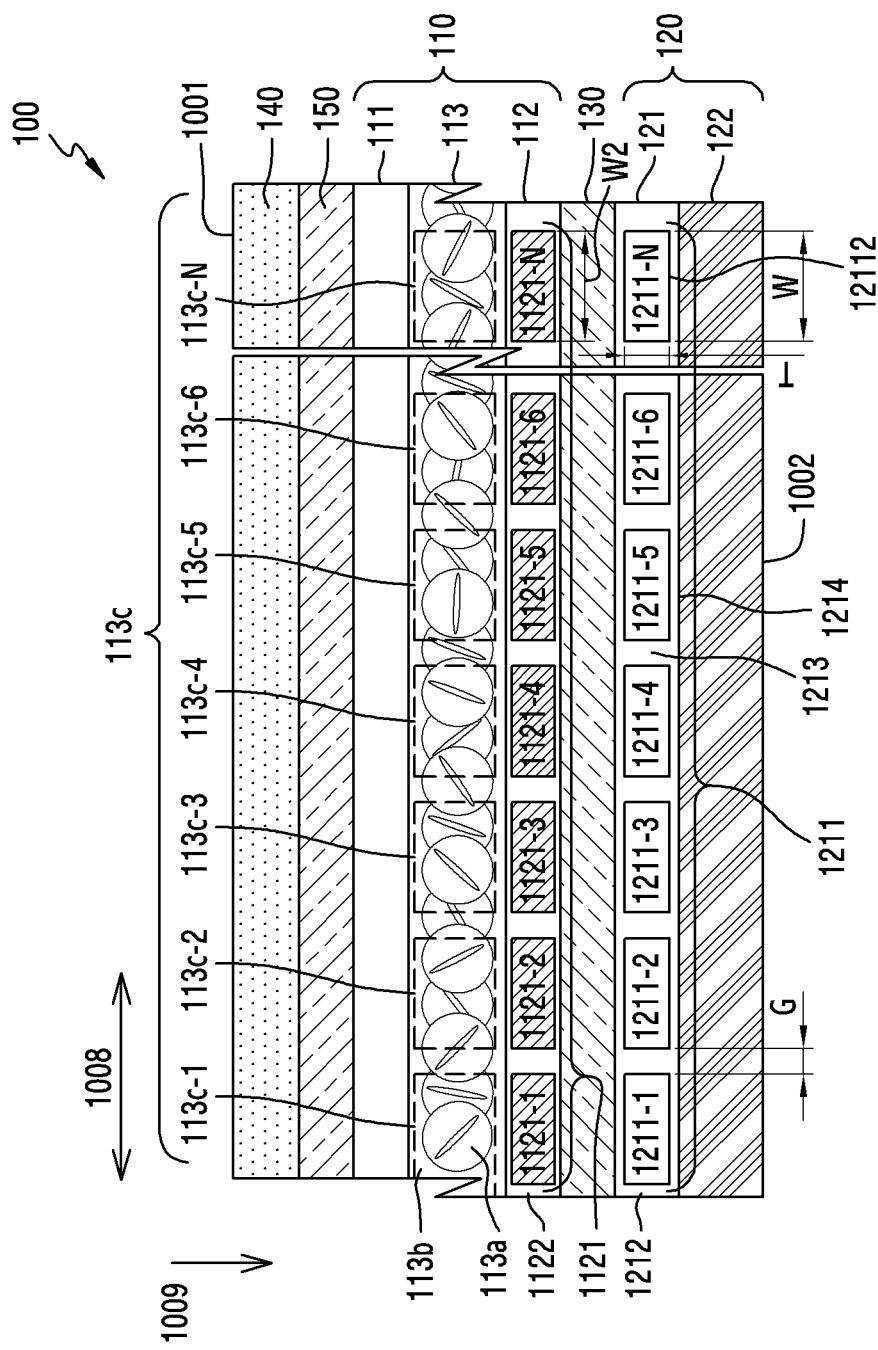
FIG. 1A illustrates a cross-sectional view of an electronic cover included in an electronic device according to an embodiment.

This disclosure may have various embodiments, and modifications and changes may be made therein. Therefore, the disclosure will be described in detail with reference to particular embodiments shown in the accompanying drawings. However, it should be understood that there is no intent to limit various embodiments of the disclosure to the particular embodiments disclosed herein, but the disclosure should be construed to cover all modifications, equivalents, and/or alternatives falling within the spirit and scope of the various embodiments of the disclosure. In describing the drawings, similar reference numerals are used to designate similar elements. As used herein, singular forms may include plural forms as well unless the context clearly indicates otherwise. In the disclosure, the expression "A or B", "at least one of A or/and B", or "one or more of A or/and B" may include all possible combinations of the items listed. The expression "a first", "a second", "the first", or "the second" used in various embodiments of the disclosure may modify various components regardless of the order and/or the importance but does not limit the corresponding components. It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them.

The expression "configured to" used in the disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of a television, a DVD (e.g., Samsung HomeSync™, Apple TV™), digital video disc player, audio, refrigerator, air conditioner, vacuum cleaner, oven, microwave oven, washing machine, air purifier, set top box, home automation control panel, TM, or Google TV™), a game console (e.g., Xbox™, PlayStation™), an electronic dictionary, an electronic key, a camcorder, or an electronic frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the disclosure may be a combination of one or more of the aforementioned various devices. The electronic device according to some embodiments of the disclosure may be a flexible device. Further, the electronic device according to an embodiment of the disclosure is not limited to the aforementioned devices, and may include a new electronic device according to the development of technology. Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

According to an embodiment, the electronic device may include an electronic cover (or a digital cover) which constitutes at least part of an exterior. When external light is reflected on the electronic cover and enters a user's eye, a representation depending on the electronic cover may be visible to the user. According to an embodiment, the electronic cover may include a bottom layer having at least one color, and the external light may be reflected from the bottom layer and emitted to the outside. According to an embodiment, the bottom layer may include a plurality of areas, and may have a color for each area.

According to an embodiment, the electronic cover may include a top layer for adjusting an amount of reflected light transmitted to the outside. According to an embodiment, when the electronic device electrically controls the electronic cover, a light transmittance may be selectively adjusted for a plurality of areas of the top layer. By individually adjusting the light transmittance for the areas of the top layer, various representations (e.g., color, density, depth, pattern, etc.) of the electronic cover may be visible to a user.

Figure 1B:
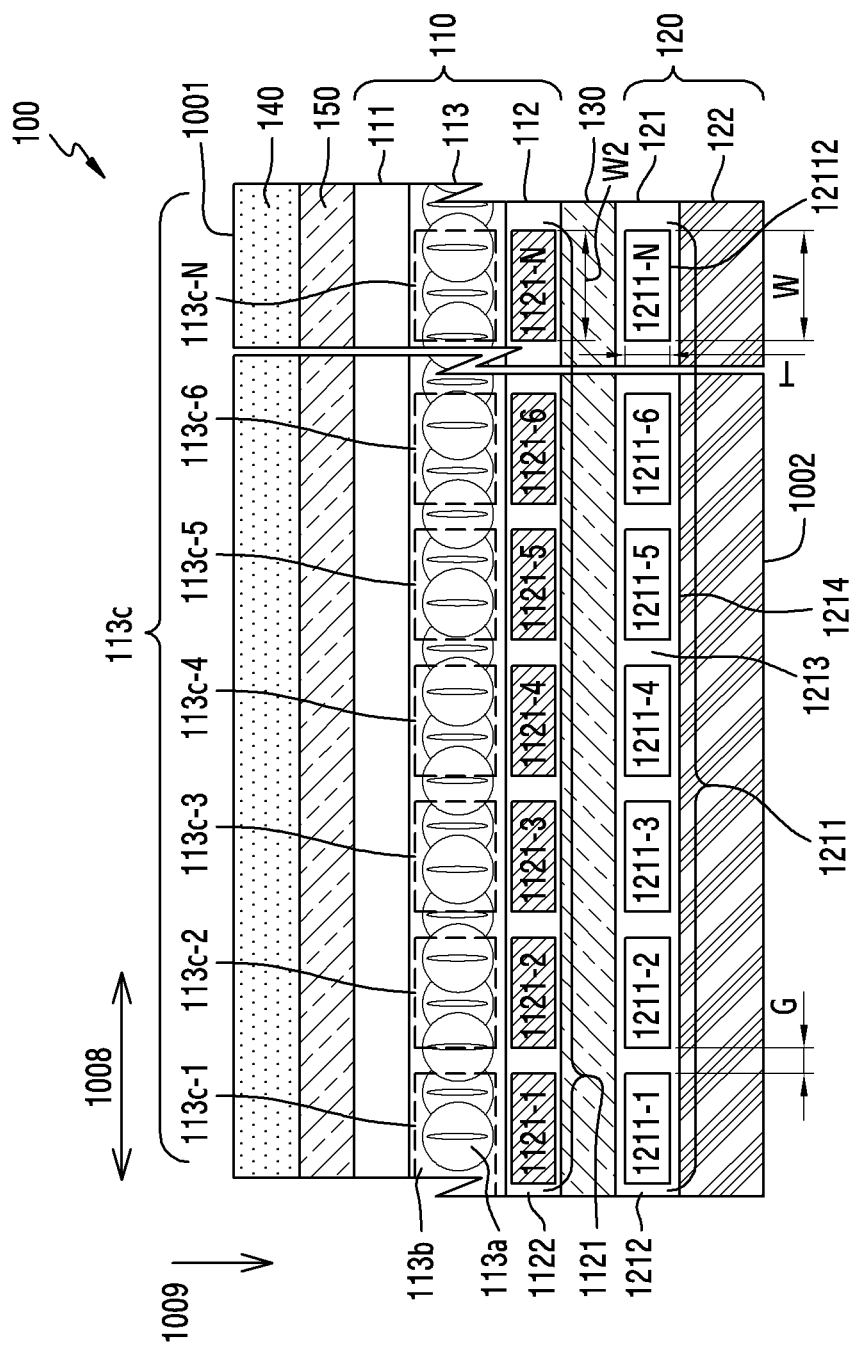
FIG. 1B illustrates a cross-sectional view of an electronic cover included in an electronic device according to an embodiment.
Figure 1C:
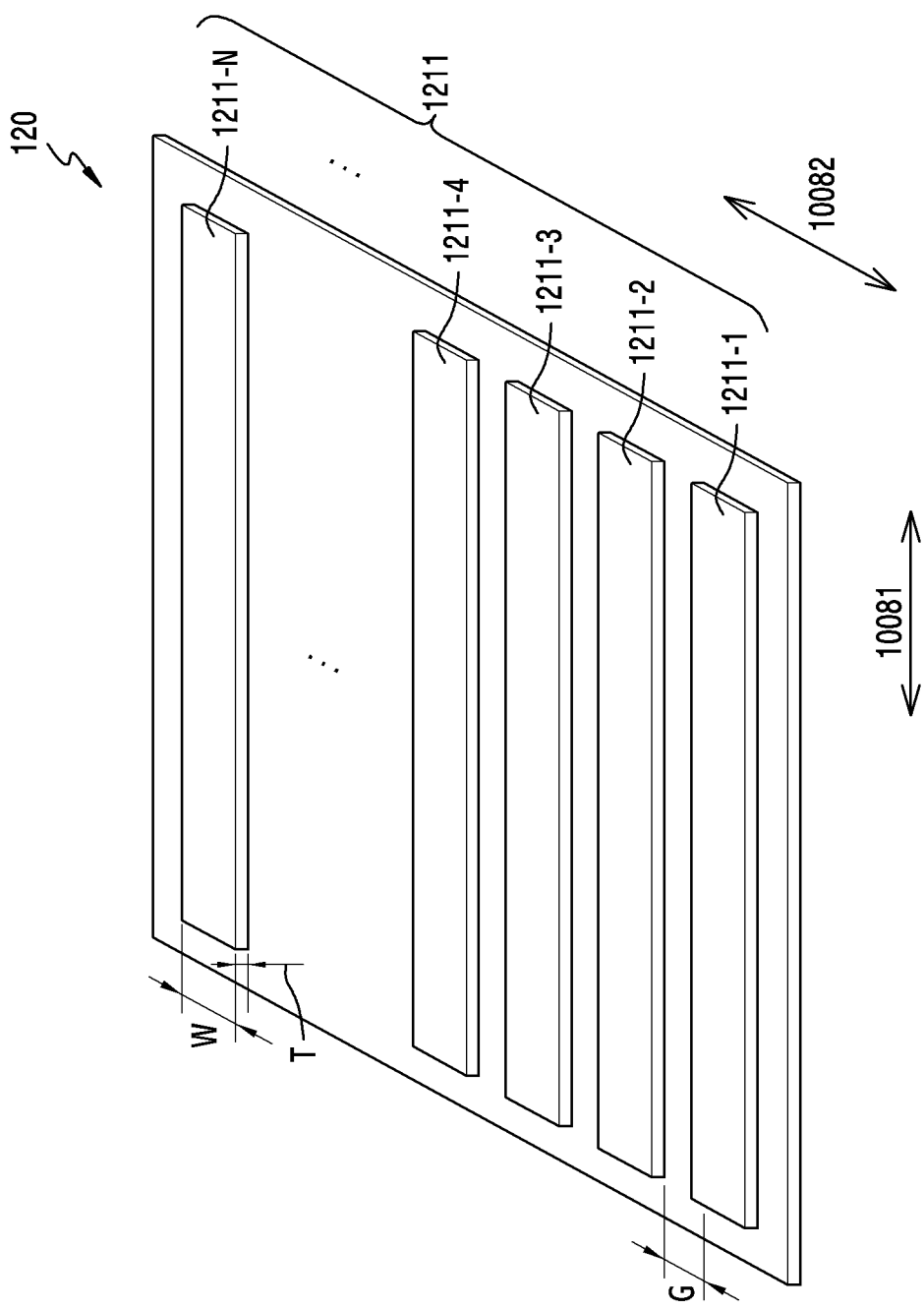
FIG. 1C illustrates some layers of an electronic cover according to various embodiments.

FIGS. 1A and 1B illustrate a cross-sectional view of an electronic cover included in an electronic device according to an embodiment. FIG. 1C illustrates some layers of an electronic cover according to an embodiment.

Referring to FIGS. 1A and 1B, an electronic cover 100 may have a shape of a plate including both-side faces (e.g., a first face 1001 and a second face 1002). According to an embodiment, the first face 1001 and the second face 1002 may be parallel in practice, and the electronic cover 100 may have a substantially constant thickness. According to an embodiment, although not shown, the electronic cover 100 may be designed such that at least a portion thereof has a thickness different from the other portions. Although not shown, according to an exterior design of the electronic device, the electronic cover 100 may be constructed in various shapes such as a curved shape or the like.

According to an embodiment, when the electronic cover 100 is coupled to the electronic device, the first face 1001 may constitute an outer face of the electronic device, and the second face 1002 may be disposed inside the electronic device. The electronic cover 100 may include a plurality of layers disposed between the first face 1001 and the second face 1002. Hereinafter, in FIGS. 1A and 1B, for example, when an element A, an element B, and an element C are disposed in a direction (hereinafter, an inner direction) 1009 facing the second face 1002 from the first face 1001 in an orderly manner, it may be defined that 'the element A is disposed above the element B, and the element C is disposed below the element B'.

According to an embodiment, the electronic cover 100 may include a first layer 110 designed to adjust a light transmittance by an electrical control. The first layer 110 may adjust an amount of external light which inputs to the electronic cover 100 or an amount of light which is reflected from the electronic cover 100 and emitted to the outside.

According to an embodiment, the first layer 110 may include a first electrode layer 111, a second electrode layer 112, and a liquid crystal layer 113. The first electrode layer 111 may be disposed above the second electrode layer 112, and the liquid crystal layer 113 may be disposed between the first electrode layer 111 and the second electrode layer 112. The first electrode layer 111 or the second electrode layer 112 may include a light-transmissive (e.g., a light transmittance greater than or equal to about 30%) metal material. According to an embodiment, the first electrode layer 111 or the second electrode layer 112 may be an Indium Tin Oxide (ITO), Antimony Tin Oxide (ATO), or the like. The liquid crystal layer 113 may include a liquid crystal 113a of which a light transmittance is adjusted by an electrical control. The liquid crystal 113a may include various materials having dielectric anisotropy and refractive anisotropy. According to an embodiment, the liquid crystal layer 113 may be a Liquid Crystal Polymer (LCP) in which the liquid crystal 113a is arranged on a polymer 113b. According to an embodiment, the first electrode layer 111 or the second electrode layer 112 may be bonded to the liquid crystal layer 113 in various manners such as deposition or the like.

Although not shown, the first layer 110 may be electrically coupled to a circuit (hereinafter, a cover control circuit) for electrically controlling the electronic cover 100. The cover control circuit may be electrically coupled to the first and second electrode layers 111 and 112, and may adjust power (e.g., voltage or current) supplied to the first and second electrode layers 111 and 112. For example, FIG. 1A illustrates a state in which voltage is not applied to the first and second electrode layers 111 and 112. When the voltage is not applied to the first and second electrode layers 111 and 112, the liquid crystal 113a may be in a state of being freely arranged while being fixed at that position. FIG. 1B illustrates a state in which voltage is applied to the first and second electrode layers 111 and 112. When the voltage is applied to the first and second electrode layers 111 and 112, an electrical field may be generated. Due to the electrical field caused by the first and second electrode layers 111 and 112, molecules (dielectrics) of the liquid crystal 113a may be regularly aligned and arranged according to a direction of the electrical field (e.g., dielectric polarization). Due to the dielectric polarization of the liquid crystal 113a, a light transmittance of the liquid crystal layer 113 may be increased, compared to the state of FIG. 1A. For example, the liquid crystal layer of FIG. 1A may be defined as being in a substantially opaque state. The light transmittance of the liquid crystal layer 113 may be changed according to intensity of voltage supplied to the first and second electrode layers 111 and 112 (or strength of the electrical field generated between the first and second electrode layers 111 and 112). According to an embodiment, the first layer 110 may include a Polymer-Dispersed Liquid Crystal (PDLC).

According to an embodiment, although not shown, the first layer 110 may be replaced with a structure including suspended particles based on a suspended particle orientation principle. According to an embodiment, although not shown, the first layer 110 may be replaced with a structure including an electrochromic element based on a charge transfer principle. In addition, the first layer 110 may be designed in various structures capable of adjusting a light transmittance by an electrical control.

According to an embodiment, at least part of the cover control circuit may be included in the electronic cover 100. According to an embodiment, at least part of the cover control circuit may be included in the electronic device to which the electronic cover 100 is coupled.

The electronic cover 100 may include a second layer 120 disposed below the first layer 110. According to an embodiment, the second layer 120 may include a color layer 121. The color layer 121 may include a light-transmissive material including a color (e.g., red, green, blue, etc.). According to an embodiment, the second layer 120 may include a reflective layer (or a reflective film) 122 disposed below the color layer (or color filter) 121. External light may be reflected on the reflective layer 122, and the reflected light may be emitted to the outside via the color layer 121 and the first layer 110. According to an embodiment, when a light transmittance of at least part of the first layer 110 is adjusted, a representation such as a color, density, depth, pattern, or the like may be visible to a user through the electronic cover 100.

According to an embodiment, the color layer 121 may include a plurality of areas. According to an embodiment, the plurality of areas may be arranged in a striped structure. Each area may include a color filter. For example, the color layer 121 may include a plurality of color filters 1211 arranged in a width direction 1008 of the electronic cover 100. FIG. 1C illustrates the second layer 120 according to an embodiment. Referring to FIG. 1C, the width direction 1008 of FIG. 1A may include a first width 10081 and a second width direction 10082 which are orthogonal to each other. According to an embodiment, although not shown, the electronic device to which the electronic cover 100 is coupled may be rectangular. When the electronic cover 100 is coupled to the electronic device, the first width direction 10081 may be a horizontal direction of the electronic device, and the second width direction 10082 may be a vertical direction of the electronic device. According to another embodiment, when the electronic cover 100 is coupled to the electronic device, the first width direction 10081 may be the vertical direction of the electronic device, and the second width direction 10082 may be the horizontal direction of the electronic device. Referring to FIGS. 1A, 1B, and 1C, the color layer 121 may include a plurality of color filters 1121 arranged in the second width direction 10082. A color filter 1211-N may have a shape of a line extended to be long in the first width direction 10081. As shown in FIG. 1C, a structure in which the color filters 1211 are designed may be defined as a striped structure. In an embodiment, referring to FIGS. 1A and 1B, in a cross-sectional view, the color filter 1211-N may be substantially rectangular. Referring to FIGS. 1A, 1B, and 1C, a width W or thickness T of the color filter 1211-N may be designed in various manners. For example, the thickness T or width W of the color filters 1211 may be substantially constant. The color, shape (e.g., thickness T, width W, etc.), material, or the like of the color filter 1211-N may correlate with a light transmittance, which may vary depending on a design thereof. For example, the color filters 1211-N may be designed to have substantially the same light transmittance. For another example, color filters of a first color may be designed to have a thickness different from that of color filters of a second color.

Referring to FIGS. 1A, 1B, and 1C, a gap G between the color filters 122 may be designed variously. According to an embodiment, the gap G between the color filters 122 may be constant. According to another embodiment, although not shown, it may be designed such that the gap G between the color filters 122 is 0 or close to 0.

Figure 2:
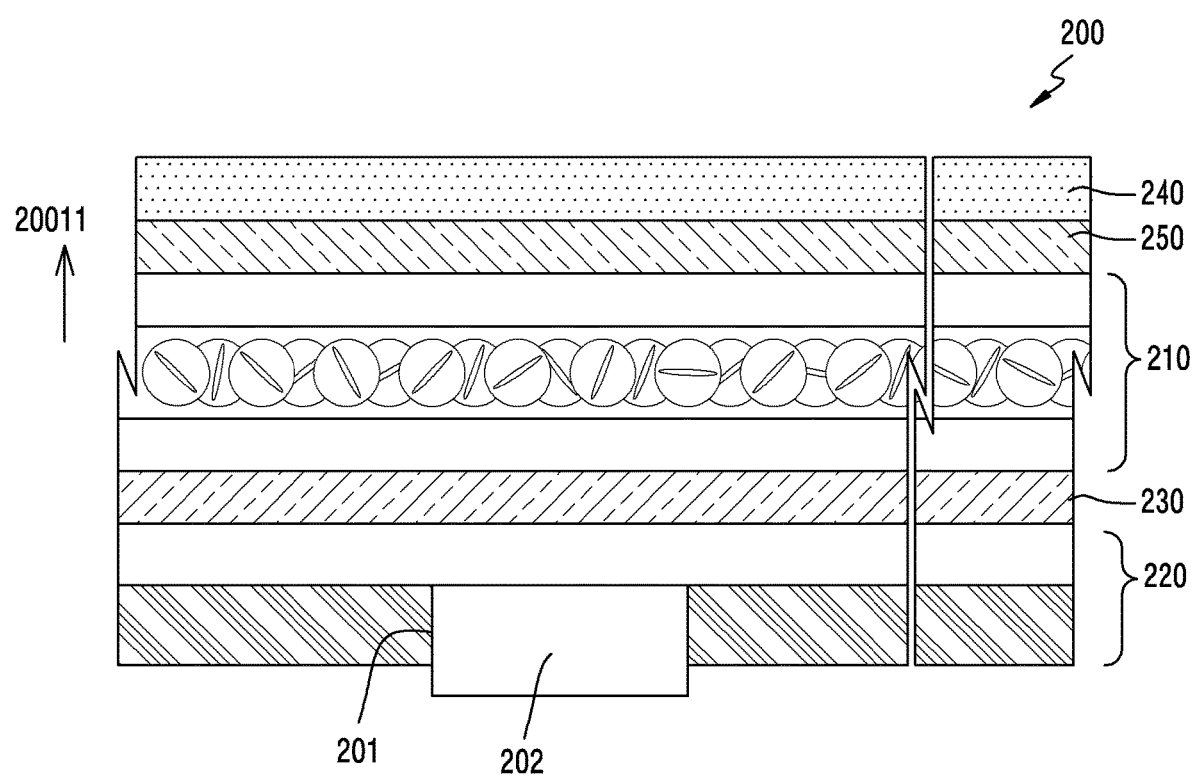
FIG. 2 is a cross-sectional view of an electronic cover included in an electronic device according to various embodiments.

Referring to FIGS. 1A, 1B, and 2, the color filter 1211-N may include a light-transmissive material including a red color, a green color, a blue color, or the like. According to an embodiment, the color filters 1211 may be designed in a structure in which a series of sets including at least two color filters of different colors are repeatedly arranged. For example, the color filters 1211 may have a structure in which a series of sets including a red color filter, a green color filter, and a blue color filter are repeatedly arranged. For another example, the color filters 1211 may have a structure in which a series of sets including a red color filter and a blue color filter are repeatedly arranged. According to an embodiment, the color filter 1211-N may also be designed to have various other colors without being limited to red, green, or blue.

According to an embodiment, the color filters 1211 may be designed to have identical or different types of colors (or color codes). According to an embodiment, when the color filters 1211 are constructed with the identical or different types of colors, it may be designed such that the gap G between the color filters 1211 is 0 or close to 0. According to an embodiment, when the color filters 1211 are constructed with the same color (e.g., blue), it may be designed as one single filter layer disposed along the first layer 110 instead of the color filters 1211.

According to an embodiment, the color layer 121 may include a material 1212 disposed between the first layer 110 and the reflective layer 122. The material 1212 may maintain an arrangement of the color filters 1211. The material 1212 may include portions 1213 disposed between the color filters 1211. According to an embodiment, the portions 1213 may be constructed of a light blocking material (e.g., a material having a black color).

Referring to FIGS. 1A and 1B, the first electrode layer 111 may be designed as a common electrode. According to an embodiment, the second electrode layer 112 may include a plurality of areas. According to an embodiment, the plurality of areas may be arranged in a striped structure. Each area may include an electrode. According to an embodiment, the second electrode layer 112 may include second electrodes 1121 substantially aligned with the color filters 1211. The second electrodes 1211 may be designed in a striped structure arranged in the second width direction 10082, for example, similarly to the color filters 1211 of FIG. 1C. When viewed in an inner direction 1009, the second electrode 1121-N may have a width W2 covering the color filter 1211-N. The second electrodes 1121 are briefly illustrated in FIGS. 1A and 1B, and the second electrodes 1211 may be designed in various manners.

According to an embodiment, although not shown, it may be designed such that two or more color filters are covered by one second electrode 1121-N.

According to an embodiment, although not shown, the first electrode layer 111 may be designed to include a plurality of electrodes aligned with the second electrodes 1121.

According to an embodiment, the second electrode layer 112 may include a material 1122 disposed between the liquid crystal layer 113 and a third layer 130. The material 1122 may maintain an arrangement of the second electrodes 1121. According to an embodiment, the material 1122 may include a set light-transmissive (e.g., a light transmittance greater than or equal to about 50%) non-metal material.

According to an embodiment, the liquid crystal 113a may be designed to include portions (hereinafter, sub liquid crystals) 113c aligned with the second electrodes 1121 or the color filters 1211. According to an embodiment, the sub liquid crystals 113c may be arranged in a striped structure. It may be designed such that the sub liquid crystals 113c are separated from each other, and the polymer 113b is disposed between the sub liquid crystals 113c. According to an embodiment, one of the second electrodes 1121 may be selected, and power may be supplied to the first electrode layer 111 and the selected second electrode 1121-N. When the power is supplied to the first electrode layer 111 and the selected second electrode 1121-N, an electrical field may be generated between the first electrode layer 111 and the selected second electrode 1121-N. The electrical field may cause a reaction of a sub liquid crystal 113c-N aligned with the selected second electrode 1121-N. Due to the reaction of the sub liquid crystal 113c-N, light reflected from the reflective layer 122 may pass through the color filter 1211-N aligned with the sub liquid crystal 113c-N. The light passing through the color filter 1211-N may be emitted to the outside through the sub liquid crystal 113c-N. According to an embodiment, when power supplied to the first electrode layer 111 and any one of the second electrodes 1121-N is adjusted, a light transmittance of the sub liquid crystal 113c-N may be adjusted. When the light transmittance of the sub liquid crystal 113c-N is adjusted, color density of light reflected from the electronic cover 100 and emitted to the outside may be adjusted.

According to an embodiment, when it is designed such that the gap G between the color filters 1211 is 0 or close to 0, a gap (not shown) between the sub liquid crystals 113c may be 0 or close to 0. According to an embodiment, when it is designed such that the gap G between the color filters 1211 is 0 or close to 0, it may be designed such that the liquid crystal 113a is disposed across the entire area as shown in FIGS. 1A and 1B.

According to an embodiment, a cover control circuit may drive the electronic cover 100 in such a manner that voltage is supplied sequentially to the first electrode layer 111 and the second electrodes 1121. For example, during a set time (e.g., a time not recognizable by user's eyes) or periodically, the cover control circuit may sequentially control voltage for the first electrode layer 111 and second electrodes 1121. For example, when the voltage for the first electrode layer 111 and second electrodes 1121 are sequentially turned on or off, a representation of color, density, depth, pattern, or the like may be visible to a user through the electronic cover 100.

According to another embodiment, the cover control circuit may include switches (e.g., transistors) electrically coupled to the first layer 110. According to an embodiment, the cover control circuit may include a switch individually coupled to the second electrode 1121-N. The cover control circuit may individually control the switches. When the switches are individually controlled by the cover control circuit, the sub liquid crystal 113c-N disposed between the first electrode layer 111 and the second electrodes 1121 may also react individually. According to an embodiment, the switch designed with a transistor may include a source electrode, a drain electrode, a gate electrode, and a semiconductor layer. The source electrode may be an electrode which supplies electrons. The drain electrode may be an electrode to which electrons are supplied. The source electrode or the drain electrode may be electrically coupled to the second electrode 1121-N. The gate electrode may be an electrode for switching electron movement from the source electrode to the drain electrode. When applying voltage greater than or equal to a specific level, the semiconductor layer may be a path along which electrons move. The semiconductor layer may be defined as an 'active layer' or an 'active area' as an element for switching a switch to an on-state. If a signal (e.g., voltage) greater than or equal to a threshold is applied to the gate electrode, the semiconductor layer (e.g., silicon) may be capable of moving electrons like a conductor, and the electrons may move from the source electrode to the drain electrode through the semiconductor layer. Due to the movement of the electrons, voltage may be applied to the first electrode layer 111 and the second electrode layer 1121-N.

According to an embodiment, the switch may be designed with a Thin Film Transistor (TFT). According to an embodiment, the TFT may be designed to be included in the first layer 110 or the second layer 120. For example, although not shown, the TFT may be designed to be included in the second electrode layer 112. For another example, although not shown, the TFT may be designed to be disposed between the first layer 110 and the second layer 120. For another example, although not shown, the TFT may be designed with a layer disposed below the reflective layer 122. In addition, the TFT may be designed in the electronic cover 100 in various structures.

According to an embodiment, the reflective layer 122 may be designed to cover a face 1214 of the color layer 121 facing the inner direction 1009. The reflective layer 122 may include a material having a set reflectance (e.g., a reflectance greater than or equal to about 50%). According to an embodiment, although not shown, the reflective layer 122 may be designed to include a substrate and a reflective material bonded to the substrate. For example, the reflective layer 122 may be constructed in such a manner that the reflective material is coated on the substrate. For example, the reflective layer 122 may be constructed in such a manner that the reflective material is bonded to the substrate.

According to an embodiment, although not shown, the electronic cover 100 may be designed with a material which covers the face 12112 of the color filters 1211 facing the inner direction 1009 instead of the reflective layer 112.

According to an embodiment, the color filters 1211 may be designed to include a light-transmissive color material having a set light reflectance (e.g., a light reflectance greater than or equal to about 30%). In this case, the reflective layer 122 may be omitted, or may be defined such that a layer for blocking light is disposed instead of the reflective layer 122.

According to an embodiment, although not shown, the second layer 120 may be designed to include reflective films having colors instead of the color filters 1211 and the reflective layer 122. In an embodiment, the reflective films may be designed in a striped structure aligned with the second electrodes 1121.

According to an embodiment, the reflective layer 122 may constitute the second face 1002 of the electronic cover 100. According to an embodiment, although not shown, if an additional layer (e.g., a rigid plate) disposed below the reflective layer 122 is defined, the second face 1002 of the electronic cover 100 may be formed by the additional layer.

According to an embodiment, the electronic cover 100 may include the third layer 130 disposed between the first layer 110 and the second layer 120. The third layer 130 may include various materials boned to the first layer 110 and the second layer 120. The third layer 130 may include a material having a set light transmittance (e.g., a light transmittance greater than or equal to about 30%). According to an embodiment, the third layer 130 may include Optical Clear Adhesive (OCA), Optical Clear Resin (OCR), or the like.

According to an embodiment, the electronic cover 100 may include a fourth layer 140 disposed above the first layer 110. The fourth layer 140 may constitute the first face 1001 of the electronic cover 100. The fourth layer 140 may include a material having a set light transmittance (e.g., a light transmittance greater than or equal to about 30%).

According to an embodiment, when the electronic cover 100 is coupled to the electronic device, the fourth layer 140 may constitute at least part of an outer face of the electronic device. According to an embodiment, the fourth layer 140 may be a plate (e.g., a light-transmissive glass or plastic plate) which constitutes the outer face of the electronic device.

According to an embodiment, the electronic cover 100 may include a fifth layer 150 disposed between the first layer 110 and the fourth layer 140. The fifth layer 150 may include various materials for bonding the first layer 110 and the fourth layer 140. The fifth layer 150 may include a material having a set light transmittance (e.g., a light transmittance greater than or equal to about 50%). According to an embodiment, the fifth layer 150 may include OCA, OCR, or the like.

According to an embodiment, the first layer 110, second layer 120, and third layer 130 of the electronic cover 100 may be designed to have flexibility. For example, the fourth layer 140 may be used as an element which constitutes an exterior of the electronic device, and may be designed in various shapes such as a curved shape or the like. The first layer 110, the second layer 120, and the third layer 130 may be bonded to the fourth layer 140 in a shape conforming to the fourth layer 140.

According to an embodiment, the electronic cover 100 may be defined by the first layer 110, the second layer 120, and the third layer 130, except for the fourth layer 140 and the fifth layer 150. According to an embodiment, when the fourth layer 140 is used as an element which constitutes the exterior of the electronic device, the electronic cover 100 defined by the first layer 110, the second layer 120, and the third layer 130 may be designed to be disposed along the entirety or part of the fourth layer 140. According to an embodiment, if the first layer 110 and the second layer 130 are designed to be bonded without the third layer 130, the electronic cover 100 may be defined by the first layer 110 and the second layer 120.

According to an embodiment, the electronic cover 100 may be designed to further include various other layers (not shown). For example, although not shown, the electronic cover 100 may be designed to further include various optical layers such as a polarizing layer, a birefringence compensation layer, an antiglare layer, a brightness enhancement layer, a visual compensation layer, or the like.

According to an embodiment, although not shown, the electronic cover 100 may include a layer including a first conductive pattern. According to an embodiment, the first conductive pattern may be used as an antenna. For example, when the electronic cover 100 is coupled to the electronic device, the first conductive pattern may be electrically coupled to a wireless communication circuit (or a communication module) of the electronic device. For example, the wireless communication circuit may activate at least part of the first conductive pattern on the basis of a signal from a control circuit (e.g., a processor). For example, the wireless communication circuit may transmit the signal from the control circuit to the outside wirelessly by using the first conductive pattern. For example, the wireless communication circuit may receive a wireless signal from the outside by using the first conductive pattern, and may provide this to the control circuit. According to an embodiment, a layer including the first conductive pattern may be disposed below the second layer 120. According to an embodiment, the layer including the first conductive pattern may be disposed above the second face 1002. For example, the first conductive pattern may include an electrode pattern of a mesh structure. The electrode pattern of the mesh structure may be defined as a 'metal mesh pattern'. The metal mesh pattern may include openings. Light reflected from the reflective layer 122 may be emitted to the outside through the openings of the metal mesh pattern. According to an embodiment, a mesh shape of the metal mesh pattern may be various. The mesh shape may be, for example, a square, a hexagonal, or the like. According to an embodiment, the mesh shape of the metal mesh pattern may be designed to be entirely uniform or partially different. According to an embodiment, a mesh size of the metal mesh pattern may be designed to be entirely uniform or partially different. According to an embodiment, a thickness of the metal mesh may be designed to be entirely uniform or partially different.

According to an embodiment, although not shown, the electronic cover 100 may include a layer including a second conductive pattern. The second conductive pattern may be disposed along at least part of the electronic cover 100. When the electronic cover 100 is coupled to the electronic device, the second conductive pattern may be electrically coupled to a pressure sensing circuit of the electronic device. For example, the pressure sensing circuit may activate at least part of the second conductive pattern on the basis of a signal from a control circuit (e.g., a processor). For example, the pressure sensing circuit may sense a signal regarding pressure through the second conductive pattern, and may provide this to the control circuit (e.g., the processor). For example, the second conductive pattern may include a plurality of first electrodes and a plurality of second electrodes. The plurality of first electrodes may be arranged on one layer, and the plurality of second electrodes may be arranged on the other layers. The pressure sensing circuit may apply voltage to the first electrode and the second electrode, and thus capacitance may be generated between the first electrode and the second electrode. For example, when pressure is applied to an outer face of the electronic device. a distance between the first electrode and the second electrode becomes closer, and the capacitance may change (e.g., an increase in the capacitance). The pressure sensing circuit may provide the control circuit with a signal based on the capacitance change. The control circuit may sense a position at which pressure occurs and a size thereof, based on the signal obtained from the pressure sensing circuit.

According to an embodiment, although not shown, the electronic cover 100 may include a layer including a third conductive pattern. The third conductive pattern may use a touch input or a hovering input. The third conductive pattern may be disposed along at least part of the electronic cover 100. When the electronic cover 100 is coupled to the electronic device, the third conductive pattern may be electrically coupled to a touch/hovering input sensing circuit of the electronic device. According to an embodiment, a layer including the third conductive pattern may be disposed below the second layer 120. According to an embodiment, the layer including the third conductive pattern may be disposed above the second face 1002. For example, the layer including the third conductive pattern may include ITO, ATO, or the like.

FIG. 2 is a cross-sectional view of an electronic cover included in an electronic device according to an embodiment.

An electronic cover 200 may include at least part of the electronic cover 100 of FIG. 1A. According to an embodiment, the electronic cover 200 may include a first layer 210, a second layer 220, a third layer 230, a fourth layer 240, and a fifth layer 250. The first layer 210, the second layer 220, the third layer 230, the fourth layer 240, and the fifth layer 250 may be the same as or similar respectively to the first layer 110, second layer 120, third layer 130, fourth layer 140, and fifth layer 150 of FIG. 1A.

According to an embodiment, the electronic cover 200 may include a groove 201 which is dented in a direction 20011 facing the first layer 210 from the second layer 220. According to an embodiment, the groove 201 may be constructed by an opening (or a through-hole) constructed on the second layer 220. According to an embodiment, although not shown, the groove 201 may be a groove having a shape in which at least part of the third layer 230 is further dented in the direction 20011.

According to an embodiment, an element 202 including a light emitter (or a light source) or light receiver of the electronic device may be coupled to the groove 201. For example, the light emitter may be a light source such as a flash or the like for a camera. For example, the light emitter may be a light source for a light sensor (e.g., a heart rate measurement sensor). For example, the light receiver may be an element included in the light sensor (e.g., a biometric sensor, an image sensor of the camera, or the like). According to an embodiment, when a light transmittance of the first layer 210 is adjusted, an amount of light generated from the light emitter of the element 202 and emitted to the outside may be adjusted. According to an embodiment, when the light transmittance of the first layer 210 is adjusted, an amount of external light input to the receiver of the receiver of the element 202 may be adjusted.

Figure 3A:
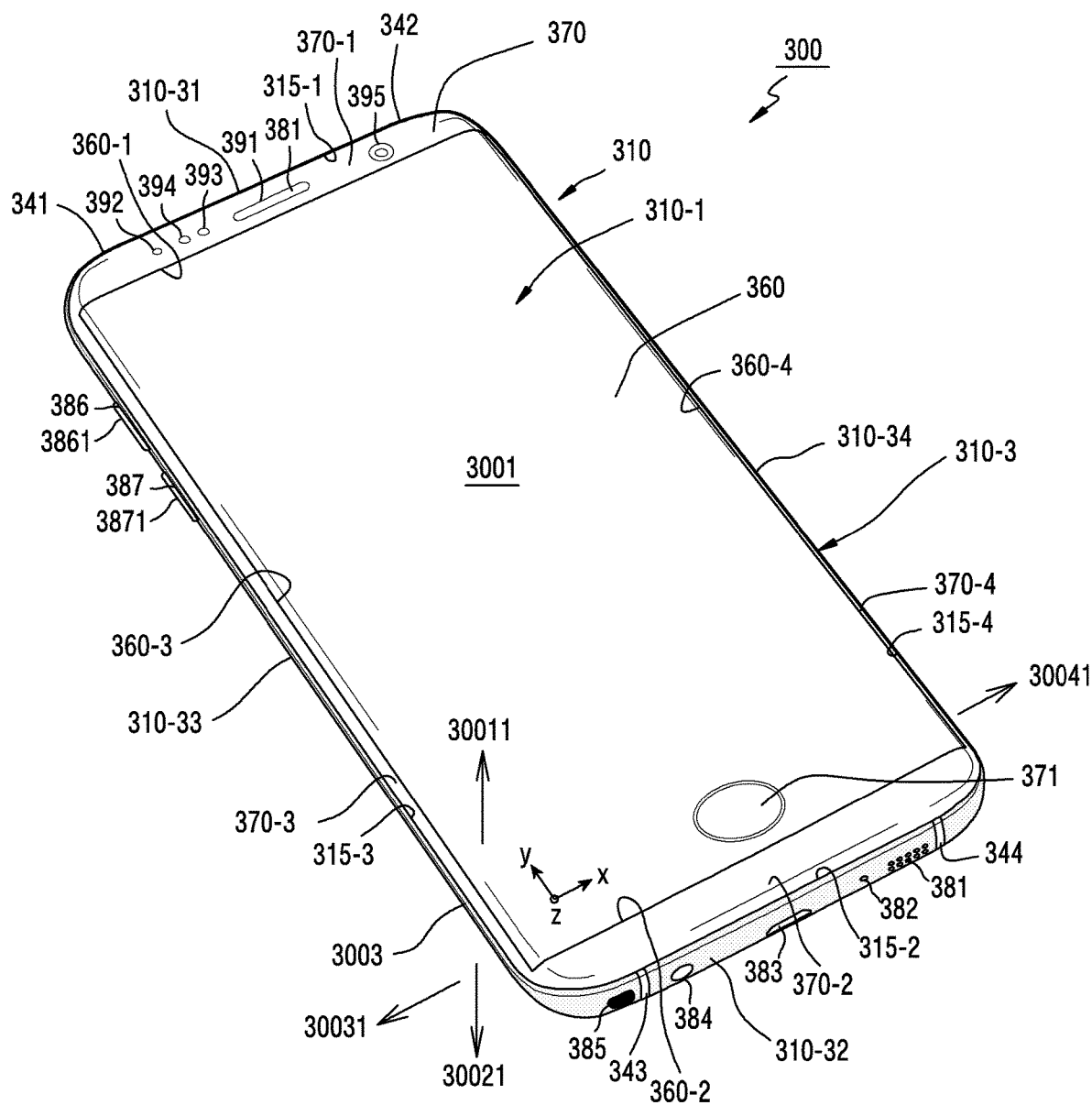
FIG. 3A illustrates an electronic device including an electronic cover according to an embodiment.
Figure 3B:
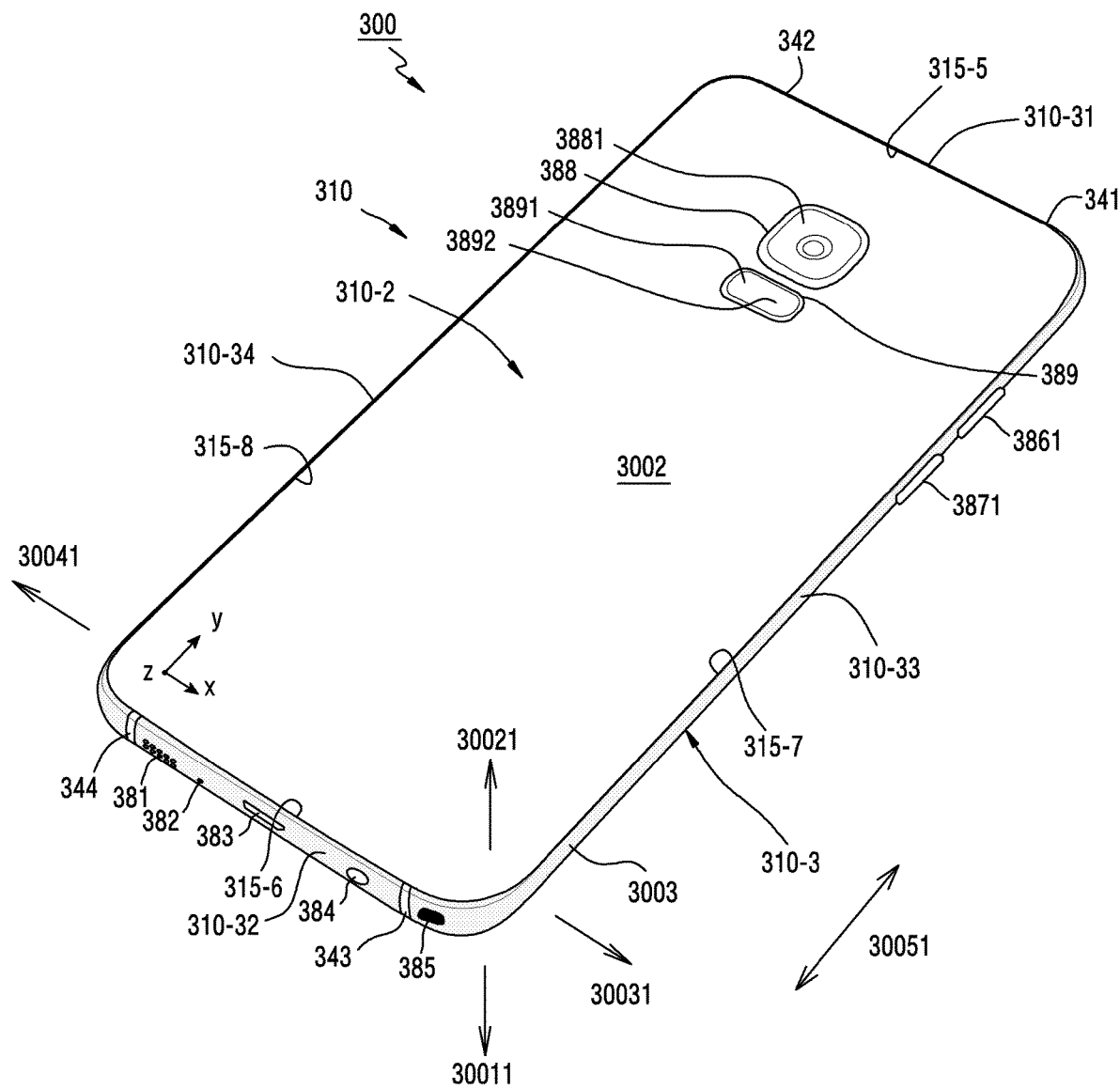
FIG. 3B illustrates an electronic device including an electronic cover according to an embodiment.

FIGS. 3A and 3B illustrate an electronic device including an electronic cover according to an embodiment. FIGS. 4A, 4B, 4C, 4D, and 4E are drawings for explaining a representation through an electronic cover in an embodiment.

Referring to FIGS. 3A and 3B, in an embodiment, an electronic device 300 may include a housing 310 which constitutes the entirety or at least part of an exterior of the electronic device 300. According to an embodiment, the housing 310 may include a non-metal material and/or a metal material. For example, the housing 310 may be constructed of materials such as plastic, metal, carbon fiber and other fiber composites, ceramic, glass, wood, or combinations of these materials. According to an embodiment, the housing 310 may be constructed of one material as a whole or combinations of a plurality of materials. According to an embodiment, the housing 310 may be constructed of materials of which properties of matter are partially different.

According to an embodiment, the housing 310 may constitute an exterior including a first face 3001, a second face 3002, and a third face 3003. The first face 3001 may face substantially a first direction 30011. The second face 3002 may face substantially a second direction 30021 opposite to the first direction 30011. The third face 3003 may be a face (e.g., a side face) surrounding a space between the first face 3001 and the second face 3002.

According to an embodiment, the housing 310 may include a first cover (or a first plate) 310-1 constituting the first face 3001. The housing 310 may include a second cover (or a second plate) 310-2 constituting the second face 3002. The housing 310 may include a side member 310-3 surrounding a space between the first cover 310-1 and the second cover 310-2. The side member 310-3 may constitute the third face 3003.

According to an embodiment, the first cover 310-1 may have a shape of a substantially rectangle including a first edge 315-1, a second edge 315-2, a third edge 315-3, and a fourth edge 315-4. For example, the first edge 315-1 and the second edge 315-2 may face and be parallel to each other. The third edge 315-3 and the fourth edge 315-4 may face and be parallel to each other. According to an embodiment, a distance between the first edge 315-1 and the second edge 315-2 may be greater than a distance between the third edge 315-3 and the fourth edge 315-4. According to an embodiment, although not shown, a connecting portion of the first edge 315-1 and the third edge 315-3, a connection portion of the first edge 315-1 and the fourth edge 315-4, a connecting portion of the second edge 315-2 and the third edge 315-3, or a connecting portion of the second edge 315-2 and the fourth edge 315-4 may have a round shape.

According to an embodiment, an area (or an edge area) (not shown) of the first cover 310-1 adjusted to (e.g., less than or equal to about 10 mm) the first edge 315-1, the second edge 315-2, the third edge 315-3, or the fourth edge 315-4 may be designed in a curved shape. For example, an edge area adjusted to the third edge 315-3 may include a curved face having a shape descending in the second direction 30021 with respect to a coordinate which increases in a third direction 30031. The third direction 30031 may be a direction facing a third frame 310-33 from a fourth frame 310-34 of the side member 310-3. For example, an edge area adjacent to the fourth edge 315-4 may include a curved face having a shape descending in the second direction 30021 with respect to a coordinate which increases in a fourth direction 30041. The fourth direction 30041 may be a direction facing the fourth frame 310-34 from the third frame 310-33 of the side member 310-3.

The second cover 310-2 may be disposed at an opposite side of the first cover 310-1. According to an embodiment, the second cover 310-2 may have a shape of a substantially rectangle including a fifth edge 315-5 corresponding to the first edge 315-1, a sixth edge 315-6 corresponding to the second edge 315-2, a seventh edge 315-7 corresponding to the third edge 315-3, and an eighth edge 315-8 corresponding to the fourth edge 315-4.

According to an embodiment, the second cover 310-2 may include the electronic cover 100 of FIGS. 1A and 1B. Hereinafter, the second cover 310-2 will be described again with reference to FIGS. 1A, 1B, and 2.

According to an embodiment, the second cover 310-2 may include the fourth layer 140 constituting the second face 3002. For example, the fourth layer 140 may be a plate constituting an exterior of the electronic device 300, and may be constructed of materials such as light transmissive plastic, metal, carbon fiber and other fiber composites, or combinations of these materials.

According to an embodiment, the second cover 310-2 may include the first layer 110 designed to adjust a light transmittance by an electrical control. An amount of external light which inputs internally to the second cover 310-2 or an amount of light which is reflected internally from the second cover 310-2 and emitted to the outside may be adjusted by means of the first layer 110. The second cover 310-2 may include the second layer 120 including the color filters 1211 and the reflective layer 122. According to an embodiment, external light may be reflected on the reflective layer 122, and the reflected light may be emitted to the outside via the color layer 121 and the first layer 110. A control circuit (e.g., a processor) of the electronic device 300 may control power for the first layer 110. When the power for the first layer 110 is controlled, a light transmittance for at least one area of the first layer 110 may be adjusted, and a representation such as a color, density, depth, pattern, or the like may be visible to a user through the second cover 310-2.

Figure 4A:
FIG. 4A is a drawing for explaining a representation through an electronic cover in various embodiments.

FIG. 4A illustrates the second cover 310-2 of the electronic device 300 when power is not supplied to the first layer 110. When the power is not supplied to the first layer 110, the first layer 110 may have a light transmittance which makes it difficult to transfer external light to the second layer 120. In this case, the external light may be substantially reflected on the first layer 110 and emitted to the outside by passing through the fourth layer 140. Referring to FIG. 4A, for example, when the power is not supplied to the first layer 110, the second cover 310-2 may be visible to the user in a dark color (e.g., black). In the example of FIG. 4A, the depth of the color visible through the second cover 310-2 may be limited to the thickness of the fourth layer 140.

Figure 4B:
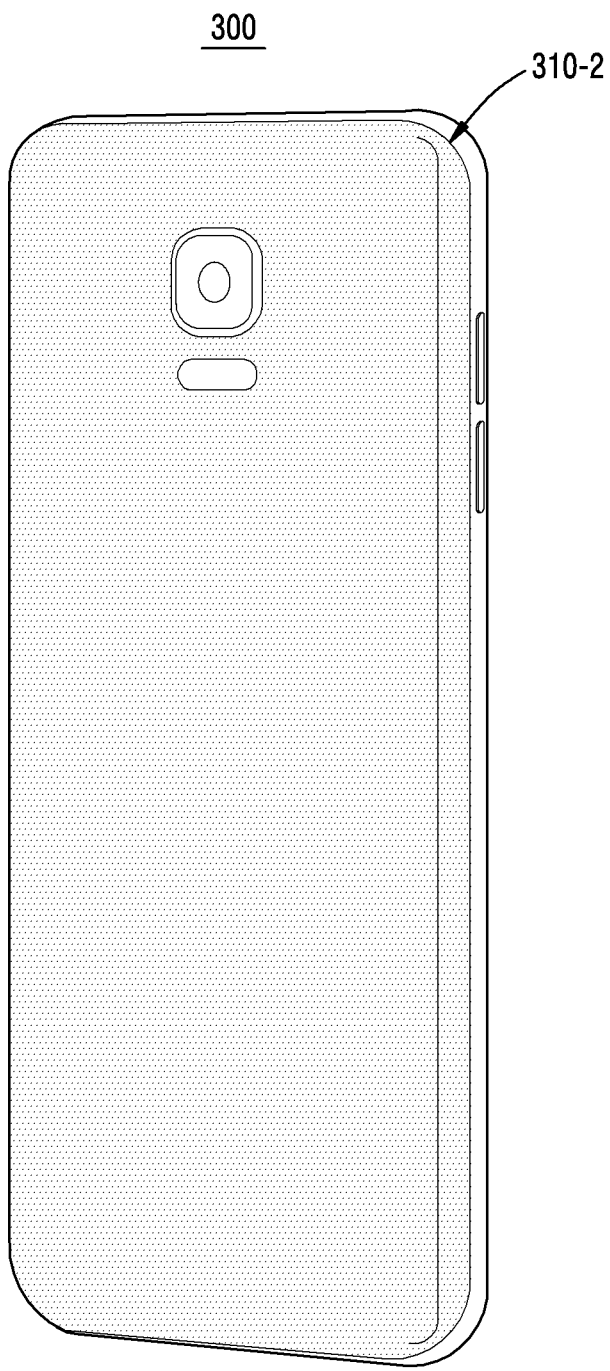
FIG. 4B is a drawing for explaining a representation through an electronic cover in various embodiments.

FIG. 4B illustrates the second cover 310-2 of the electronic device 300 when power is supplied to the first layer 110 according to an embodiment. According to an embodiment, constant power may be supplied to all of the second electrodes 1121 of the first layer 110. When the constant power is supplied to the second electrodes 1121 of the first layer 110, the first layer 110 may have a light transmittance capable of transmitting light to the second layer 120. In an embodiment, when the constant power is supplied to the second electrodes 1121 of the first layer 110, the first layer 110 may be designed to have a substantially constant light transmittance across the entirety thereof. External light may reach the reflective layer 112 of the first layer 120 by passing through the first layer 110. The external light may be reflected on the reflective layer 122, and the reflected light may be emitted to the outside via the color filters 1211 of the second layer 120. According to an embodiment, the color filters 1211 may be designed to have the same or different types of colors (e.g., RGB color code, HSB color code, or CMYK color code). In the example of FIG. 4B, the second cover 310-2 may be visible to the user substantially in a constant color across the entire area due to light emitted to the outside via the color filters 1211 having the same or similar types of colors. According to another embodiment, the color filters 1211 may be designed to have different colors. In the example of FIG. 4B, the second cover 310-2 may be visible to the user substantially in a constant color across the entire area by mixing (or compositing) light emitted to the outside through the color filters 1211 of different colors. According to an embodiment, the light transmittance of the first layer 110 may be increased in proportion to strength of power supplied to the first layer 110. The increase in the light transmittance of the first layer 110 may lead to an increase in density of a color represented in the second cover 310-2, thereby being visible to the user. In the example of FIG. 4B, the depth of the representation visible to the user through the second cover 310-2 may be improved, compared to the example of FIG. 4A.

Figure 4C:
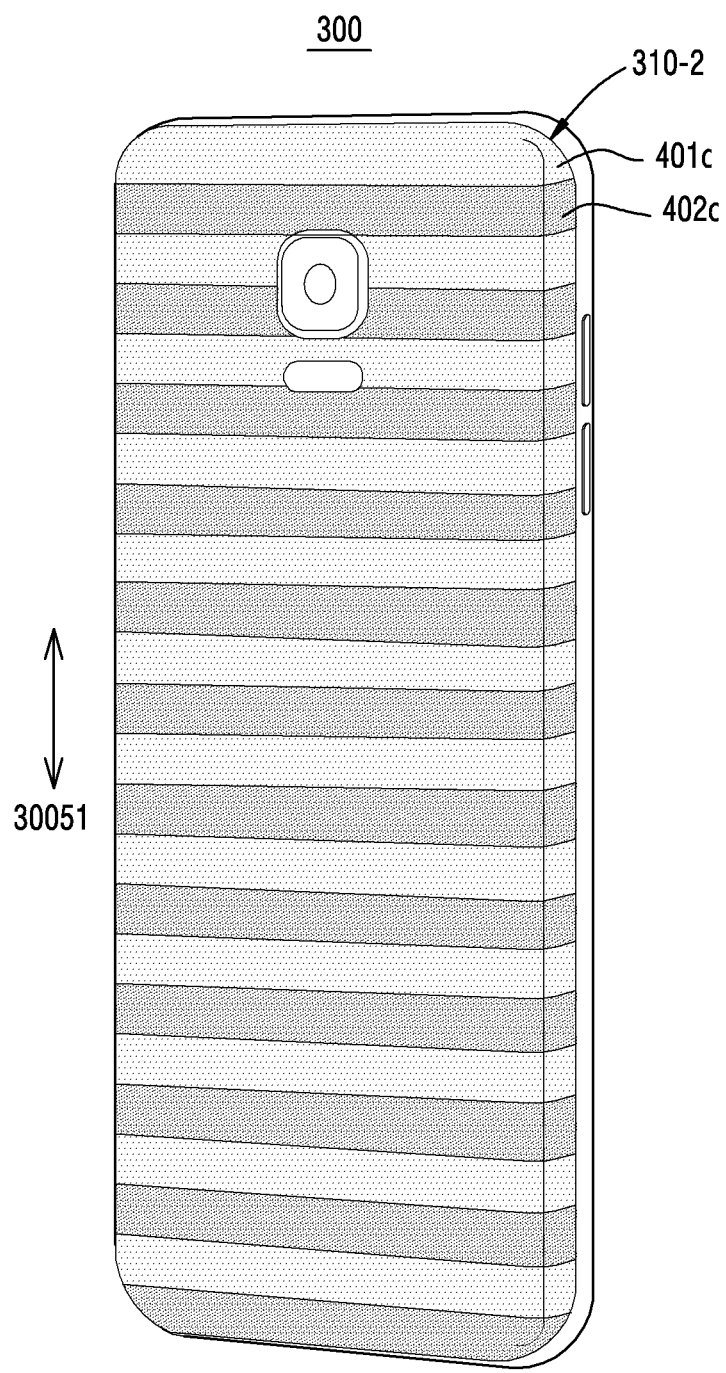
FIG. 4C is a drawing for explaining a representation through an electronic cover in various embodiments.
Figure 4D:
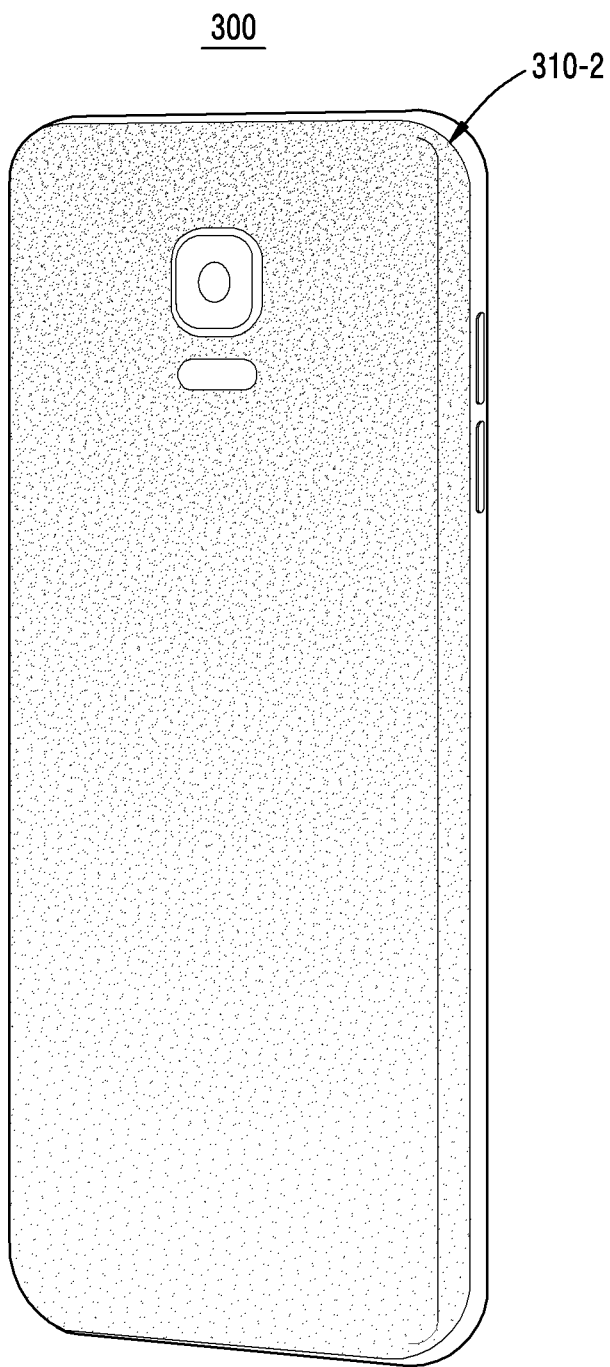
FIG. 4D is a drawing for explaining a representation through an electronic cover in various embodiments.

Referring to FIG. 3B, in an embodiment, the second electrodes 1121 may be designed in a striped structure arranged in a fifth direction 30051. The fifth direction 30051 may be a direction between a first frame 310-31 and second frame 310-32 of the side member 310-3. According to an embodiment, the color patterns 1211 of the second layer 120 may also be designed in a striped structure arranged in the fifth direction 30051. The color pattern 1211 may be aligned with the second electrodes 1121. In an embodiment, FIG. 4C illustrates the second cover 310-2 of the electronic device 300 when power for the second electrodes 1121 of the first layer 110 is controlled. When the power for the second electrodes 1121 of the first layer 110 is controlled, as shown in FIG. 4C, a representation of a striped shape in which a first color of a first portion 401c and a second color of a second portion 402c are repeated in the fifth direction 30051 may be visible to a user through the second cover 310-2. In an embodiment, FIG. 4C may be an example in which power for at least one second electrode 1121-N corresponding to the first portion 401c may be cut off, and power for at least one second electrode 1121-N corresponding to the second portion 402c is supplied. In another embodiment, FIG. 4C may be an example in which power is supplied with different intensities to at least one second electrode 1121-N corresponding to the first portion 401c and at least one second electrode 1121-N corresponding to the second portion 402c. FIG. 4D illustrates the second cover 310-2 of the electronic device 300 when power for the second electrodes 1121 of the first layer 110 is controlled in an embodiment. Referring to FIG. 4D, when the power for the second electrodes 1121 of the first layer 110 is controlled, a gradation representation in the fifth direction 30051 may be visible to the user through the second cover 310-2.

Figure 4E:
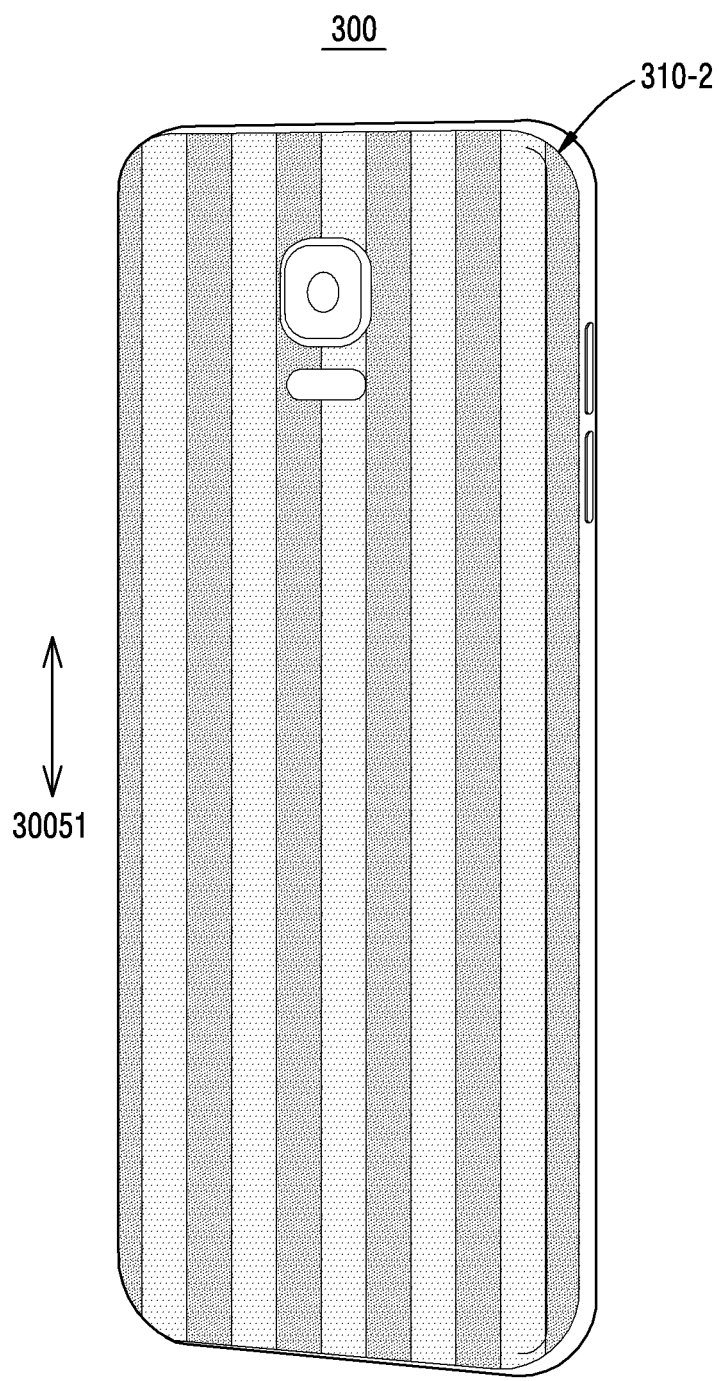
FIG. 4E is a drawing for explaining a representation through an electronic cover in various embodiments.

Referring to FIG. 3B, in another embodiment, the second electrodes 1121 of the first layer 110 may be designed in a striped structure arranged in the third direction 30031 (or the fourth direction 30041). According to an embodiment, the color patterns 1211 of the second layer 120 may also be designed in the striped structure arranged in the third direction 30041 (or the fourth direction 30041). The color patterns 1211 may be aligned with the second electrodes 1121. In an embodiment, FIG. 4E illustrates the second cover 310-2 of the electronic device 300 when power for the second electrodes 1121 of the first layer 110 is controlled. Referring to FIG. 4E, when the power for the second electrodes 1121 of the first layer 110 is controlled, a representation of a striped shape in which a first color of a first portion 401e and a second color of a second portion 402e are repeated in the third direction 30031 (or the fourth direction 30041) may be visible to a user through the second cover 310-2. In an embodiment, FIG. 4E may be an example in which power for at least one second electrode 1121-N corresponding to the first portion 401e is cut off, and power for at least one second electrode 1121-N corresponding to the second portion 402e is supplied. In another embodiment, FIG. 4E may be an example in which power is supplied with different intensities to at least one second electrode 1121-N corresponding to the first portion 401e and at least one second electrode 1121-N corresponding to the second portion 402e. In an embodiment, although not shown, when the power for the second electrodes 1121 of the first layer 110 is controlled, a gradation representation in the third direction 30031 (or the fourth direction 30041) may be visible to the user through the second cover 310-2.

According to an embodiment, elements of the second cover 310-2 may be designed variously, and when an electrical control for the first layer 110 is performed variously, other various representations may be visible to the user through the second cover 310-2. According to an embodiment, the electronic device 300 may sequentially change the electrical controls through the second cover 310-2, thereby changing representations visible to the user through the second cover 310-2.

Referring to FIGS. 3A and 3B, the side member 310-3 may include the first frame 310-31 coupled between the first edge 315-1 and the fifth edge 315-5. The side member 310-3 may include the second frame 310-32 coupled between the second edge 315-2 and the sixth edge 315-6. The side member 310-3 may include the third frame 310-33 coupled between the third edge 315-3 and the seventh edge 315-7. The side member 310-3 may include the fourth frame 310-34 coupled between the fourth edge 315-4 and the eighth edge 315-8. According to an embodiment, a connecting portion of the first frame 310-31 and the third frame 310-33, a connecting portion of the first frame 310-31 and the fourth frame 310-34, a connecting portion of the second frame 310-32 and the third frame 310-33, or a connection portion of the second frame 310-32 and the fourth frame 310-34 may have a round shape.

According to an embodiment, although not shown, the electronic device 300 may include an extension portion (e.g., a mid-plate) extended from the side member 310-3 to a space (not shown) between the first cover 310-1 and the second cover 310-2.

According to an embodiment, at least part of the side member 310-3 may include a conductive material. According to an embodiment, at least one of the first, second, third, and fourth frames 310-31, 310-32, 310-33, and 310-34 of the side member 310-3 may include a plurality of metal portions physically separated from each other. According to an embodiment, non-conductive members 341, 342, 343, and 344 may be disposed between the plurality of metal portions. According to an embodiment, the non-conductive members 341, 342, 343, and 344 may be extended from a member (e.g., a mid-plate) disposed inside the electronic device 300.

According to an embodiment, although not shown, the second cover 310-2 may be designed to cover or occupy at least part of the third face 3003 of the side member 310-3.

The electronic device 300 may include various elements disposed between the first cover 310-3 and the second cover 310-2. According to an embodiment, the electronic device 300 may include a display (not shown) disposed between the first cover 310-1 and the second cover 310-2. The display may include light emitters (e.g., OLED) including a plurality of pixels, and may be exposed to the outside through the first cover.

The display may be disposed along at least part of the first cover 310-1. The first cover 310-1 may include a first area 360 as an area which covers the display and a second area 370 as an area which does not cover the display. The first area 360 may be an area through which light generated from the display passes.

According to an embodiment, the first area 360 may have a shape of a substantially rectangle including an edge#a 360-1, an edge#b 360-2, an edge#c 360-3, and an edge#d 360-4. The edge#a 360-1 may be adjacent to the first edge 315-1 (e.g., less than or equal to about 10 mm). The edge#b 360-2 may be adjacent to the second edge 315-2. The edge#c 360-3 may be adjacent to the third edge 316-3. The edge#d 360-4 may be adjacent to the fourth edge 315-4. The second area (hereinafter, bezel area) 370 may have a shape of a rectangular ring surrounding the first area 360. The bezel area 370 may include a first bezel area 370-1 between the first edge 315-1 and the edge#a 360-1. The bezel area 370 may include a second bezel area 370-2 between the second edge 315-2 and the edge#b 360-2. The bezel area 370 may include a third bezel area 370-3 between the third edge 315-3 and the edge#c 360-3. The bezel area 370 may include a fourth bezel area 370-4 between the fourth edge 315-2 and the edge#d 360-4.

According to an embodiment, the bezel area 370 may be designed to have a color, and may be distinct from the first area 360. For example, the bezel area 370 may have a dark color, i.e., black, or may have a color similar or identical to that of the side member 310-3. According to an embodiment, the bezel area 370 may include a black printed layer.

According to an embodiment, a display may include a touch panel for a touch input or hovering input using the first face 3001. According to an embodiment, the touch panel may be a digitizer panel supporting a touch input or hovering input using a stylus.

According to an embodiment, the electronic device 300 may display a screen (or a Graphical User Interface (GUI)) regarding a configuration of the second cover 310-2 to the display. For example, the electronic device 300 may display a screen including a list regarding various representation modes through the display. The list regarding the various representation modes may be displayed as a GUI element. When one list entity is selected from the list by a user input (e.g., a touch input), the electronic device 300 may electrically control the second cover 310-2 according to a representation mode based on the selected list entry.

According to an embodiment, the electronic device 300 may include various other electronic components (hereinafter, a 'first component') mounted at a position aligned with the first bezel area 370-1.

According to an embodiment, the first component may include a light emitting element (e.g., LED) (not shown) indicating various states of the electronic device 300. For example, when a battery level is low, the electronic device 300 may display a corresponding color through the light emitting element. For example, when the screen is turned off, the electronic device 300 may display a corresponding color through the light emitting element. For example, when the electronic device 300 is coupled to a wired charger or a wireless charger, the electronic device 300 may display a corresponding color through the light emitting element. According to an embodiment, the first cover 310-1 may include a light transmitting area or through-hole 392 constructed at a position aligned with the light emitting element. According to an embodiment, when it is designed to display the various states of the electronic device 300 through the display, the light emitting element and the light transmitting area or through-hole 392 related thereto may be omitted in the electronic device 300.

According to an embodiment, the first component may include a receiver 381 for outputting a voice signal, received from a peer device during a call, as a sound. The first cover 310-1 may include a through-hole 391 constructed at the position aligned with the receiver 381. The receiver 381 may be coupled to the through-hole 391.

According to an embodiment, the first component may include at least one camera (e.g., a front facing camera) (not shown). The first cover 310-1 may include a light transmitting area or through-hole 395 constructed at a position aligned with the at least one camera. According to an embodiment, the electronic device 300 may be designed to electrically control the second cover 310-2 on the basis of image data via the at least one camera.

According to an embodiment, the first component may include at least one light sensor (not shown). The first cover 310-1 may include light transmitting areas or through-holes 393 and 394 constructed at a position aligned with the at least one light sensor. According to an embodiment, the electronic device 300 may be designed to electrically control the second cover 310-2 on the basis of image data via the at least one light sensor.

In an embodiment, when viewed in the second direction 30021, the through-hole 391 for the receiver 381 may be disposed between the light transmitting areas 393 and 394 for at least one light sensor and the light transmitting area or through-hole 395 for the camera. According to an embodiment, when viewed in the second direction 30021, the light transmitting area 393 and 394 for the at least one sensor may be disposed between the light transmitting area 392 for the light emitting element and the through-hole 391 for the receiver 381.

According to an embodiment, the electronic device 300 may display a software home button 371 through the display. A control circuit (e.g., a processor) may display the software home button 371 near the second bezel area 370-2 (e.g., within about 20 mm). The software home button 371 may be displayed at a center of the edge#c 360-3 and edge#d 360-4 of the first area 360. According to an embodiment, although not shown, the control circuit may display the software home button 371 at various other positions. According to an embodiment, the control circuit may determine a display position of the software home button 371 depending on a user environment configuration (user preference), an executed application (or mode), or the like.

When the software home button 371 is selected by a touch input or a hovering input, the control circuit (e.g., the processor) may display a main home screen through the display. The main home screen may be a first screen displayed on the displayed when the electronic device 300 is powered on. When a plurality of home screens are provided in a form of a switchable page, the main home screen may include icons, time, date, or the like for executing applications. According to an embodiment, the home screen may display a state of the electronic device 300, such as a battery charging state, a received signal strength, or a current time. According to another embodiment, upon selecting the software home button 371, the control circuit may allow the electronic device 300 to enter a sleep mode or a low-power mode. In the sleep mode or the low-power mode, the control circuit may perform only configured basic operations such as periodically listening to a radio signal from the outside. In the sleep mode or the low-power mode, the control circuit may include an operation of deactivating at least one element (e.g., a display). The sleep mode or the low-power mode may include an operation of deactivating at least part of the control circuit. According to an embodiment, upon selecting the software home button 371, the control circuit may switch from the sleep mode or the low-power mode to a wake-up-mode. For example, in the wake-up mode, the control circuit may activate the display.

According to an embodiment, although not shown, when the second bezel area 370-2 is designed in an extended manner, the electronic device 300 may include various electronic components (hereinafter, a 'second component') mounted at a position aligned with the second bezel area 370-2. According to an embodiment, the second component may include a hardware home button (not shown). The hardware home button may replace the software home button. According to an embodiment, the electronic device 300 may be designed to electrically control the second cover 310-2 depending on an input through the home button.

According to an embodiment, the side member 310-3 may include through-holes for various electronic components. For example, the side member 310-3 may include a through-hole 381 aligned with a speaker. The side member 310-3 may include a through-hole 382 aligned with a microphone. The side member 310-3 may include through-holes aligned with a connector (e.g., a through-hole 383 for a USB connector, a through-hole 384 for an ear plug). The side member 310-3 may include a through-hole 385 for inserting a stylus. The side member 310-3 may include through-holes 386 and 387 for installing buttons 3861 and 3871. According to an embodiment, the electronic device 300 may be designed to electrically control the second cover 310-2 depending on a detachment of the stylus, an input through the buttons 3861 and 3871, or the like.

According to an embodiment, the second cover 310-2 may include through-holes for various electronic components. For example, the second cover 310-2 may include a through-hole 388 to which a camera (or a rear facing camera) 3881 is coupled. The second cover 310-2 may include a through-hole 389 to which a light sensor (e.g., a heart rate measurement sensor) 3892 is coupled. According to an embodiment, the electronic device 300 may be designed to electrically control the second cover 310-2 on the basis of image data from the camera 3881 or a value detected through a light sensor. According to an embodiment, the electronic device 300 may be designed to electrically control the second cover 310-2 on the basis of a value detected from the light sensor 3892.

According to an embodiment, the electronic device 300 may further include various elements (or modules) depending on a type of providing it. These elements may be modified in various manners along with the convergence trend of digital devices, and thus not all such components may be listed herein, but components of the same level as that of the aforementioned components may be further included in the electronic device 300. In the electronic device 300 according to an embodiment, it is apparent that specific components may be excluded from the aforementioned components or replaced with other components.

Figure 5:
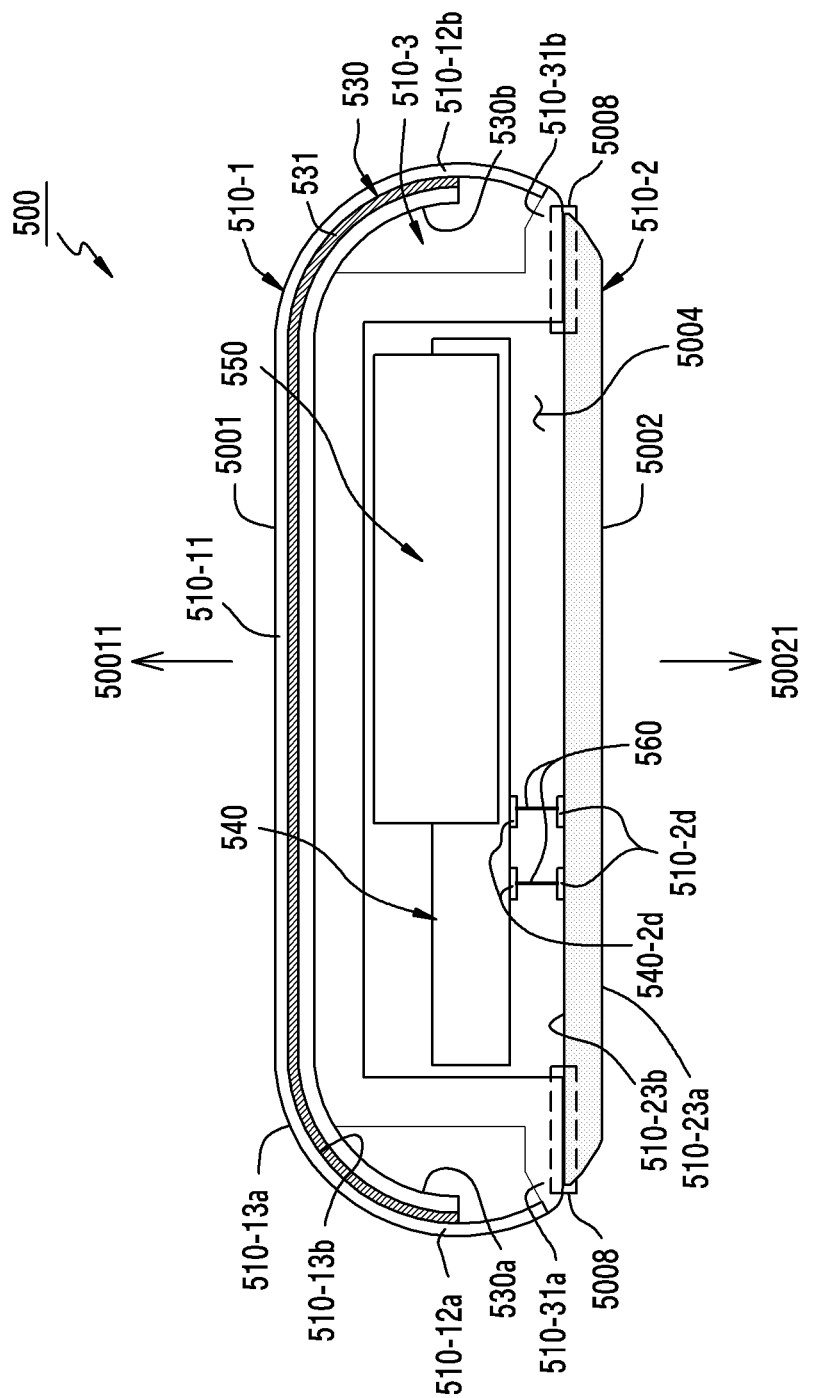
FIG. 5 illustrates a cross-sectional view of an electronic device including an electronic cover according to various embodiments.

FIG. 5 illustrates a cross-sectional view of an electronic device including an electronic cover according to an embodiment.

Referring to FIG. 5, an electronic device 500 may include a first cover 510-1, a second cover 510-2, a support construction 510-3, a display 530, a Printed Circuit Board (PCB) 540, and a battery 550.

In a cross-sectional view, the first cover 510-1 may be a plate including curved portions 510-12a and 510-12b of which both ends are bent in a direction#12 50021. In the first cover 510-1, a portion (hereinafter, a mid-portion) 510-11 between the both-side curved portions 510-12a and 510-12b may be substantially flat. The both-side curved portions 510-12a and 510-12b of the first cover 510-1 may be symmetrical with each other. According to an embodiment, although not shown, the both-side curved portions 510-12a and 510-12b of the first cover 510-1 may be designed in different shapes. The mid-portion 510-11 may constitute an outer face 5001 (e.g., the first face 3001 of FIG. 3A) of the electronic device 500 facing the direction#11 50011 (e.g., a direction opposite to the direction#12 50021). According to an embodiment, although not shown, the first cover 510-1 may be designed such that only one side has a curved portion.

The display 530 may be disposed along at least part of the first cover 510-1. According to an embodiment, the display 530 may include curved portions 530a and 530b of which both ends are bent in the direction#12 50021. When the first cover 510-1 is coupled to the electronic device 500, the first cover 510-1 may include an exterior face 510-13 a constituting an outer face of the electronic device 500, and an interior face 510-13b of an opposite side thereof. According to an embodiment, the display 530 may be coupled to the interior face 510-13b of the first cover 510-1 by using Optical Clear Adhesive (OCA) or the like. According to an embodiment, the display 530 may have flexibility.

According to an embodiment, the display 530 may include a conductive pattern 531 for a touch input or a hovering input. For example, the conductive pattern 531 may include aluminum (Al), copper (Cu), silver (Ag), graphene, Indium Tin Oxide (ITO), Indium Zinc Oxide (IZO), or the like. According to an embodiment, the display 530 may be an On-cell Touch Screen Panel (TSP) AMOLED (OCTA) panel including the conductive pattern 531. According to an embodiment, although not shown, the display 530 may include a conductive pattern (e.g., a pen sensor or a digitizer) for an electronic pen.

The second cover 510-2 may be disposed at an opposite side of the first cover 510-1, and may constitute an outer face 5002 (e.g., the second face 3002 of FIG. 3B) of the electronic device 500, facing the direction#12 50021. According to an embodiment, the second cover 510-2 may be a substantially flat plate. According to an embodiment, although not shown, the first cover 510-1 may be designed to include a curved portion having a shape in which one side or both sides thereof is bent in the direction#11 50011.

The support construction (e.g., the bracket) 510-3 may be a portion to which elements, such as the first cover 510-1, the second cover 510-2, the display 530, the PCB 540, the battery 550, etc., are coupled. The support construction 510-3 may be designed in a shape for coupling with elements, and may include various materials such as metal or non-metal or the like. Although not shown, the elements may be coupled to the support construction 510-3 by using various means such as bolt fastening, bonding, snap-fits, or the like. When the elements are coupled to the support construction 510-3, durability (e.g., torsional rigidity) of the electronic device 500 may be improved. According to an embodiment, portions 510-3a and 510-3b of the support construction 510-3 may be exposed to the outside, and may provide an outer face for smoothly coupling between the first cover 510-1 and the second cover 510-2.

According to an embodiment, a space 5004 may exist between the support construction 510-3 and the second cover 510-2, and the space 5004 may be disposed to the PCB 540, and the battery (or a battery pack) 550. The PCB 540 may include a substrate including a plurality of components for various operations and signal lines or pads for electrically coupling the components. According to an embodiment, the PCB 540 may be electrically coupled to one or more processors (e.g., an Application Processor (AP), etc.), a communication module, a subscriber identity module, a memory, a sensor module, an input device, the display 530, an interface, an audio module, a camera module, a power management module, the battery 550, an indicator, a motor, or the like, or may include at least one of them.

According to an embodiment, the second cover 510-2 (e.g., the second cover 310-2 of FIG. 3B) may include the electronic cover 100 of FIGS. 1A and 1B, and detailed descriptions thereof will be omitted. The second cover 510-2 may be electrically coupled to the PCB 540. When the second cover 510-2 is coupled to the electronic device 500, the second cover 510-2 may include an exterior face 510-23a constituting the outer face 5002 of the electronic device 500, and an interior face 510-23b of an opposite side thereof. According to an embodiment, the second cover 510-2 may include at least one contact 510-2d disposed to the interior face 510-23b. The at least one contact 510-2d of the second cover 510-2 may be electrically coupled to the at least one contact 540-2d constructed at the PCB 540. According to an embodiment, the electronic device 500 may include a conductive member 560 (e.g., a Flexible Printed Circuit Board (FPCB)) for electrically coupling between the contacts 510-2d and 540-2d. According to an embodiment, when the second cover 510-2 is coupled to the electronic device 500, the conductive member 560 may include a flexible conductive member (or a conductive coupling member) for electrically coupling between the contacts 510-2d and 540-2d. For example, the flexible conductive member may include a C-clip, a pogo-pin, a spring, a conductive poron and rubber, a conductive tape, a copper connector, or the like. The flexible conductive member may improve the electrical coupling between the contacts 510-2d and 540-2d. According to an embodiment, the flexible conductive member may be installed to at least one contact 540-2d of the PCB 540, or may be installed to at least one contact 510-2d of the second cover 510-2.

According to another embodiment, although not shown, the electronic device 500 may include an FPCB extended to a coupling portion 5008 of the support construction 510-3 and second cover 510-2. One end portion of the FPCB may be electrically coupled to the PCB 540, and the other end portion of the FPCB may be disposed to the support construction 510-3 in a contact manner. When the second cover 510-2 is coupled to the electronic device 500, the contact of the second cover 510-2 and the contact of the FPCB may be electrically coupled. According to an embodiment, a flexible conductive member may be disposed between the contact of the second cover 510-2 and the contact of the FPCB.

According to an embodiment, the second cover 510-2 may include a plurality of areas. According to an embodiment, the plurality of areas may be arranged in a striped structure. Returning to FIGS. 1A, 1B, and 1C, the second cover 510-2 may include the second layer 120 having at least one color, and the external light may be reflected from the second layer 120 and emitted to the outside. According to an embodiment, the second layer 120 may include a plurality of areas, and may have a color for each area. According to an embodiment, the plurality of areas of the second layer 120 may be arranged in a striped structure. According to an embodiment, the second cover 510-2 may include the first layer 110 for adjusting an amount of reflected light passing through the outside. According to an embodiment, when a control circuit (e.g., a processor) including the PCB 540 electrically controls the second cover 510-2, a light transmittance for areas of the first layer 110 may be selectively adjusted. According to an embodiment, the plurality of areas of the first layer 110 may be arranged in a striped structure. By individually adjusting the light transmittance for the plurality of areas of the first layer 110, various representations (e.g., color, density, depth, pattern, etc.) of the second cover 510-2 may be visible to a user.

Figure 6:
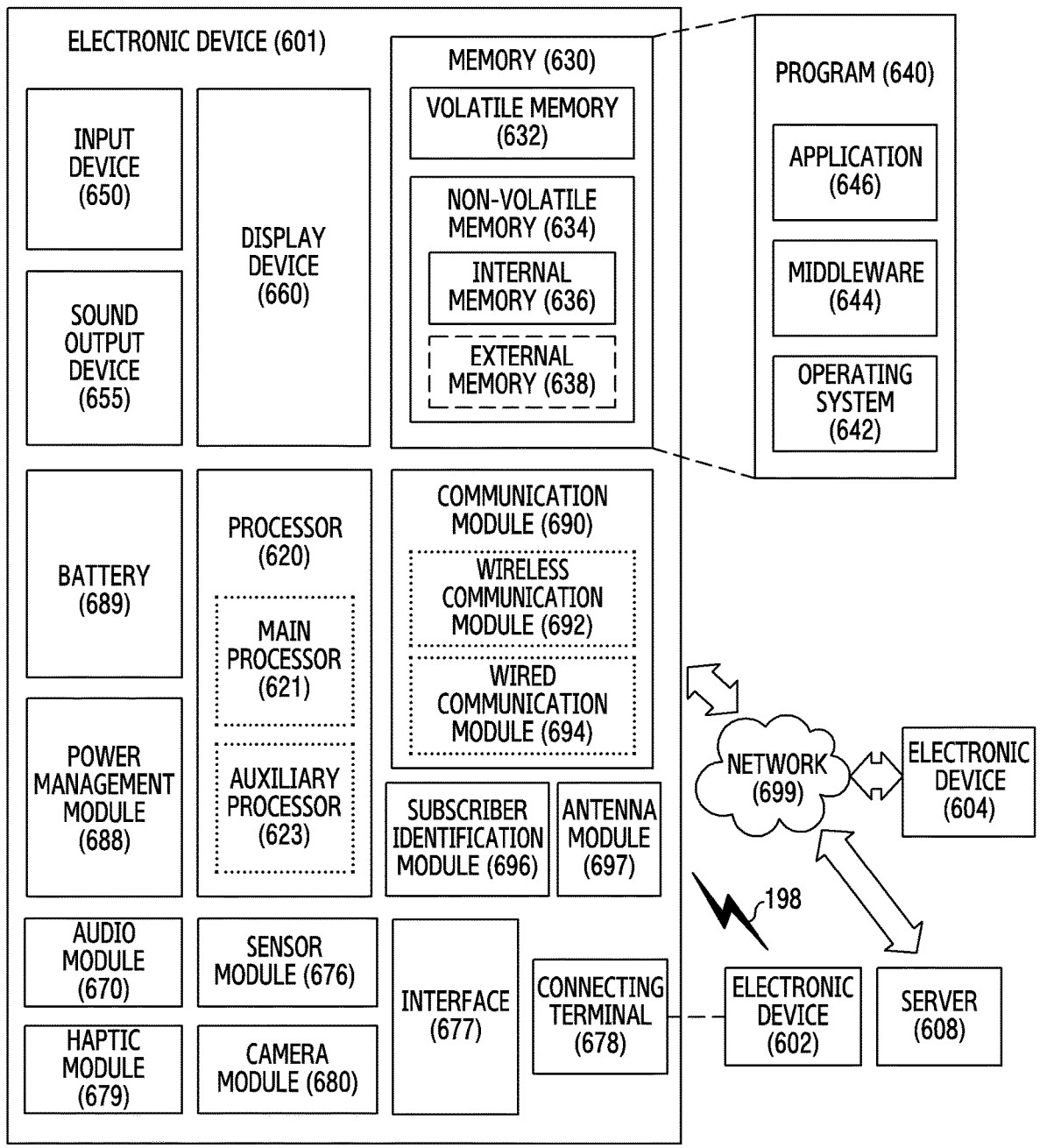
FIG. 6 is a block diagram illustrating an electronic device in a network environment according to various embodiments.

FIG. 6 is a block diagram illustrating an electronic device 601 in a network environment 600 according to an embodiment. Referring to FIG. 6, the electronic device 601 in the network environment 600 may communicate with an electronic device 602 via a first network 698 (e.g., a short-range wireless communication network), or an electronic device 604 or a server 608 via a second network 699 (e.g., a long-range wireless communication network). According to an embodiment, the electronic device 601 may communicate with the electronic device 604 via the server 608.

According to an embodiment, the electronic device 604 can be an electronic device 300, 500 (FIG. 3a, FIG. 3b)

According to an embodiment, the electronic device 601 may include a processor 620, memory 630, an input device 650, a sound output device 655, a display device 660, an audio module 670, a sensor module 676, an interface 677, a haptic module 679, a camera module 680, a power management module 688, a battery 689, a communication module 690, a subscriber identification module (SIM) 696, or an antenna module 697. In some embodiments, at least one (e.g., the display device 660 or the camera module 680) of the components may be omitted from the electronic device 601, or one or more other components may be added in the electronic device 601. In some embodiments, some of the components may be implemented as single integrated circuitry. For example, the sensor module 676 (e.g., a fingerprint sensor, an iris sensor, or an illuminance sensor) may be implemented as embedded in the display device 660 (e.g., a display).

The processor 620 may execute, for example, software (e.g., a program 640) to control at least one other component (e.g., a hardware or software component) of the electronic device 601 coupled with the processor 620, and may perform various data processing or computation. According to one embodiment, as at least part of the data processing or computation, the processor 620 may load a command or data received from another component (e.g., the sensor module 676 or the communication module 690) in volatile memory 632, process the command or the data stored in the volatile memory 632, and store resulting data in non-volatile memory 634. According to an embodiment, the processor 620 may include a main processor 621 (e.g., a central processing unit (CPU) or an application processor (AP)), and an auxiliary processor 623 (e.g., a graphics processing unit (GPU), an image signal processor (ISP), a sensor hub processor, or a communication processor (CP)) that is operable independently from, or in conjunction with, the main processor 621. Additionally or alternatively, the auxiliary processor 623 may be adapted to consume less power than the main processor 621, or to be specific to a specified function. The auxiliary processor 623 may be implemented as separate from, or as part of the main processor 621.

The auxiliary processor 623 may control at least some of functions or states related to at least one component (e.g., the display device 660, the sensor module 676, or the communication module 690) among the components of the electronic device 601, instead of the main processor 621 while the main processor 621 is in an inactive (e.g., sleep) state, or together with the main processor 621 while the main processor 621 is in an active state (e.g., executing an application). According to an embodiment, the auxiliary processor 623 (e.g., an image signal processor or a communication processor) may be implemented as part of another component (e.g., the camera module 680 or the communication module 690) functionally related to the auxiliary processor 623. The memory 630 may store various data used by at least one component (e.g., the processor 620 or the sensor module 676) of the electronic device 601. The various data may include, for example, software (e.g., the program 640) and input data or output data for a command related thereto. The memory 630 may include the volatile memory 632 or the non-volatile memory 634.

The program 640 may be stored in the memory 630 as software, and may include, for example, an operating system (OS) 642, middleware 644, or an application 646.

The input device 650 may receive a command or data to be used by other component (e.g., the processor 620) of the electronic device 601, from the outside (e.g., a user) of the electronic device 601. The input device 650 may include, for example, a microphone, a mouse, a keyboard, or a digital pen (e.g., a stylus pen).

The sound output device 655 may output sound signals to the outside of the electronic device 601. The sound output device 655 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 660 may visually provide information to the outside (e.g., a user) of the electronic device 601. The display device 660 may include, for example, a display, a hologram device, or a projector and control circuitry to control a corresponding one of the display, hologram device, and projector. According to an embodiment, the display device 660 may include touch circuitry adapted to detect a touch, or sensor circuitry (e.g., a pressure sensor) adapted to measure the intensity of force incurred by the touch. According to an embodiment, the display device 660 may include the display 530 in FIG. 5.

According to an embodiment, the display device 660 may include an electronic cover (or a digital cover) (e.g., the second cover 310-2 of FIG. 3B or the second cover 510-2 of FIG. 5) which constitutes at least part of an exterior of the electronic device 601. According to an embodiment, the electronic cover may include at least part of the electronic cover 100 of FIGS. 1A and 1B. When external light is reflected on the electronic cover and enters a user's eye, a representation depending on the electronic cover may be visible to the user. According to an embodiment, the electronic cover may include a bottom layer having at least one color, and the external light may be reflected from the bottom layer and emitted to the outside. According to an embodiment, the bottom layer may include a plurality of areas, and may have a color for each area.

According to an embodiment, the electronic cover may include a top layer for adjusting an amount of reflected light transmitted to the outside. According to an embodiment, when the processor 620 electrically controls the electronic cover, a light transmittance for a plurality of areas of the top layer may be selectively adjusted. According to an embodiment, the processor 620 may electrically control the electronic cover on the basis of the program 640 stored in the memory 630. By individually adjusting the light transmittance for the plurality of areas of the top layer, various representations (e.g., color, density, depth, pattern, etc.) of the electronic cover may be visible to a user.

The audio module 670 may convert a sound into an electrical signal and vice versa. According to an embodiment, the audio module 670 may obtain the sound via the input device 650, or output the sound via the sound output device 655 or a headphone of an external electronic device (e.g., an electronic device 602) directly (e.g., wiredly) or wirelessly coupled with the electronic device 601. According to an embodiment, the audio module 670 may be designed to output various sound signals to the sound output device 655 under the control of the processor 620, when the processor 620 electrically controls the electronic cover (e.g., 100 of FIGS. 1A and 1B). According to an embodiment, the audio module 670 may collect various sound inputs for causing an electrical control for the electronic cover.

The sensor module 676 may detect an operational state (e.g., power or temperature) of the electronic device 601 or an environmental state (e.g., a state of a user) external to the electronic device 601, and then generate an electrical signal or data value corresponding to the detected state. According to an embodiment, the sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, an illuminance sensor or an ultra-violet (UV) sensor. According to an embodiment, the sensor module 676 may include, for example, an e-nose sensor, an ElectroMyoGraphy (EMG) sensor, an ElectroEncephaloGram (EEG) sensor, an ElectroCardioGram (ECG) sensor, an Infrared (IR) sensor, an iris sensor, or a fingerprint sensor. The sensor module 676 may further include a control circuit for controlling at least one or more sensors included therein. In some embodiments, the electronic device 601 may further include a processor configured to control the sensor module 676 either separately or as one part of the processor 620, and may control the sensor module 676 while the processor is in a sleep state. According to an embodiment, the sensor module 620 may obtain various detection values for causing an electrical control for the electronic cover (e.g., 100 of FIGS. 1A and 1B).

The interface 677 may support one or more specified protocols to be used for the electronic device 601 to be coupled with the external electronic device (e.g., the electronic device 602) directly (e.g., wiredly) or wirelessly. According to an embodiment, the interface 677 may include, for example, a high definition multimedia interface (HDMI), a universal serial bus (USB) interface, a secure digital (SD) card interface, or an audio interface. According to an embodiment, the interface 677 may include an electronic cover interface regarding a signal flow between an electronic cover (e.g., 100 of FIGS. 1A and 1B) and elements (e.g., the processor 620).

A connecting terminal 678 may include a connector via which the electronic device 601 may be physically connected with the external electronic device (e.g., the electronic device 602). According to an embodiment, the connecting terminal 678 may include, for example, a HDMI connector, a USB connector, a SD card connector, or an audio connector (e.g., a headphone connector). According to an embodiment, the connecting terminal 678 may include elements (e.g., contacts) for electrical coupling between elements (e.g., the processor 620, the power management module 688, etc.) and the electronic cover 100, when the electronic cover (e.g., 100 of FIGS. 1A and 1B) is coupled to the electronic device 601.

The haptic module 679 may convert an electrical signal into a mechanical stimulus (e.g., a vibration or a movement) or electrical stimulus which may be recognized by a user via his tactile sensation or kinesthetic sensation. According to an embodiment, the haptic module 679 may include, for example, a motor, a piezoelectric element, or an electric stimulator. According to various embodiment, the haptic module 679 may be designed to output various haptic effects under the control of the processor 620, when the processor 620 electrically controls the electronic cover (e.g., 100 of FIGS. 1A and 1B).

The camera module 680 may capture a still image or moving images. According to an embodiment, the camera module 680 may include one or more lenses, image sensors, image signal processors, or flashes. According to an embodiment, based on an operation of the camera module 680, the processor 620 may electrically control the electronic cover (e.g., 100 of FIGS. 1A and 1B) on the basis of a set program.

The power management module 688 may manage power supplied to the electronic device 601. According to one embodiment, the power management module 688 may be implemented as at least part of, for example, a power management integrated circuit (PMIC). According to an embodiment, the power management module 688 may manage power for the electronic cover (e.g., 100 of FIGS. 1A and 1B) under the control of the processor 620.

The battery 689 may supply power to at least one component of the electronic device 601. According to an embodiment, the battery 689 may include, for example, a primary cell which is not rechargeable, a secondary cell which is rechargeable, or a fuel cell. The power management module 688 may manage power for elements (e.g., the electronic cover) by using power of the battery 689.

According to an embodiment, the power management module 688 may be electrically coupled to a circuit (hereinafter, a cover control circuit) for electrically controlling the electronic cover (e.g., 100 of FIGS. 1A and 1B). According to an embodiment, at least part of the cover control circuit may be included in the electronic cover 100. According to an embodiment, at least part of the cover control circuit may be included in the electronic device 601. For example, at least part of the cover control circuit may be included in the power management module 688. For example, at least part of the cover control circuit may be included in the processor 620.

The communication module 690 may support establishing a direct (e.g., wired) communication channel or a wireless communication channel between the electronic device 601 and the external electronic device (e.g., the electronic device 602, the electronic device 604, or the server 608) and performing communication via the established communication channel. The communication module 690 may include one or more communication processors that are operable independently from the processor 620 (e.g., the application processor (AP)) and supports a wired communication or a wireless communication.

According to an embodiment, the communication module 690 may include a wireless communication module 692 or a wired communication module 694. A corresponding one of these communication modules may communicate with the external electronic device via the first network 698 (e.g., Bluetooth™, wireless-fidelity (Wi-Fi) direct, or infrared data association (IrDA)) or the second network 699 (e.g., a cellular network, the Internet, or a computer network (e.g., LAN or wide area network (WAN)). These various types of communication modules may be implemented as a single chip, or may be implemented as multi chips separate from each other.

According to an embodiment, the wireless communication module 692 may include a cellular communication module, a short-range wireless communication module, or a global navigation satellite system (GNSS) communication module. For example, the cellular communication module may be a cellular communication module such as, for example, LTE, LTE Advance, code division multiple access (CDMA), wideband CDMA, universal mobile telecommunications system (UNITS), wireless broadband (WiBro), Or Global System for Mobile Communications (GSM). For example, the short-range wireless communication module may be a wireless communication module such as a wireless fidelity (WiFi), a light fidelity (LiFi), a Bluetooth, a Bluetooth low power (BLE), a Zigbee, a near field communication (NFC), a magnetic secure transmission, Radio frequency (RF), or body area network (BAN). For example, the GNSS communication module may be a Global Positioning System (GPS), a Global Navigation Satellite System (Glonass), a Beidou Navigation Satellite System (Beidou), or a Galileo, the European global satellite-based navigation system.

According to an embodiment, the wired communication module may be a universal serial bus (USB), a high definition multimedia interface (HDMI), a recommended standard 232 (RS-232), a power line communication or a plain old telephone service or the like. The network 162 may include at least one of a telecommunications network, e.g., a computer network (e.g., a local area network (LAN) or wide area network (WAN), the Internet, or a telephone network.

The wireless communication module 692 may identify and authenticate the electronic device 601 in a communication network, such as the first network 698 or the second network 699, using subscriber information (e.g., international mobile subscriber identity (IMSI)) stored in the subscriber identification module 696.

According to an embodiment, processor 620 may electrically controls the electronic cover(e.g., electronic cover 100 in FIGS. 1A and 1B) based on operations of the wireless communication module 692.

The antenna module 697 may include one or more antennas configured to transmit or receive a signal or power to or from the outside of the electronic device 601. According to an embodiment, the communication module 690 (e.g., the wireless communication module 692) may transmit or receive a signal to or from the external electronic device via at least one antenna appropriate for a communication scheme used in the communication network.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 601 and the external electronic device 604 via the server 608 coupled with the second network 699. Each of the electronic devices 602 and 604 may be a device of a same type as, or a different type, from the electronic device 601. According to an embodiment, all or some of operations to be executed at the electronic device 601 may be executed at one or more of the external electronic devices 602, 604, or 608. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 601. The electronic device 601 may provide the outcome, with or without further processing of the outcome, as at least part of a reply to the request. To that end, a cloud computing, distributed computing, or client-server computing technology may be used, for example.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment as set forth herein may be implemented as software (e.g., the program 640) including one or more instructions that are stored in a storage medium (e.g., internal memory 636 or external memory 638) that is readable by a machine (e.g., the electronic device 601). For example, a processor(e.g., the processor 620) of the machine (e.g., the electronic device 601) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. According to an embodiment, one or more of the above-described components may be omitted, or one or more other components may be added. Alternatively or additionally, a plurality of components (e.g., modules or programs) may be integrated into a single component. In such a case, according to an embodiment, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

Figure 7:
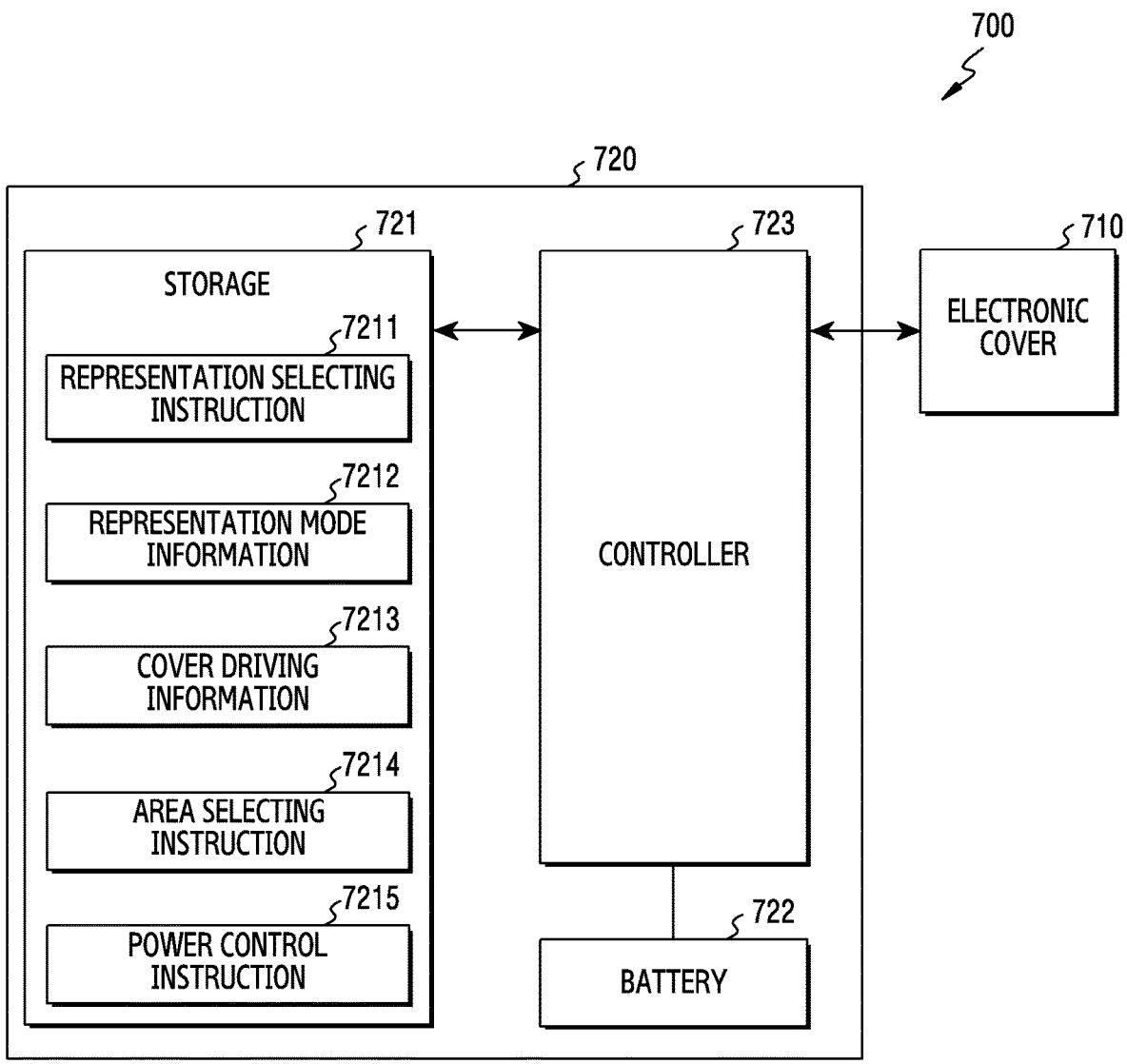
FIG. 7 is a block diagram illustrating an electronic device including an electronic cover according to an embodiment.

FIG. 7 is a block diagram illustrating an electronic device including an electronic cover according to an embodiment.

Referring to FIG. 7, an electronic device 700 may include an electronic cover 710 and a circuit 720 electrically coupled thereto.

The electronic cover 710 may constitute at least part of an exterior of the electronic device 700. According to an embodiment, the electronic device 700 may be the electronic device 300 of FIGS. 3A and 3B, the electronic device 500 of FIG. 5, or the electronic device 601 of FIG. 6. The electronic cover 710 may be the second cover 310-2 of FIG. 3B or the second cover 510-2 of FIG. 5. According to an embodiment, the electronic cover 710 may be the electronic cover 100 of FIGS. 1A and 1B. For example, when external light is reflected on the electronic cover and enters a user's eye, a representation depending on the electronic cover may be visible to the user. According to an embodiment, the electronic cover 710 may include a bottom layer (e.g., the second layer 120 of FIG. 1A) having at least one color, and the external light may be reflected from the bottom layer 120 and emitted to the outside. According to an embodiment, the bottom layer 120 may include a plurality of areas, and may have a color for each area. According to an embodiment, the electronic cover 710 may include a top layer (e.g., the first layer 110 of FIG. 1A) for adjusting an amount of reflected light transmitted to the outside. According to an embodiment, when the controller 723 electrically controls the electronic cover 710, a light transmittance for a plurality of areas of the top layer 110 may be selectively adjusted. By individually adjusting the light transmittance for the plurality of areas of the top layer 110, various representations (e.g., color, density, depth, pattern, etc.) of the electronic cover 710 may be visible to a user.

According to an embodiment, the circuit 720 may include a storage 721, a battery 722, and a controller 723. The storage 721 may store data, application programs, algorithms, or the like corresponding to various user functions and various basic operating systems required to operate the electronic device 700. According to an embodiment, the storage 721 may include at least part of the memory 630 of FIG. 6. According to an embodiment, the controller 723 (e.g., the processor 520 of FIG. 6) may be electrically coupled to the storage 721, and may perform various operations related to the electronic cover 710 according to instructions included in the storage 721. According to an embodiment, although not shown, the electronic device 700 may be designed to further include elements such as the display device 660, sensor module 676, camera module 680, communication module 690, or the like of FIG. 6, and the storage 721 may include instructions related to various operations related to these elements.

According to an embodiment, the storage 721 may store a representation selecting instruction 7211. The representation selecting instruction 7211 may include a routine for selecting a representation (hereinafter, a cover representation or a representation mode) to be viewed to the user through the electronic cover 710 on the basis of a user input.

According to an embodiment, the user input regarding the selecting of the representation mode may be generated in an input device (e.g., 650 of FIG. 6). The input may include a touch input, hovering input, pressure input, or the like generated in a display device (e.g., 660 of FIG. 6). For example, the controller 723 may display a list (e.g., a color list, a transparency list, a pattern list, etc.) regarding the presentation mode through a screen of the electronic device 700. At least one list entry may be selected from the list by the user input. The controller 723 may select a representation mode corresponding to a list entry selected by the user input.

According to an embodiment, the user input regarding the selecting of the representation mode may include an input related to a sound obtained through an audio module (e.g., 670 of FIG. 6). For example, the controller 723 may sense a voice input from the audio module, and may select a corresponding representation mode based on the sensed voice input.

According to an embodiment, the representation selecting instruction 7211 may include a routine for selecting a representation mode on the basis of an executed application (e.g., the application 646 of FIG. 6). For example, when content (e.g., music) is reproduced through a multimedia reproducing application, the controller 723 may select a corresponding representation mode. For example, when a camera application using a camera (e.g., 3881 of FIG. 3B) is executed, the controller 723 may select a corresponding representation mode.

According to an embodiment, the representation selecting instruction 7211 may include a routine for selecting a representation mode automatically when a pre-set condition is satisfied or a certain operation is performed, based on a trigger.

According to an embodiment, the trigger regarding the selecting of the representation mode may relate to a signal through a communication module (e.g., 690 of FIG. 6). According to an embodiment, the trigger regarding the selecting of the representation mode may relate to an input received from an external device (e.g., 602, 604, or 608 of FIG. 6). For example, when a call or a message is received, the controller 723 may select a corresponding representation mode. According to another embodiment, the trigger regarding the selecting of the representation mode may relate to position information (e.g., place) obtained through a communication module (e.g., GPS). For example, the controller 723 may obtain current position information through the communication module, and may select a representation mode based on the obtained position information. According to an embodiment, the trigger regarding the selecting of the representation mode may relate to weather information obtained through the communication module. For example, the controller 723 may obtain current weather information through the communication module, and may select a representation mode based on the obtained weather information.

According to an embodiment, the trigger regarding the selecting of the representation mode may relate to a time (e.g., hour, day, month, year). For example, if a current time is included in a set time (e.g., morning, afternoon, or a user set time), the controller 723 may select a corresponding representation mode. For example, when the current time reaches a time included in a schedule, the controller 723 may select a corresponding representation mode. For example, when the current time reaches a time included in an alarm, the controller 723 may select a corresponding representation mode. For example, when the current time reaches a time included in a reminder, the controller 723 may select a corresponding representation mode.

According to an embodiment, the trigger regarding the selecting of the representation mode may be obtained based on a detection value obtained from a sensor module (e.g., 676 of FIG. 6). For example, the controller 723 may select a corresponding representation mode on the basis of a detection value obtained from a gesture sensor, a gyro sensor, an atmospheric pressure sensor, a magnetic sensor, an acceleration sensor, a grip sensor, a proximity sensor, a color sensor (e.g., Red, Green, Blue (RGB) sensor), an InfraRed (IR) sensor, a biometric sensor, a temperature sensor, a humidity sensor, an illuminance sensor, or an Ultra-Violet (UV) sensor. For example, the controller 723 may select a corresponding representation mode on the basis of a detection value obtained from an e-nose sensor, an ElectroMyoGraphy (EMG) sensor, an ElectroEncephaloGram (EEG) sensor, an ElectroCardioGram (ECG) sensor, an Infrared (IR) sensor, an iris sensor, or a fingerprint sensor. For example, the controller 723 may select a corresponding representation mode according to an illumination value obtained from the illumination sensor.

According to an embodiment, the storage 721 may store representation mode information 7212. According to an embodiment, the representation mode information 7212 may include information regarding various representation modes as a combination of a color representation, a transparency representation, a pattern representation, or the like. According to an embodiment, a representation mode selected by the controller 723 under the representation selection instruction 7211 may be at least part of various representation modes.

According to an embodiment, the storage 721 may store cover driving information 7213. The cover driving information 7213 may include settings of the electronic cover 710 (hereinafter, cover settings) for various representation modes. The controller 723 may select a corresponding cover setting based on the selected representation mode under the representation selection instruction 7211.

According to an embodiment, the storage 721 may store an area selecting instruction 7214. The area selecting instruction 7214 may include a routine for selecting at least one of a plurality of areas of the electronic cover 710 on the basis of the selected cover setting. In an embodiment, referring to FIGS. 1A and 1B, each area may include the second electrode 1121-N aligned with the color filter 1211-N. The controller 723 may select the second electrode 1121-N corresponding to the selected area under the area selecting instruction 7213.

According to an embodiment, the storage 721 may store a power control instruction 7215. The power control instruction 7215 may include a routine for controlling power for selected at least one area. On the basis of the selected cover setting, the controller 723 may control power for the selected at least one of the second electrode 1121-N and the first electrode layer 111. According to an embodiment, strength of an electrical field for at least one area may be adjusted based on a corresponding representation mode.

The battery 722 may be electrically coupled to the controller 723, and the controller 723 may supply power to the electronic cover 710 by using the battery 722.

According to an embodiment, although not shown, the controller 723 may be divided into a part for executing the representation selecting instruction 7211, a part for executing the area selecting instruction 7214, or a part for executing the power control instruction 7215. According to an embodiment, the controller 723 may be designed to include at least one of the representation selecting instruction 7211, the area selecting instruction 7214, the power control instruction 7215, the representation mode information 7212, and the cover driving information 7213.

According to an embodiment, the electronic cover 710 may be designed to include, for example, a cover control circuit having switches (e.g., transistors or TFTs) electrically coupled to each area. The cover control circuit may be electrically coupled to the controller 723, and the controller 723 may control the cover control circuit under the area selecting instruction 714 and the power control instruction 7215. According to another embodiment, the cover control circuit may be designed to be included in the controller 723. According to an embodiment, the cover control circuit may be designed to be included in the circuit 720, as an element (e.g., the power management module 688 of FIG. 6) separate from the controller 723.

According to an embodiment, the electronic device 700 may further include various elements (or modules) depending on a type of providing it. These elements may be modified in various manners along with the convergence trend of digital devices, and thus not all such components may be listed herein, but components of the same level as that of the aforementioned components may be further included in the electronic device 700. This will be easily understood by those ordinarily skilled in the art.

According to an embodiment of the disclosure, an electronic cover (e.g., 100 of FIG. 1A) may include the light-transmissive first electrode layer 111 and the light-transmissive second electrode layer 112 disposed below the first electrode layer 111. The electronic cover 100 may include the liquid crystal layer 113 disposed between the first electrode layer 111 and the second electrode layer 112 and including the liquid crystal 113*a* reacting to an electrical field generated when power is supplied to the first electrode layer 111 and the second electrode layer 112. The electronic cover 100 may include the color layer 121 disposed below the second electrode layer 112 and including a light-transmissive color material. The electronic cover 100 may include the reflective layer 122 disposed below the color layer 121 and including a light-reflective material.

According to an embodiment of the disclosure, the color layer (e.g., 121 of FIG. 1A) may include a plurality of color filters (e.g., 1211 of FIG. 1A) arranged in a striped structure.

According to an embodiment of the disclosure, the plurality of color filters (e.g., 1211 of FIG. 1A) may include light-transmissive materials having the same color.

According to an embodiment of the disclosure, the color layer (e.g., 121 of FIG. 1A) may include a structure in which a series of sets including at least two color filters of different colors are repeatedly arranged.

According to an embodiment of the disclosure, the second electrode layer (e.g., 112 of FIG. 1A) may be aligned with the plurality of color filters 1211, and may include a plurality of electrodes (e.g., 1121 of FIG. 1A) arranged in the striped structure.

According to an embodiment of the disclosure, the first electrode layer (e.g., 111 of FIG. 1A) may include a common electrode extended to cover the plurality of electrodes 1121.

According to an embodiment of the disclosure, the electronic cover (e.g., 100 of FIG. 1A) may further include a plurality of switches electrically coupled to the common electrode and the plurality of electrodes (e.g., 1121 of FIG. 1A) and adjusting strength of power supplied to the common electrode and the plurality of electrodes.

According to an embodiment of the disclosure, the switches may include Thin Film Transistors (TFTs).

According to an embodiment of the disclosure, the liquid crystal (e.g., 113*a* of FIG. 1A) may be divided into a plurality of portions (e.g., 113*c* of FIG. 1A) aligned with the plurality of electrodes (e.g., 1121 of FIG. 1A).

According to an embodiment of the disclosure, the electronic device (e.g., 100 of FIG. 1A) may further include a light-transmissive layer (e.g., the third layer 130) disposed between the second electrode layer (e.g., 112 of FIG. 1A) and the color layer (e.g., 121 of FIG. 1A).

According to an embodiment of the disclosure, the electronic cover (e.g., 100 of FIG. 1A) may further include a light-transmissive layer (e.g., the fourth layer 140 or fifth layer 150 of FIG. 1A) disposed above the first electrode layer (e.g., 111 of FIG. 1A).

According to an embodiment of the disclosure, an electronic device (e.g., 300 of FIG. 3A, 500 of FIG. 5, 601 of FIG. 6, or 700 of FIG. 7) may include a housing (e.g., 310 of FIG. 3A) including the first face 3001 facing a first direction (e.g., 30011 of FIG. 3A), the second face 3002 facing a second direction (e.g., 30021 of FIG. 3B) opposite to the first direction, and a third face (e.g., 3003 of FIG. 3A) surrounding a space between the first face 3001 and the second face 3002. The electronic device may include a display (e.g., 530 of FIG. 5) disposed inside the housing 310 and disposed along the first face 3001 and at least part of the third face 3003. The electronic device may include an electronic cover (e.g., the second cover 310-2 of FIG. 3B or the second cover 510-2 of FIG. 5) disposed inside the housing 310 and disposed along at least part of the second face 3002. The electronic device may include a power management module (e.g., 688 of FIG. 6) electrically coupled with the display 530 and the electronic cover 310-2 or 510-2. The electronic cover 310-1 or 510-2 may include a light-transmissive first electrode layer (e.g., 111 of FIG. 1A) disposed between the first face 3001 and the second face 3002. The electronic cover 310-1 or 510-2 may include a light-transmissive second electrode layer (e.g., 112 of FIG. 1A) disposed between the first face 3001 and the second electrode layer 111. The electronic cover 310-1 or 510-2 may include a liquid crystal layer (e.g., 113 of FIG. 1A) including a liquid crystal (e.g., 113a of FIG. 1A). The liquid crystal layer 113 may be disposed between the first electrode layer 111 and the second electrode layer 112. The liquid crystal 113a of the liquid crystal layer 113 may react to an electrical field generated when the power management module 688 supplies power to the first electrode layer 111 and the second electrode layer 112. The electronic cover 100 may include a color layer (e.g., 121 of FIG. 1A) disposed between the first face 3001 and the second electronic layer 112. The color layer 121 may include a light-transmissive color material. The electronic cover 100 may include a reflective layer (e.g., 122 of FIG. 1A) disposed between the first face 3001 and the color layer 121. The reflective layer 122 may include a light-reflective material.

According to an embodiment of the disclosure, the color layer (e.g., 121 of FIG. 1A) may include a plurality of color filters (e.g., 1211 of FIG. 1A) arranged in a striped structure.

According to an embodiment of the disclosure, the second electrode layer (e.g., 112 of FIG. 1A) may include a plurality of electrodes (e.g., 1211 of FIG. 1A) aligned with the plurality of color filters 1211. The plurality of electrodes may be arranged in the striped structure.

According to an embodiment of the disclosure, the first electrode layer (e.g., 111 of FIG. 1A) may include a common electrode extended to cover the plurality of electrodes 1121.

According to an embodiment of the disclosure, the electronic device may include switches electrically coupled to the common electrode (e.g., the first electrode layer 111 of FIG. 1A) and the plurality of electrodes (e.g., 1121 of FIG. 1A). The switches may adjust power supplied to the common electrode 111 and the plurality of electrodes 1121.

According to an embodiment of the disclosure, the switches may be included in the power management module (e.g., 688 of FIG. 6), or may be included in the electronic cover (e.g., the second cover 310-2 of FIG. 3B or the second cover 510-2 of FIG. 5).

According to an embodiment of the disclosure, the switches may be Thin Film Transistors (TFTs) included in the electronic cover (e.g., 100 of FIG. 1A).

According to an embodiment of the disclosure, the liquid crystal (e.g., 113a of FIG. 1A) may be divided into a plurality of portions (e.g., 113c of FIG. 1A) aligned with the plurality of electrodes (e.g., 1121 of FIG. 1A).

According to an embodiment of the disclosure, the electronic device may include a processor (e.g., 520 of FIG. 6 or the controller 723 of FIG. 7) electrically coupled to the display (e.g., 530 of FIG. 5), the electronic cover (e.g., the second cover 310-2 of FIG. 3B or the second cover 510-2 of FIG. 5), and the power management module (e.g., 688 of FIG. 6). The processor may control the power management module 688 to adjust power supplied to at least part of the plurality of electrodes (e.g., 1121 of FIG. 1A), based at least in part on a user input, an executed application, or a set trigger.

Figure 8:
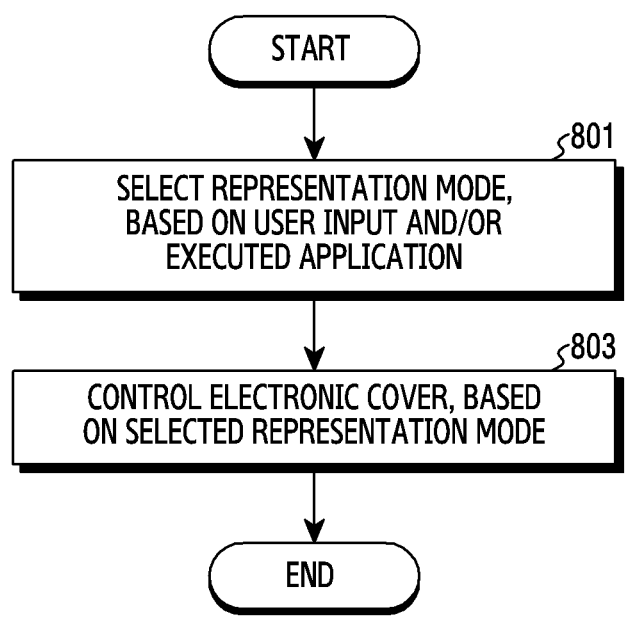
FIG. 8 illustrates an operational flow for a cover in an electronic device including an electronic cover according to an embodiment.

FIG. 8 illustrates an operational flow for a cover in an electronic device including an electronic cover according to an embodiment. According to an embodiment, the electronic device may include at least part of the electronic device 300 of FIGS. 3A and 3B, the electronic device 500 of FIG. 5, the electronic device 601 of FIG. 6, or the electronic device 700 of FIG. 7. FIGS. 9A, 9B, 10, 11A, 11B, 11C, 11D, 12A, 12B, 12C, 13A, 13B, 13C, 14A, 14B, 15A, 15B, and 15C are drawings for explaining an operational flow of FIG. 8 according to an embodiment.

Referring to FIG. 8, in operation 801, a controller (e.g., the controller 723 of FIG. 7 or the processor 620 of FIG. 6) (hereinafter, the controller 723) may select a representation mode based at least in part on a user input and/or an executed application.

In operation 803, the controller 723 may electrically control an electronic cover (e.g., the electronic cover 100 of FIGS. 1A and 1B, the second cover 310-2 of FIG. 3B, or the second cover 510-2 of FIG. 5), based on the selected representation mode.

According to an embodiment, the electronic device may include cover settings (e.g., cover driving information 7213 of FIG. 7) for various representation modes. The controller 723 may select a corresponding cover setting from among a plurality of cover settings, based at least in part on the user input and/or the executed application. According to an embodiment, the controller 723 may select at least one of a plurality of areas of the electronic cover on the basis of the selected cover setting. In an embodiment, referring to FIGS. 1A and 1B, each area may include the second electrode 1121-N aligned with the color filter 1211-N. The controller 723 may select the second electrode 1121-N corresponding to an area based on the selected cover setting. The controller 723 may control power for the selected at least one area, based on the selected cover setting. The operation 803 of controlling power for at least one area of the electronic cover may be defined as an operation of controlling an electrical field for at least one area of the electronic cover. The operation 803 of controlling power for at least one area of the electronic cover may be defined as an operation of adjusting a light transmittance for at least one area of the electronic cover.

Figure 9A:
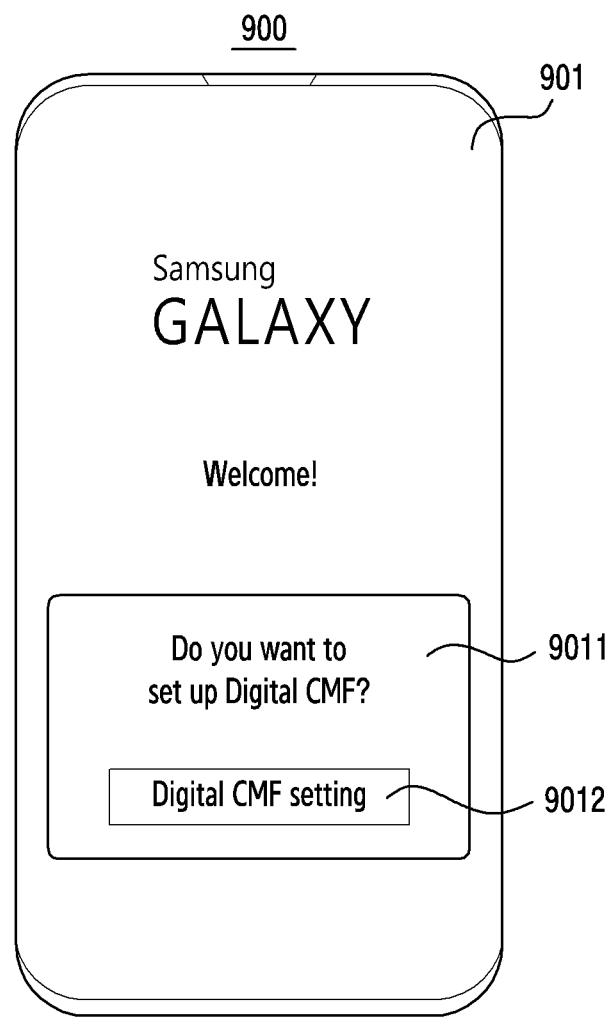
FIG. 9A is a drawing for explaining an operational flow of FIG. 8 according to various embodiments.
Figure 9B:
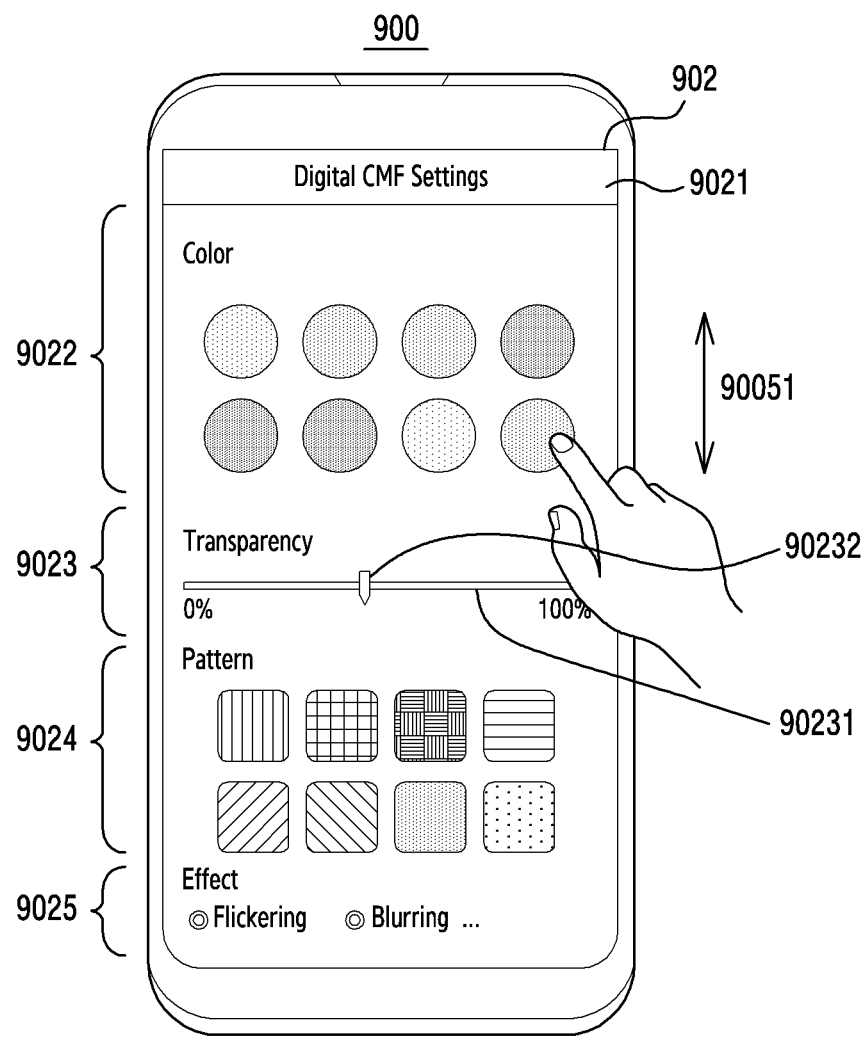
FIG. 9B is a drawing for explaining an operational flow of FIG. 8 according to various embodiments.

According to an embodiment, the controller 723 may select a representation mode on the basis of a user input, and may control the electronic cover on the basis of the selected representation mode. FIGS. 9A and 9B are exemplary drawings for explaining an operational flow of FIG. 8 according to an embodiment. An electronic device 900 of FIGS. 9A and 9B may include at least part of the electronic device 300 of FIGS. 3A and 3B, the electronic device 500 of FIG. 5, the electronic device 601 of FIG. 6, or the electronic device 700 of FIG. 7. Referring to FIG. 9A, the electronic device 900 ma provide a first screen 901. According to an embodiment, the first screen 901 may include an alert phrase 9011 indicated as 'Do you want to set up Digital CMF?' and a button 9012 indicated as 'Digital CMF setting'. The word 'CMF' implies 'color material finishing', and may indicate a representation mode of the electronic cover. The first screen 901 may be a prompt screen which guides a user when entering a mode for setting the electronic cover (hereinafter, a cover setting mode). When the button 9012 is selected by a touch, the controller 723 may enter the cover setting mode, and may switch to a second screen 902 of FIG. 9B. Referring to FIG. 9B, the second screen 902 may include a first area 9021, a second area 9022, a third area 9023, a fourth area 9024, and a fifth area 9025, arranged in a lengthwise direction 90051 (e.g., the fifth direction 30051 of FIG. 3B). According to an embodiment, the cover setting mode may correspond to an initial setting processor performed after the electronic device 900 is initially powered on. According to an embodiment, the cover setting mode may correspond to a user environment setting process performed when the user desires after the initial setting process. The first area 9021 may be a status bar, and may display, for example, a phrase 'Digital DMF settings' indicating an electronic cover setting mode. The second area 9022 may be an area displaying a color list. The color list may include color list entries indicating various colors. Without being limited to FIG. 9, the color list entries may be displayed as various types of Graphical User Interface (GUI) elements. According to an embodiment, in the presence of different color list entries that can be displayed through a scroll, the controller 723 may set the second area 9022 as a scrollable area. For example, when a set gesture input (e.g., flicking, swiping, dragging, etc.) is sensed on the second area 9022, the controller 723 may scroll the area such that different color list entries are displayed. The third area 9023 may be a control area for adjusting transparency. According to an embodiment, the controller 723 may include a control bar 90231 for transparency in the range of 0 to 100% through the third area 9023, and a control 90232 movable on the control bar 90231. GUI elements for adjusting the transparency are not limited to FIG. 9B, and may be disposed as other types of GUI elements. The fourth area 9024 may be an area for displaying a pattern list. The pattern list may include pattern list entries indicating various patterns. The pattern list entries are not limited to FIG. 9B, and may be displayed as various types of GUI elements. According to an embodiment, in the presence of different pattern list entities that can be displayed through a scroll, the controller 723 may set the fourth area 9024 as a scrollable area. The fifth area 9025 may be an area for displaying an effect list. The effect list may include effect list entries indicating various effects (e.g., flickering, blurring, etc.). According to an embodiment, although not shown, the second area 9022, the third area 9023, the fourth area 9024, and the fifth area 9025 may be designed with different arrangements. According to an embodiment, although not shown, the second screen 9022 may be designed to further include another area for providing a list regarding another representation.

When a corresponding color list entry is touched in the second area 9022, the controller 723 may determine a color corresponding to the touched color list entry as a color representation of the electronic cover. When a touch input (e.g., dragging) for moving the control 90232 according to the control bar 90231 is sensed in the third area 9023, the controller 723 may determine transparency based on a position of the control 90232 as a transparency representation of the electronic cover. When a corresponding pattern list entry is touched in the fourth area 9024, the controller 723 may determine a pattern corresponding to the touch pattern list entry as a pattern representation of the electronic cover. When a corresponding effect list is touched in the fifth area 9025, the controller 723 may determine an effect corresponding to the touched effect list entry as an effect representation of the electronic cover. When an electronic cover setting mode ends after determining a corresponding color representation, transparency representation, pattern representation, effect representation, or the like, the controller 723 may electrically control the electronic cover on the basis of a representation mode including these representations.

Figure 10:
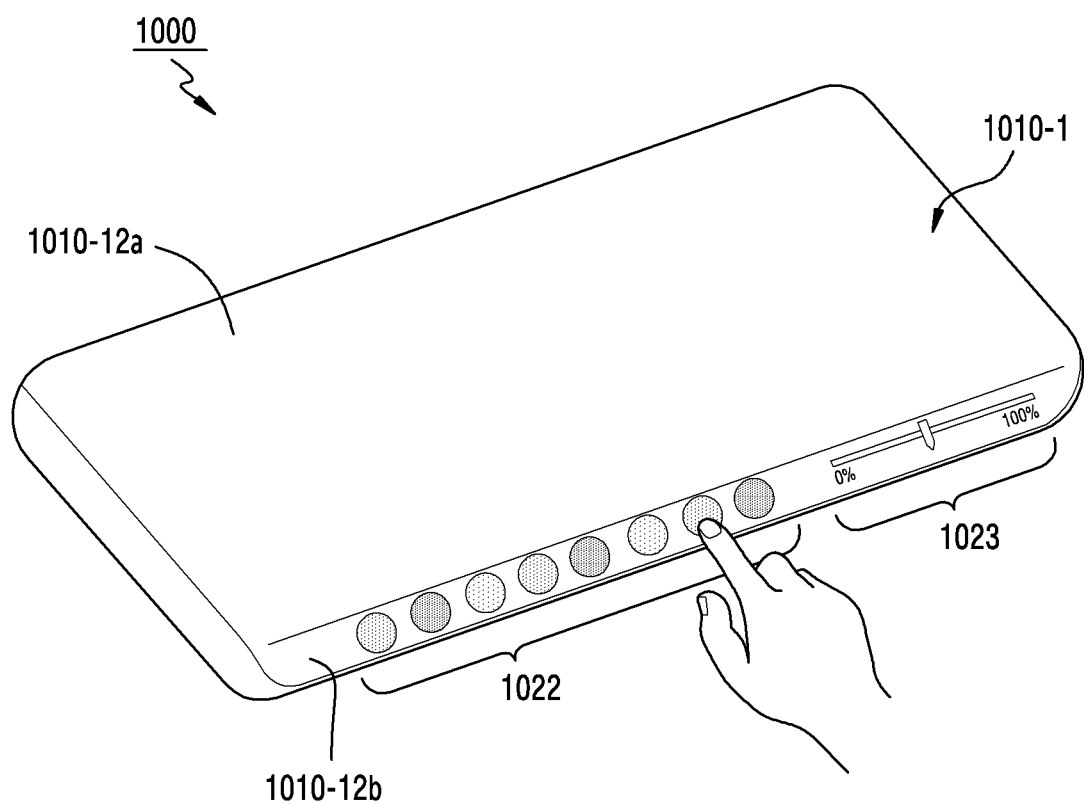
FIG. 10 is a drawing for explaining an operational flow of FIG. 8 according to various embodiments.

FIG. 10 is a drawing illustrating another example in which a representation mode is selected based on a user input, and an electronic cover is electrically controlled based on the selected representation mode. According to an embodiment, an electronic device 1000 may include the electronic device 500 of FIG. 5. Referring to FIG. 10, the electronic device 1000 may include an electronic cover 1010-1 (e.g., the second cover 510-1) including curved portions 1010-12a and 1010-12b of which both ends are bent. According to an embodiment, although not shown, the electronic cover 1010-1 may be designed to have the curved portion 1010-12b only at one side. The electronic device 1000 may include a display (e.g., 530 of FIG. 5) disposed along at least part of the first cover 1010-1. According to an embodiment, a portion of the display 530 may be disposed along the curved portion 1010-12b. According to an embodiment, in a cover setting mode, the electronic device 1010 may display a color list 1022 through an area of a display, covered by the curved portion 1010-12b. According to an embodiment, in the cover setting mode, the electronic device 1000 may display GUI elements 1023 (e.g., 90231, 90232 of FIG. 9B) for adjusting transparency through the area of the display, covered by the curved portion 1010-12b. According to an embodiment, although not shown, the electronic device 1000 may display a pattern list through the area of the display, covered by the curved portion 1010-12b. According to an embodiment, although not shown, the controller 723 may be designed to further display a pattern list, an effect list, or the like through the portion of the display, covered by the curved portion 1010-12b. The controller 723 may sense a touch input at the portion of the display, covered by the curved portion 1010-12b, and may determine a color representation or transparency representation to be viewed to a user through the electronic cover. When the electronic cover setting mode ends after determining a corresponding color representation and transparency representation, the controller 723 may electrically control the electronic cover on the basis of a cover setting corresponding to the selected color representation, transparency representation, pattern representation, effect representation, or the like.

Figure 11A:
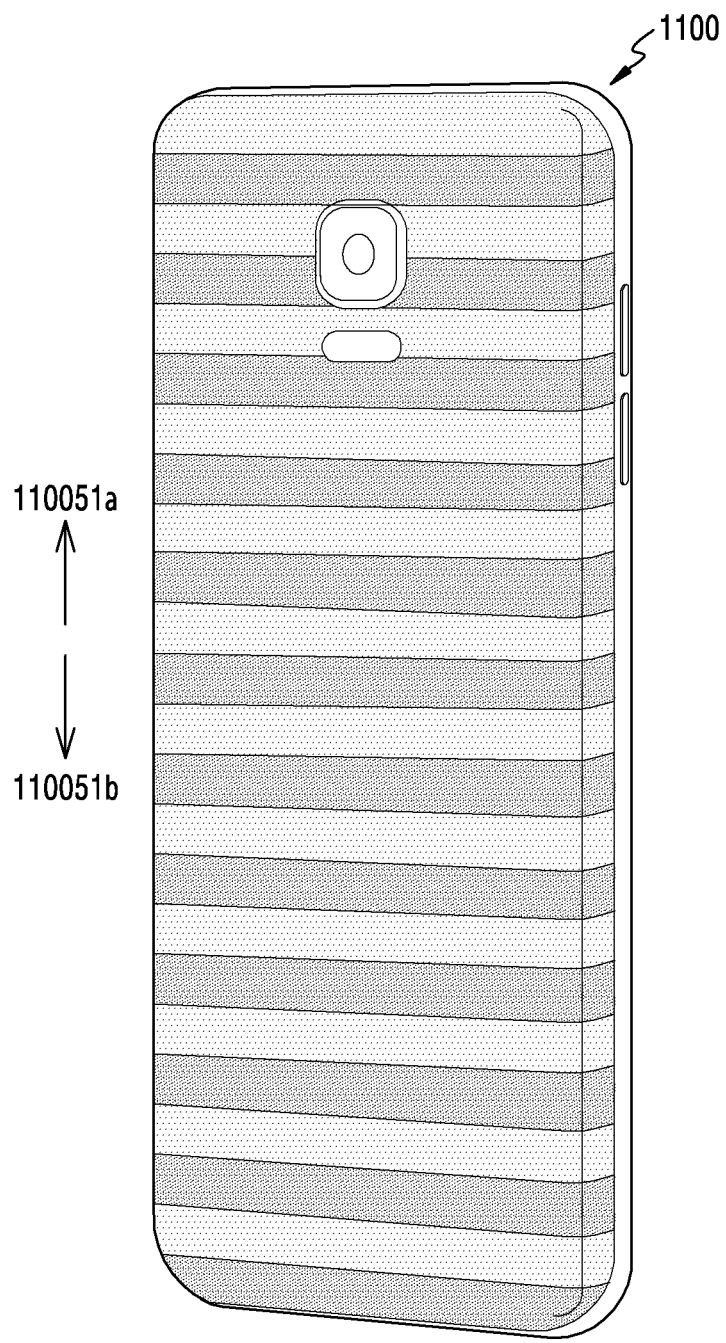
FIG. 11A is a drawing for explaining an operational flow of FIG. 8 according to various embodiments.
Figure 11B:
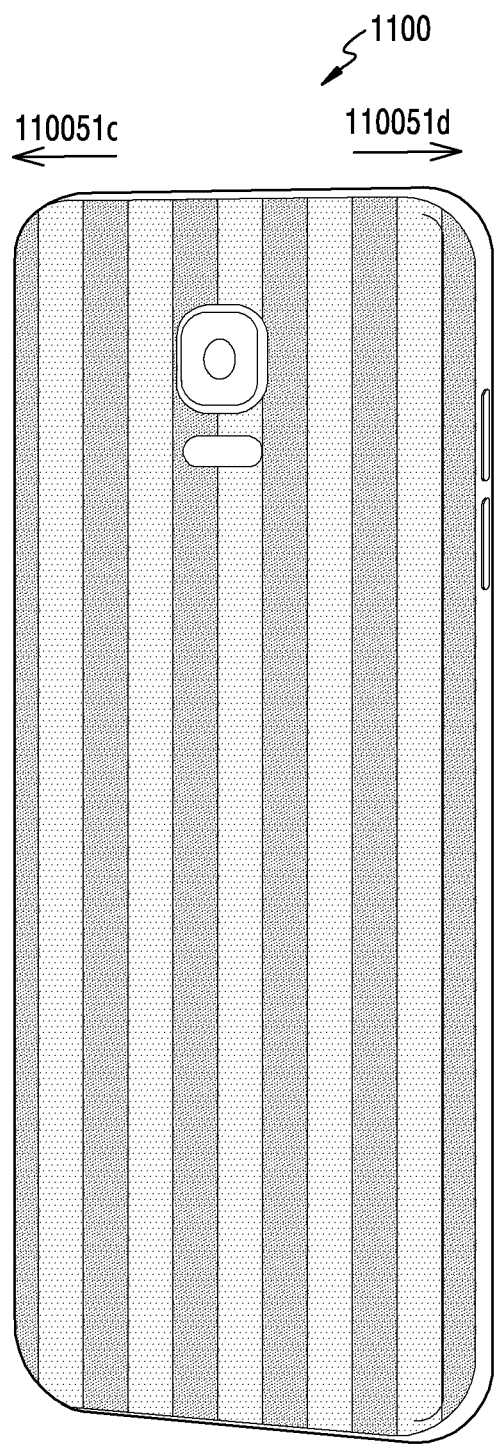
FIG. 11B is a drawing for explaining an operational flow of FIG. 8 according to various embodiments.

According to an embodiment, the controller 723 may select a representation mode on the basis of an executed application (e.g., the application 646 of FIG. 6), and may control the electronic cover on the basis of the selected representation mode. FIGS. 11A and 11B are exemplary drawings for explaining an operational flow of FIG. 8 according to an embodiment. According to an embodiment, an electronic device 1100 may include at least part of the electronic device 300 of FIGS. 3A and 3B, the electronic device 500 of FIG. 5, the electronic device 601 of FIG. 6, or the electronic device 700 of FIG. 7. Referring to FIGS. 11A, 11B, 11C, and 11D, when the electronic device 1100 reproduces content such as music, video, or the like through a multimedia reproducing application, the controller 723 may control an electronic cover on the basis of a corresponding representation mode. According to an embodiment, the controller 723 may vary the representation mode on the basis of a bit for reproducing the content.

For example, referring to FIG. 11A, when the content is reproduced faster than at least a set bit, the controller 723 may control the electronic cover so that a representation of a striped shape in which a first color and a second color are repeated in a first lengthwise direction 11005$1a$ or a second lengthwise direction 11005$1b$ is visible to a user. According to an embodiment, referring to FIG. 11A, when the content is reproduced faster than at least the set bit, the controller 723 may control the electronic cover so that a representation of a striped shape in which a first color and a second color are repeated and which moves in the first lengthwise direction 11005$1a$ or the second lengthwise direction 11005$1b$ is visible to the user.

For another example, referring to FIG. 11B, when the content is reproduced faster than at least the set bit, the controller 723 may control the electronic cover so that a representation of a striped shape in which a first color and a second color are repeated in a first widthwise direction 11005$1c$ or a second widthwise direction 11005$1d$ is visible to the user. According to an embodiment, referring to FIG. 11B, when the content is reproduced faster than at least the set bit, the controller 723 may control the electronic cover so that a representation of a striped shape in which a first color and a second color are repeated and which moves in the first widthwise direction 11005$1c$ or the second widthwise direction 11005$1d$ is visible to the user.

According to an embodiment, when the content is reproduced faster than at least the set bit, the electronic cover may be controlled such that the representation of FIG. 11A and the representation of FIG. 11B are visible to the user in a repeated manner.

Figure 11C:
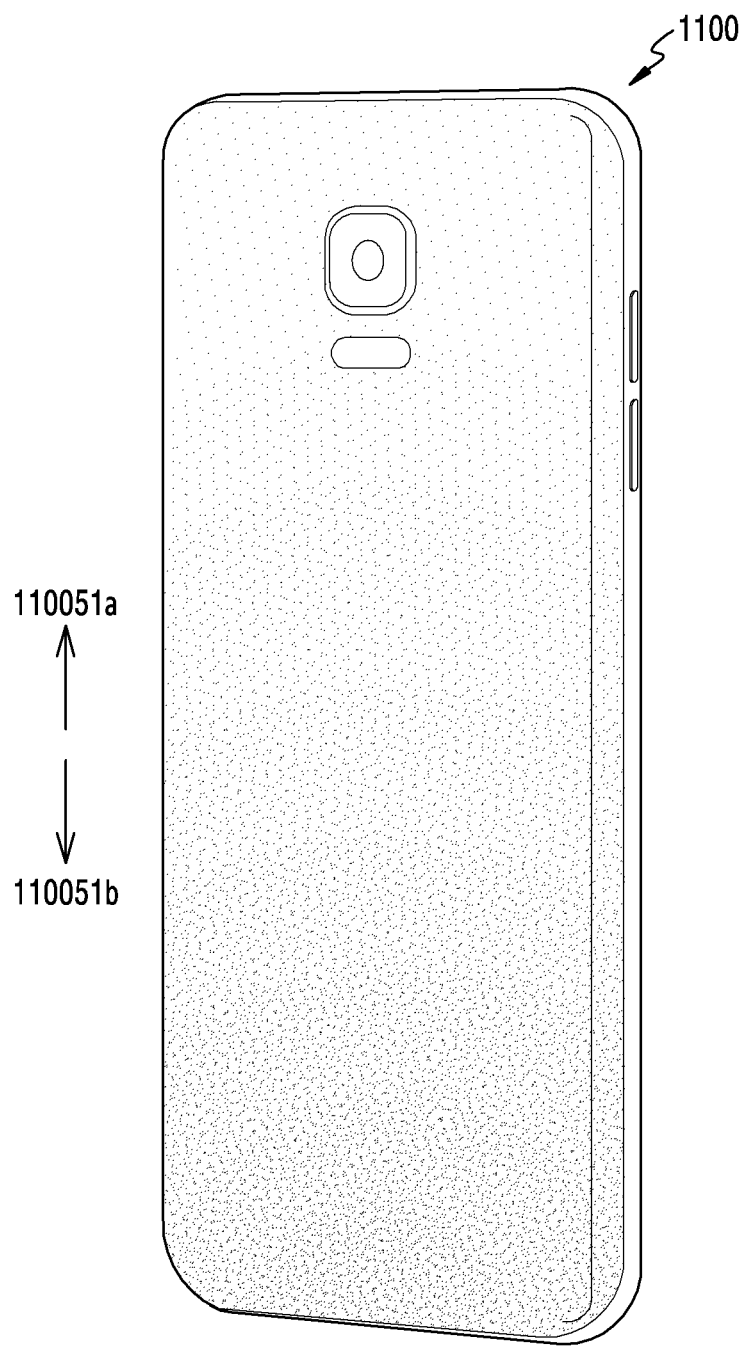
FIG. 11C is a drawing for explaining an operational flow of FIG. 8 according to various embodiments.

For example, referring to FIG. 11C, when the content is reproduced slower than the set bit, the controller 723 may control the electronic cover such that a representation in which a corresponding color is faded in the first lengthwise direction 11005$1a$ is visible to the user. For example, referring to FIG. 11D, when the content is reproduced slower than the set bit, the controller 723 may control the electronic cover so that a representation in which a corresponding color is faded in the second lengthwise direction 11005$1b$ is visible to the user.

Figure 11D:
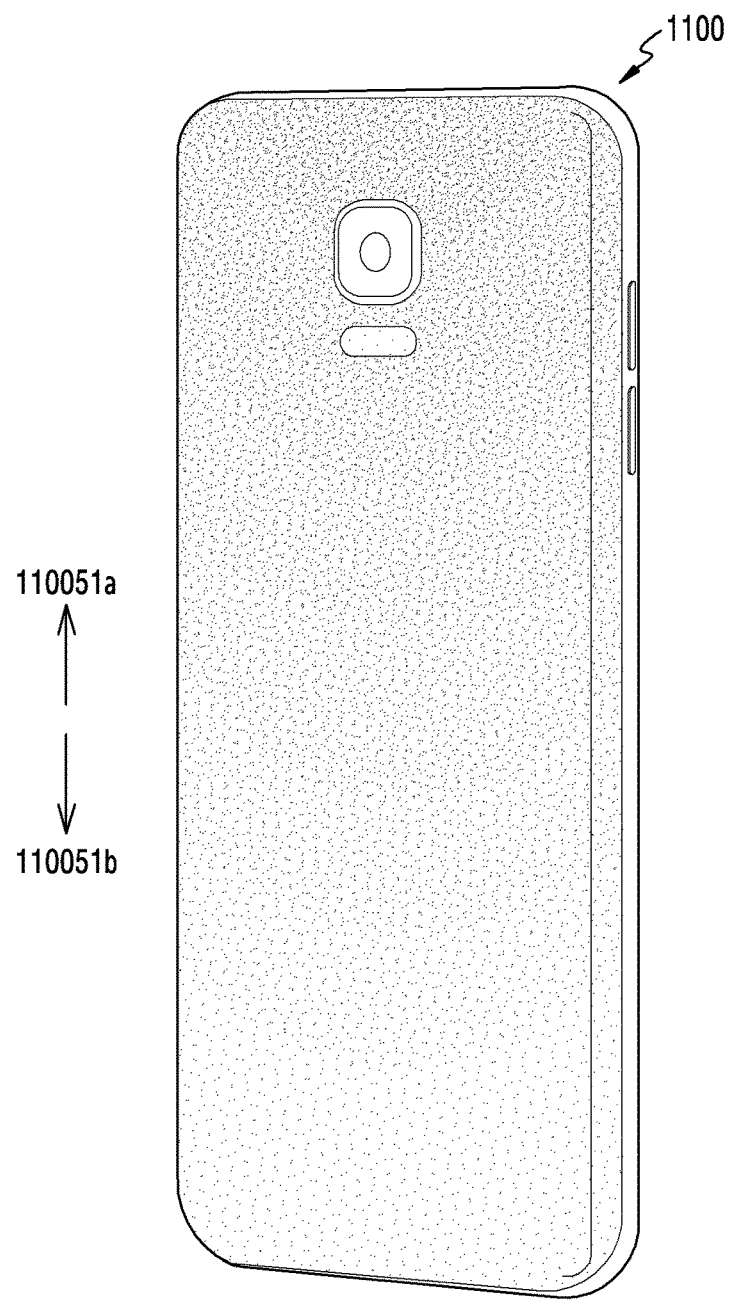
FIG. 11D is a drawing for explaining an operational flow of FIG. 8 according to various embodiments.

According to an embodiment, when the content is reproduced slower than the set bit, the controller 723 may control the electronic cover so that the representation of FIG. 11C and the representation of FIG. 11D are visible to the user in a repeated manner.

According to an embodiment, although not shown, when the content is reproduced slower than that set bit, the controller 723 may control the electronic cover so that a representation in which a corresponding color is faded in a widthwise direction (e.g., 11005$1a$ or 11005$1b$ of FIG. 11B) is visible to the user.

Figure 12A:
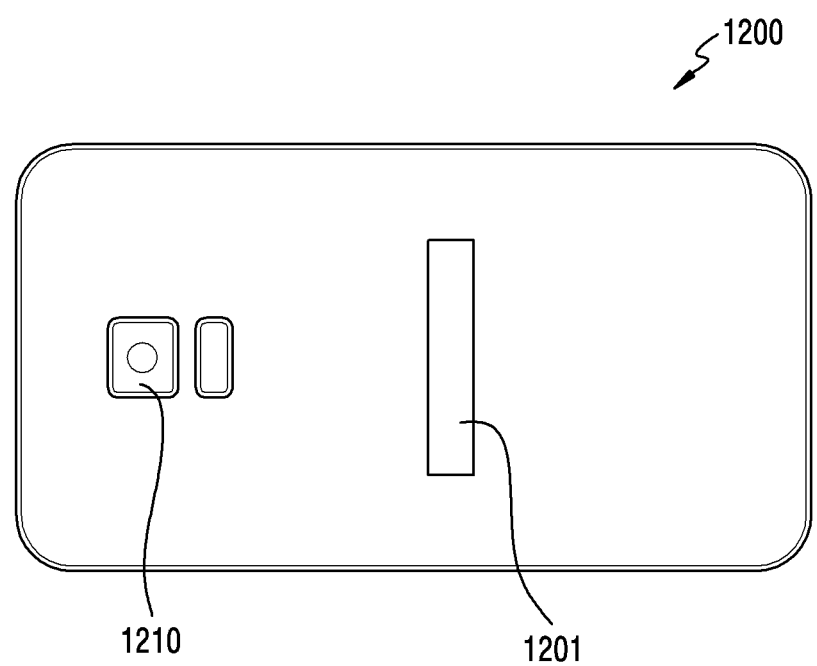
FIG. 12A is a drawing for explaining an operational flow of FIG. 8 according to various embodiments.
Figure 12B:
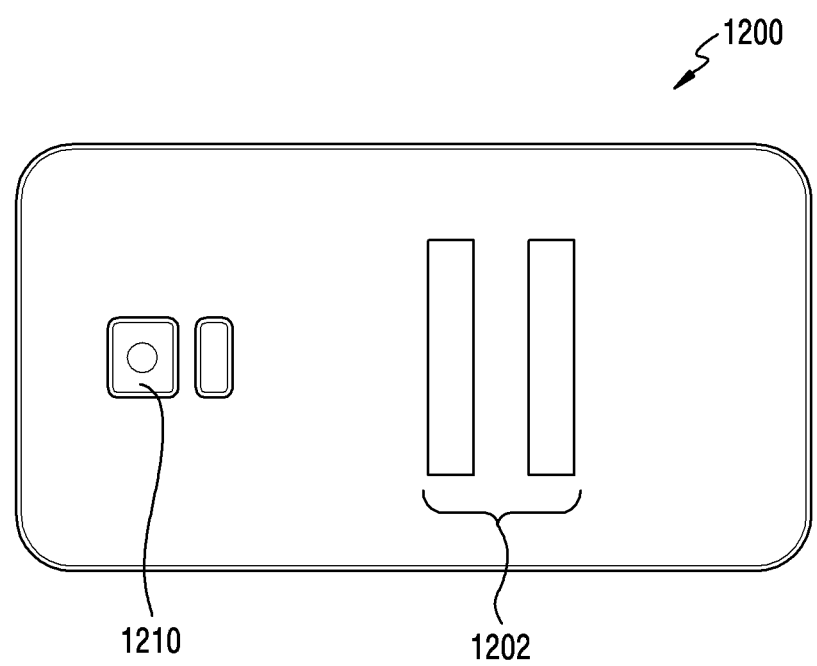
FIG. 12B is a drawing for explaining an operational flow of FIG. 8 according to various embodiments.
Figure 12C:
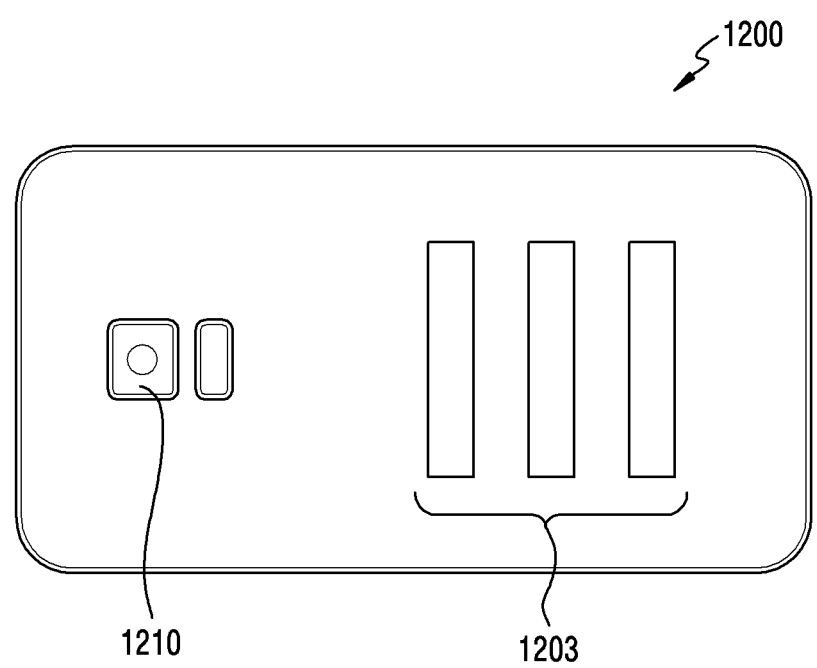
FIG. 12C is a drawing for explaining an operational flow of FIG. 8 according to various embodiments.

FIGS. 12A, 12B, and 12C are drawings illustrating another example in which a representation mode is selected based on an executed application, and an electronic cover is electrically controlled based on the selected representation mode. According to an embodiment, an electronic device 1200 may include at least part of the electronic device 300 of FIGS. 3A and 3B, the electronic device 500 of FIG. 5, the electronic device 601 of FIG. 6, or the electronic device 700 of FIG. 7. In an embodiment, the electronic device 1200 may execute a camera application (e.g., a still image capture application or a moving image capture application) which captures an object by using a camera 1210 (e.g., the rear facing camera 3881 of FIG. 3B). In FIGS. 12A, 12B, and 12C, when the camera application is executed, the controller 723 may control the electronic cover so that representations 1201, 1202, and 1203 similar to Roman numerals are visible to a user at the elapse of a set time (e.g., 1 second). The representations in FIGS. 12A, 12B, and 12C may relate to a timer function. For example, the representations in FIGS. 12A, 12B, and 12C may be used when the user recognizes a capture start time. The controller 723 may control the electronic cover so that the representation 1203 of FIG. 12C is visible to the user, and thereafter may capture an object by using the camera 1210.

Figure 13A:
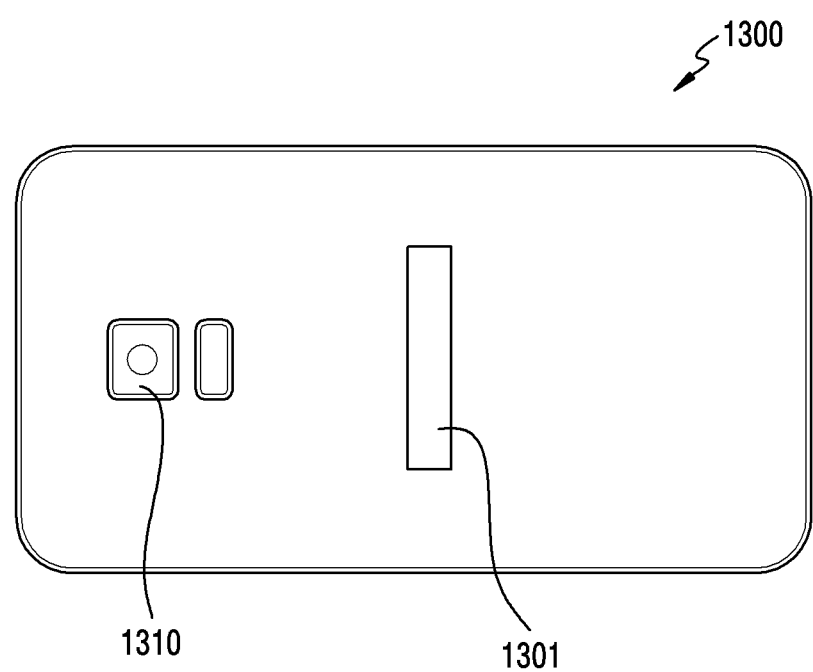
FIG. 13A is a drawing for explaining an operational flow of FIG. 8 according to various embodiments.
Figure 13B:
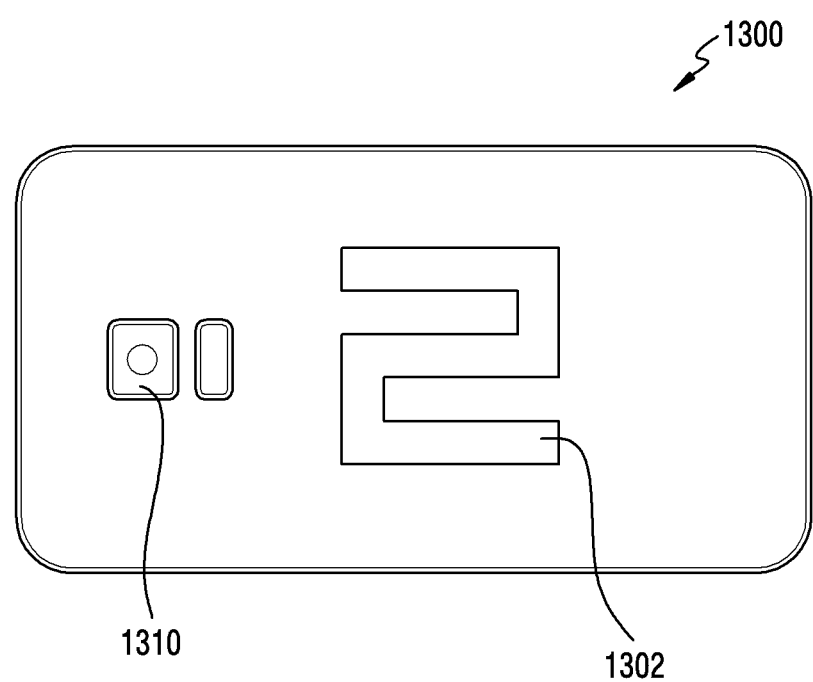
FIG. 13B is a drawing for explaining an operational flow of FIG. 8 according to various embodiments.
Figure 13C:
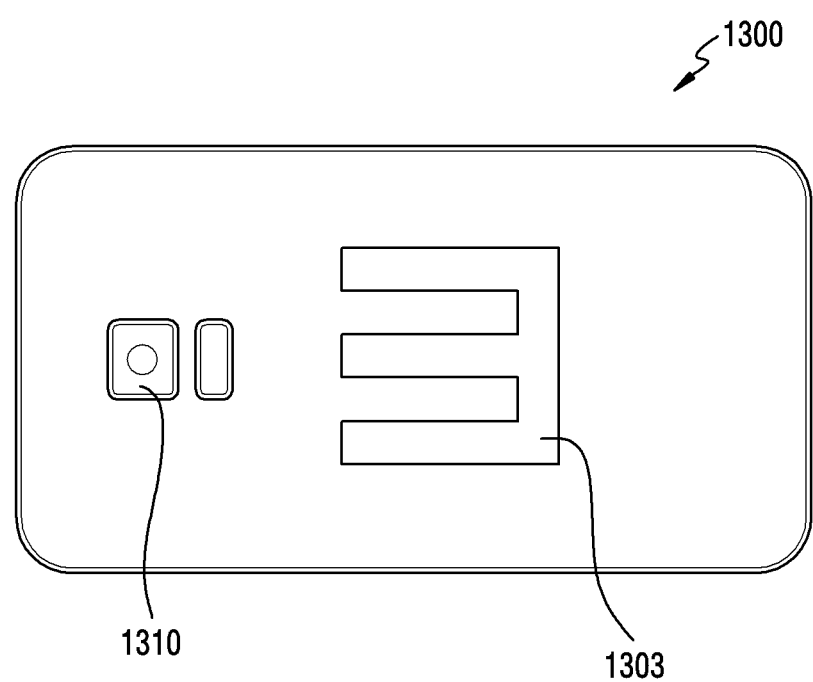
FIG. 13C is a drawing for explaining an operational flow of FIG. 8 according to various embodiments.

FIGS. 13A, 13B, and 13C are drawings illustrating another example in which a representation mode is selected based on an executed application, and an electronic cover is electrically controlled based on the selected representation mode. According to an embodiment, an electronic device 1300 may include at least part of the electronic device 300 of FIGS. 3A and 3B, the electronic device 500 of FIG. 5, the electronic device 601 of FIG. 6, or the electronic device 700 of FIG. 7. In an embodiment, the electronic device 1300 may execute a camera application which captures an object by using a camera 1310 (e.g., the rear facing camera 3881 of FIG. 3B). In FIGS. 13A, 13B, and 13C, when the camera application is executed, the controller 723 may control the electronic cover so that representations 1301, 1302, and 1303 similar to Roman numerals are visible to a user at the elapse of a set time (e.g., 1 second). For example, the representations in FIGS. 13A, 13B, and 13C may relate to a camera timer function as shown in FIGS. 12A, 12B, and 12C.

Figure 14A:
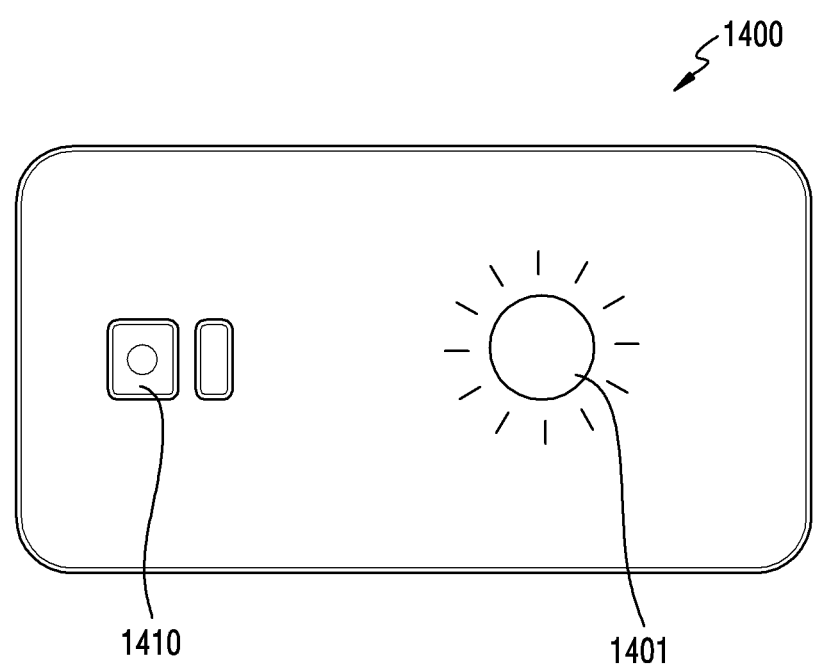
FIG. 14A is a drawing for explaining an operational flow of FIG. 8 according to various embodiments.
Figure 14B:
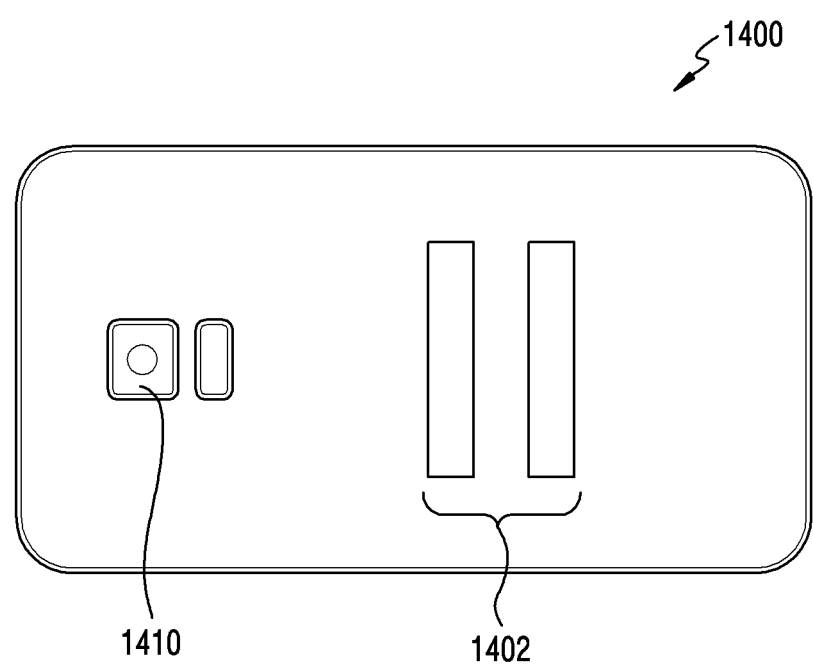
FIG. 14B is a drawing for explaining an operational flow of FIG. 8 according to various embodiments.

FIGS. 14A and 14B are drawings illustrating another example in which a representation mode is selected based on an executed application, and an electronic cover is electrically controlled based on the selected representation mode. According to an embodiment, an electronic device 1400 may include at least part of the electronic device 300 of FIGS. 3A and 3B, the electronic device 500 of FIG. 5, the electronic device 601 of FIG. 6, or the electronic device 700 of FIG. 7. In an embodiment, the electronic device 1400 may execute a camera application which captures an object by using a camera 1410 (e.g., the rear facing camera 3881 of FIG. 3B). In FIG. 14A, when a moving image is being captured, the controller 723 may control the electronic cover so that an indicator-related representation 1401 indicating this is visible to a user. In FIG. 14B, when a moving image is being captured, the controller 723 may control the electronic cover so that an indicator-related representation 1402 indicating this is visible to the user. According to an embodiment, the controller 723 may control the electronic cover so that the indicator-related representation 1401 or 1402 is visible to the user by using a flickering effect.

Figure 15A:
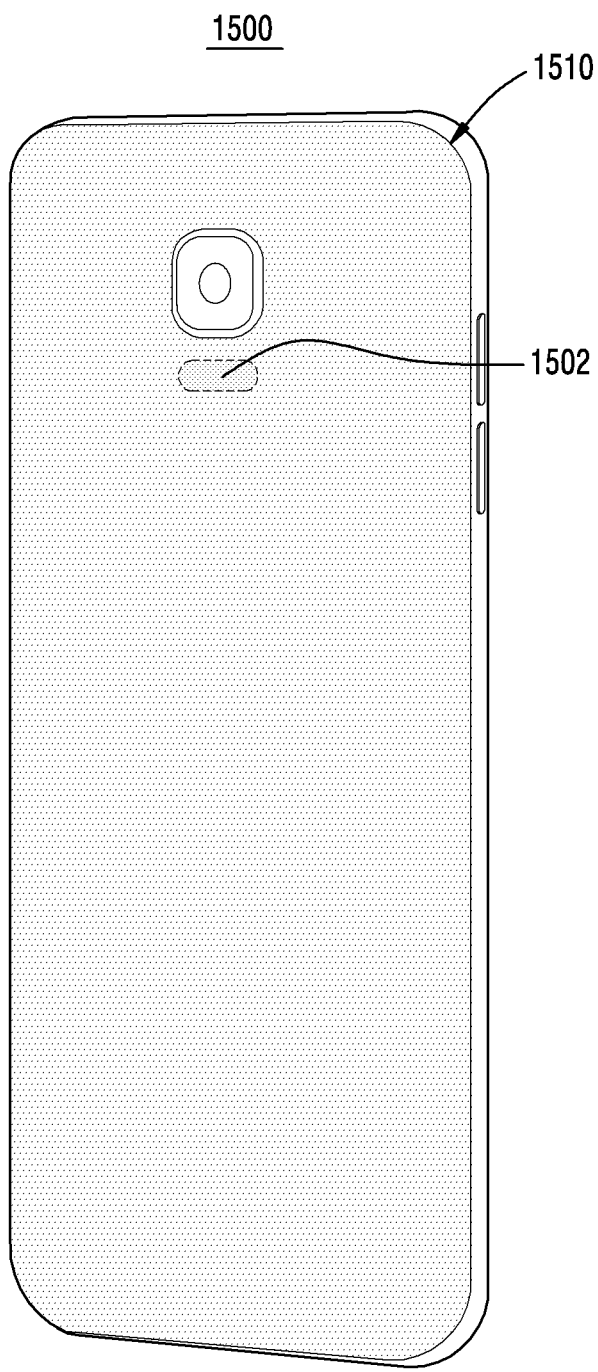
FIG. 15A is a drawing for explaining an operational flow of FIG. 8 according to various embodiments.
Figure 15B:
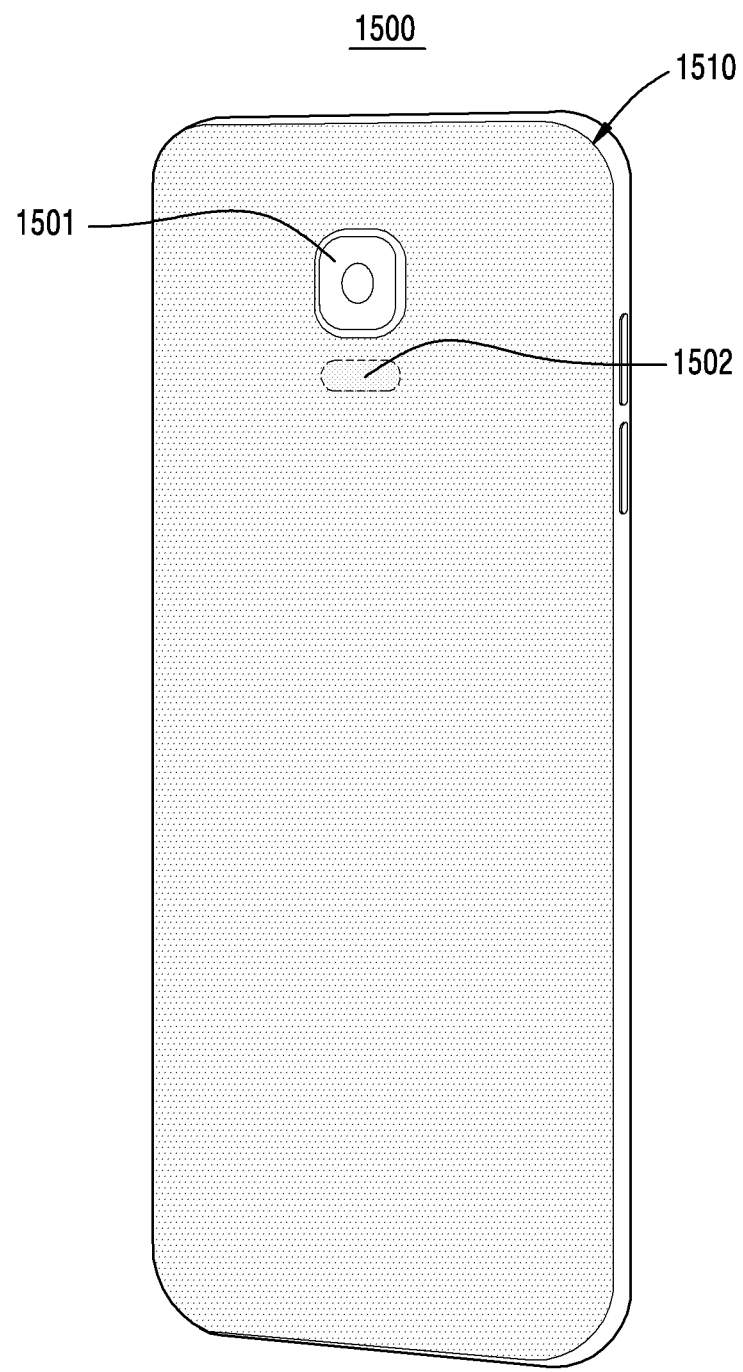
FIG. 15B is a drawing for explaining an operational flow of FIG. 8 according to various embodiments.
Figure 15C:
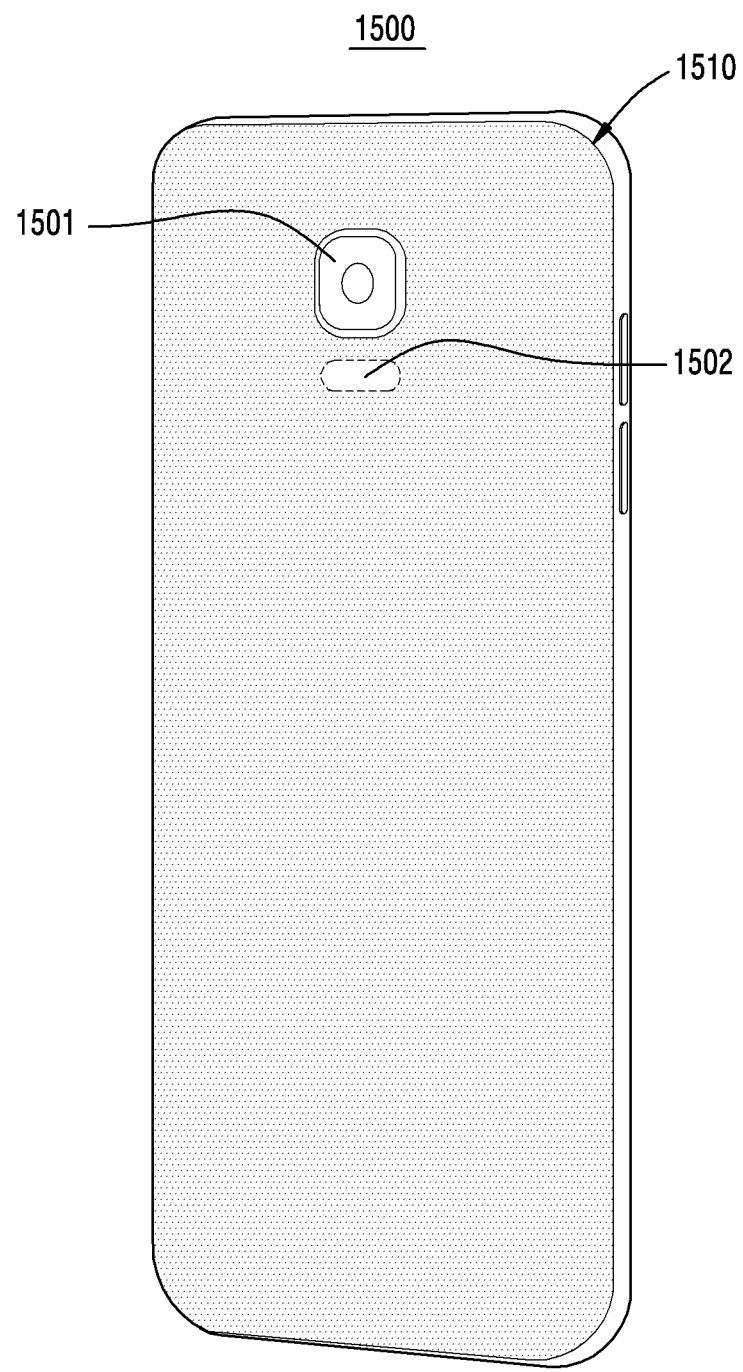
FIG. 15C is a drawing for explaining an operational flow of FIG. 8 according to various embodiments.

FIGS. 15A, 15B, and 15C are drawings illustrating another example in which a representation mode is selected based on an executed application, and an electronic cover is electrically controlled based on the selected representation mode. According to an embodiment, an electronic device 1500 may include at least part of the electronic device 300 of FIGS. 3A and 3B, the electronic device 500 of FIG. 5, the electronic device 601 of FIG. 6, or the electronic device 700 of FIG. 7. According to an embodiment, an electronic cover 1510 included in the electronic device 1500 may include the electronic cover 200 of FIG. 2. According to an embodiment, the electronic cover 1510 may include a groove (e.g., 201 of FIG. 2), and a flash (not shown) for a camera 1501 may be coupled to the groove. According to an embodiment, a portion (hereinafter, a flash cover area) 1502 of a first layer (e.g., 210 of FIG. 2) of the electronic cover 1510 may cover the flash. According to an embodiment, when a light transmittance of the flash cover area 1502 is adjusted, an amount of emitted light generated from the flash may be adjusted.

Referring to FIG. 15A, when a camera application is not executed, the controller 723 may control the electronic cover 1510 so that the flash cover area 1502 is visible to the user in a dark color substantially similarly to a surrounding area. According to an embodiment, in FIG. 15A, the controller 723 may cut off power for the flash cover area 1502 of the electronic cover 1510 or the entire area thereof. The flash may not be exposed to the outside due to the flash cover area represented in the dark color.

FIGS. 15B and 15C illustrate a state in which a camera application is executed. When an object is captured by using the camera 1501, the controller 723 may activate or deactivate the flash on the basis of an external illumination value obtained from a sensor module (e.g., 676 of FIG. 6). According to an embodiment, the controller 723 may adjust a light transmittance of the flash cover area 1502 on the basis of the external illumination value obtained from the sensor module. For example, the lower the external illumination value, the higher the light transmittance of the flash cover area 1502, set by the controller 723. For example, the higher the external illumination value, the lower the light transmittance of the flash cover area 1502, set by the controller 723.

Figure 16:
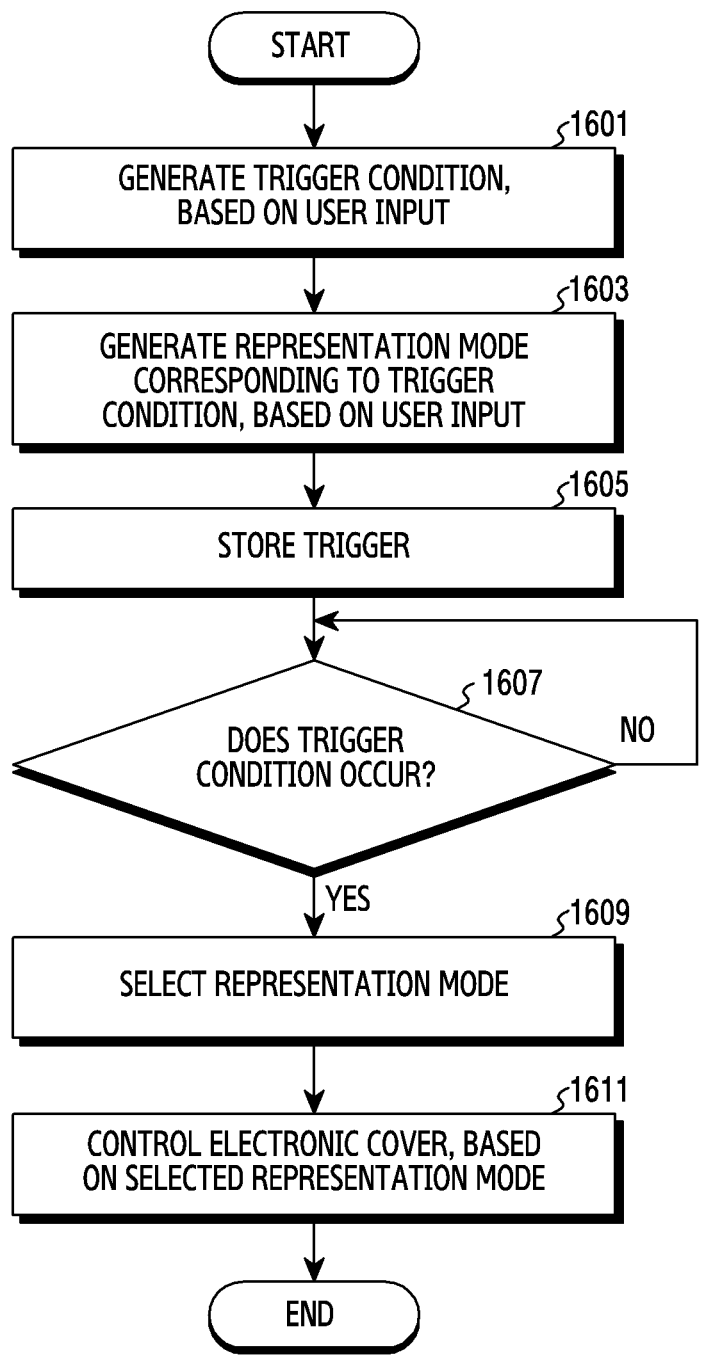
FIG. 16 illustrates an operational flow for a cover in an electronic device including an electronic cover according to an embodiment.

FIG. 16 illustrates an operational flow for a cover in an electronic device including an electronic cover according to an embodiment. FIGS. 17A, 17B, 18, and 19 are drawings for explaining an operational flow of FIG. 16 according to an embodiment. According to an embodiment, the electronic device may include at least part of the electronic device 300 of FIGS. 3A and 3B, the electronic device 500 of FIG. 5, or the electronic device 700 of FIG. 7.

Referring to FIG. 16, in operation 1601, the controller 723 may generate a trigger condition on the basis of a user input. In operation 1603, the controller 723 may generate a representation mode corresponding to the trigger condition on the basis of the use input. In operation 1605, the controller 723 may generate and store a trigger including the trigger condition and the presentation mode. Referring to FIG. 7, in an embodiment, the generated trigger may be stored in a form of the representation selecting instruction 7211, area selecting instruction 7214, and power control instruction 7215 of the storage 721 (e.g., the memory 630 of FIG. 6).

Figure 17A:
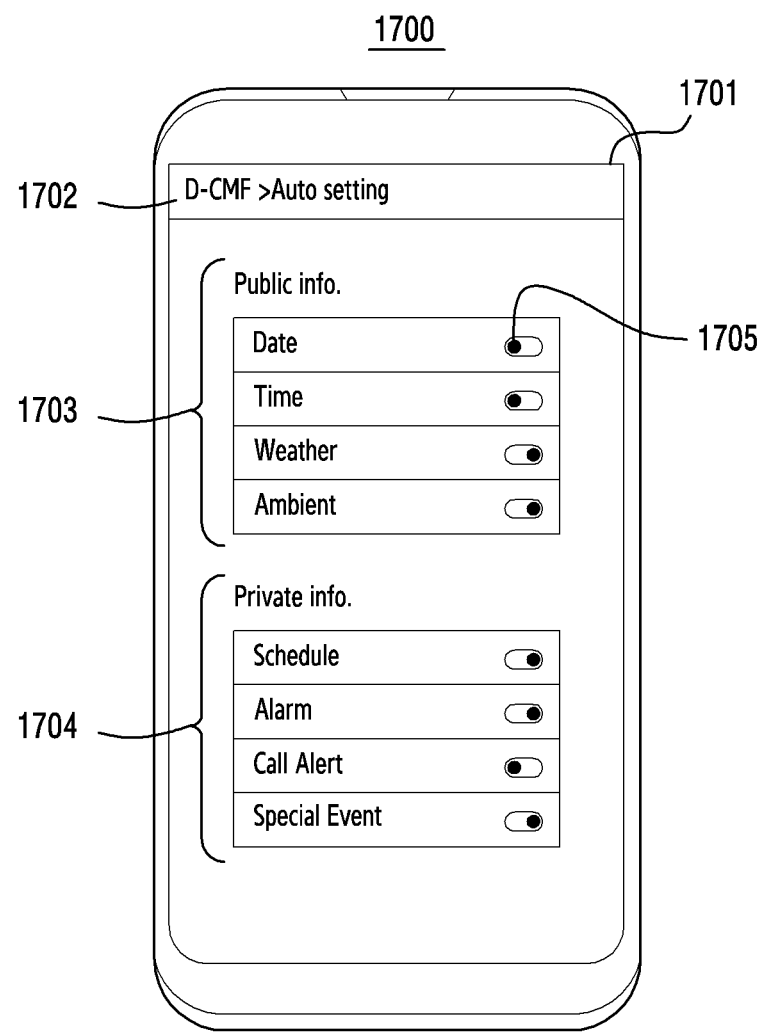
FIG. 17A is a drawing for explaining an operational flow of FIG. 16 according to various embodiments.
Figure 17B:
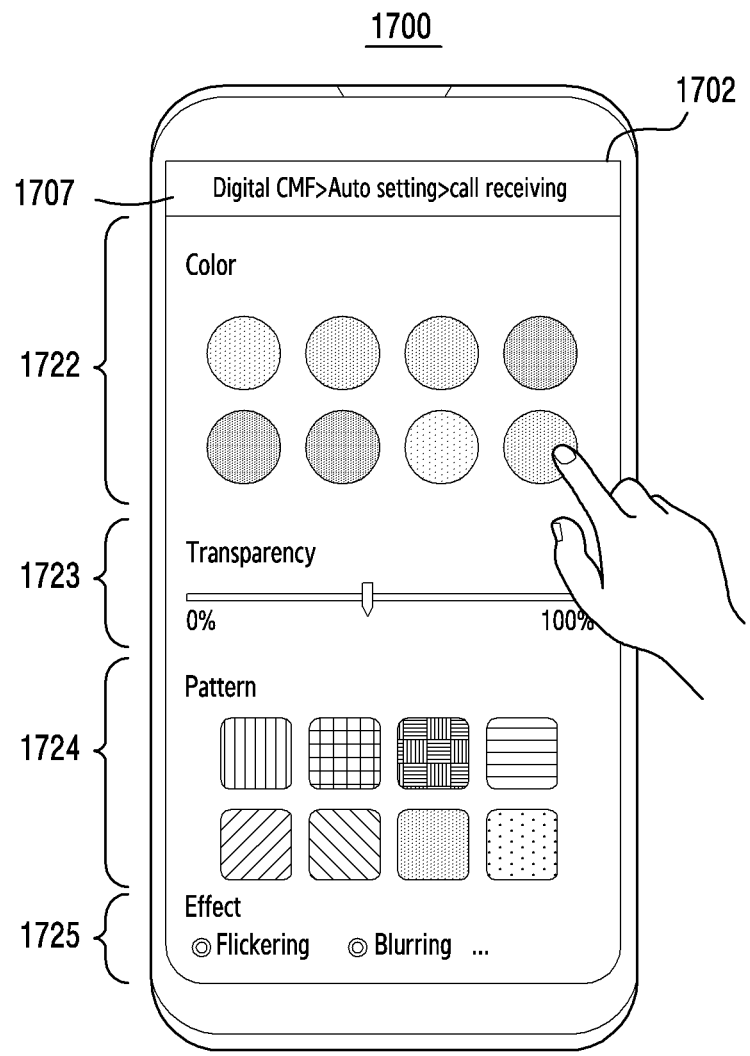
FIG. 17B is a drawing for explaining an operational flow of FIG. 16 according to various embodiments.

FIGS. 17A and 17B are exemplary drawings for explaining operations 1601, 1603, and 1605 of FIG. 16. An electronic device 1700 of FIGS. 17A and 17B may include at least part of the electronic device 300 of FIGS. 3A and 3B, the electronic device 500 of FIG. 5, or the electronic device 700 of FIG. 7. Referring to FIG. 17A, the electronic device 1700 may provide a first screen 1701 for generating a trigger condition on the basis of a user input. According to an embodiment, the first screen 1701 may provide a status bar 1701 which displays a phrase indicating entering a trigger generation mode (or an auto-setting mode) from a cover setting mode. According to an embodiment, the first screen 1701 may provide items 1703 regarding public information such as data, time, weather, ambient, or the like. The first screen 1701 may provide items 1704 regarding private information such as schedule, alarm, call alert, specific event, or the like. According to an embodiment, the first screen 1701 may provide a control 1705 for each of the items 1703 and 1704. For example, the control 1705 may move to the left or right whenever touched. According to an embodiment, when the control 1705 is located to the left, it may imply that a trigger for an item is deactivated (or off). When the control 1705 is located to the right, it may imply that the trigger for the item is activated (or on). In an embodiment, when a trigger for a call alert item is activated, the controller 723 switches to a second screen 1702 in which the user can set a representation mode through an electronic cover at call reception (see FIG. 17B). Referring to FIG. 17B, the second screen 1702 may provide a status bar 1707 which displays a phase indicating entering a trigger generation mode for a call alert from the cover setting mode. According to an embodiment, as shown in the second screen 902 of FIG. 9B, the second screen 1702 may provide an area 1722 for providing a color list, a control area 1723 for adjusting transparency, an area 1724 for providing a pattern list, or an area 1725 for providing an effect list. The controller 723 may select a representation mode defined as a color representation, a transparency representation, a pattern representation, an effect representation, or the like on the basis of a touch input on the second screen 1702. The controller 723 may associate the selected representation mode with a trigger condition defined as call reception, and may store the result by using a trigger.

According to an embodiment, although not shown, the second screen 1702 may be designed to include a control for automatically selecting a corresponding representation mode on the basis of the previously used color representation, pattern representation, effect representation, or the like, or for recommending it to a user. For example, when the control is selected by a touch input, the controller 723 may select a frequently used color representation, transparency representation, pattern representation, effect representation, or the like, on the basis of a history stored in a memory (e.g., 630 of FIG. 6). The controller 723 may generate a representation mode highly preferred by the user on the basis of the selected color representation, transparency representation, pattern representation, effect representation, or the like, and may perform an operation of recommending this to the user or automatically selecting this. According to an embodiment, when the control is selected by the touch input, the controller 723 may recommend or automatically select a corresponding representation mode, by performing dynamic programming based on a Track Before Detect (TBD) algorithm.

The trigger generation may be designed in various manners, without being limited to the trigger generation based on the example of FIGS. 17A and 17B. According to an embodiment, the trigger condition may be configured variously based on a user input.

When the trigger condition occurs, the controller 723 may sense this in operation 1607. In operation 1609, the controller 723 may select a representation mode corresponding to the occurred trigger condition. In operation 1611, the controller 723 may electrically control the electronic cover on the basis of the selected representation mode.

According to an embodiment, the controller 723 may select a cover setting corresponding to a representation mode selected from among the plurality of cover settings. According to an embodiment, the electronic cover may include a plurality of areas. According to an embodiment, the plurality of areas may be arranged in a striped structure. According to an embodiment, the controller 723 may select at least one of the plurality of areas of the electronic cover on the basis of the selected cover setting. In an embodiment, referring to FIGS. 1A and 1B, each area may include the second electrode 1121-N aligned with the color filter 1211-N. The controller 723 may select the second electrode 1121-N corresponding to an area based on the selected cover setting. The controller 723 may control power for the selected at least one area, based on the cover setting. The operation 1611 of controlling power for at least one area of the electronic cover may be defined as an operation of controlling an electrical field for at least one area of the electronic cover. The operation 1611 of controlling power for at least one area of the electronic cover may be defined as an operation of adjusting a light transmittance for at least one area of the electronic cover.

Figure 18:
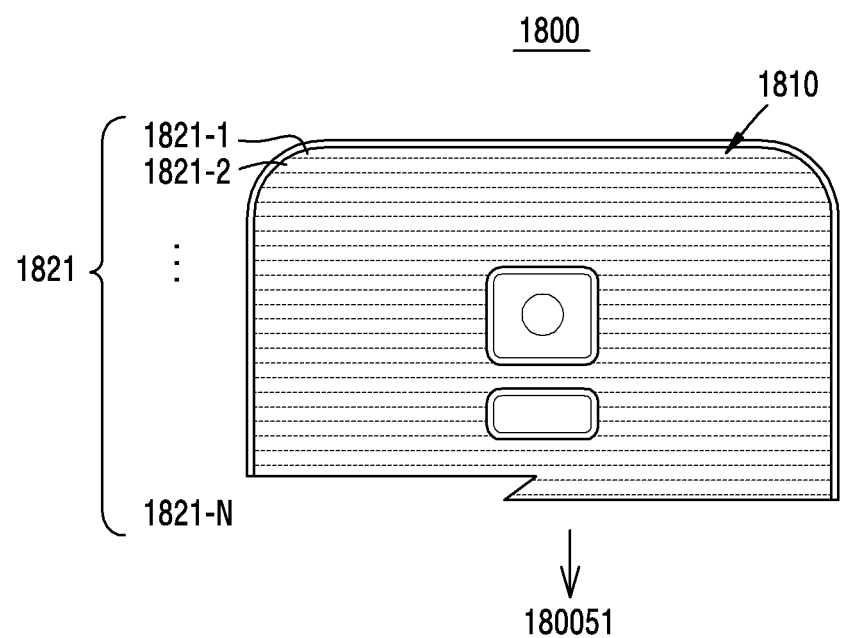
FIG. 18 is a drawing for explaining an operational flow of FIG. 16 according to various embodiments.

According to an embodiment, when weather information including clear weather or sunny weather is obtained, the controller 723 may select a representation mode (a gradation representation mode) of a shape in which a corresponding color is faded in the lengthwise direction 110051*a* or 110051*b* as shown in FIGS. 11C or 11D, and may electrically control the electronic cover on the basis of the selected representation mode. The gradation representation may provide the user with a feeling of sunshine. In an embodiment, referring to FIG. 18, second electrodes (e.g., 1121 of FIGS. 1A and 1B) of a first layer (e.g., 110 of FIGS. 1A and 1B) may be designed in a striped structure arranged in a vertical direction 180051 of an electronic device 1800. Referring to FIG. 18, when the weather information including the clear weather or the sunny weather is obtained, the controller 723 may sequentially cut off power of second electrodes 1821 in the vertical direction 180051 to provide a representation through an electronic cover 1810.

For example, when weather information including cloudy weather or rainy weather is obtained, the controller 712 may select a representation mode of a striped shape in which a first color and a second color are repeated in the widthwise direction 110051*d* or 110051*d* as shown in FIG. 11B, and may electrically control the electronic cover on the basis of the selected representation mode. In FIG. 11B, a representation of the striped shape may provide the user with a feeling of raindrop falling.

According to an embodiment, the controller 723 may select a corresponding representation mode on the basis of an ambient illumination value, and may electrically control the electronic cover on the basis of the selected representation mode. For example, when the ambient illumination value is greater than or equal to a set value, the controller 723 may control the electronic cover 310-2 as shown in FIG. 4B. For example, when the ambient illumination value is less than the set value, the controller 723 may control the electronic cover 310-2 as shown in FIG. 4A.

According to an embodiment, the controller 723 may electrically control the electronic cover on the basis of user information. For example, when a current time reaches a time included in a schedule, the controller 723 may select a corresponding representation mode, and may electrically control the electronic cover on the basis of the selected representation mode. For example, when the current time reaches a time included in an alarm, the controller 723 may select a corresponding representation mode, and may control the electronic cover on the basis of the selected representation mode. For example, when the current time reaches a time included in a reminder, the controller 723 may select a corresponding representation mode, and may control the selected representation mode on the basis of the selected representation mode. For example, when a current date is a user's birthday or anniversary, the controller 723 may select a corresponding representation, and may control the electronic cover on the basis of the selected representation mode.

According to an embodiment, based on information obtained from a sensor module (e.g., a gyro sensor), the controller 723 may sense a first state in which the electronic device is disposed such that the electronic cover faces upward and the screen faces downward. Based on the information obtained from the sensor module, the controller 723 may sense a second state in which the electronic device is disposed such that the electronic cover faces downward and the screen faces upward. The controller 723 may select a representation mode of the electronic cover according to the first state or the second state, and may control the electronic cover on the basis of the selected representation mode.

In an embodiment, when in the second state, the controller 723 may select a representation mode which allows the entire area of the electronic cover to be viewed substantially in a dark color, and may electrically control the electronic cover on the basis of the selected representation mode. For example, when in the second state, the controller 723 may cut off power for the entire area of the electronic cover.

Figure 19:
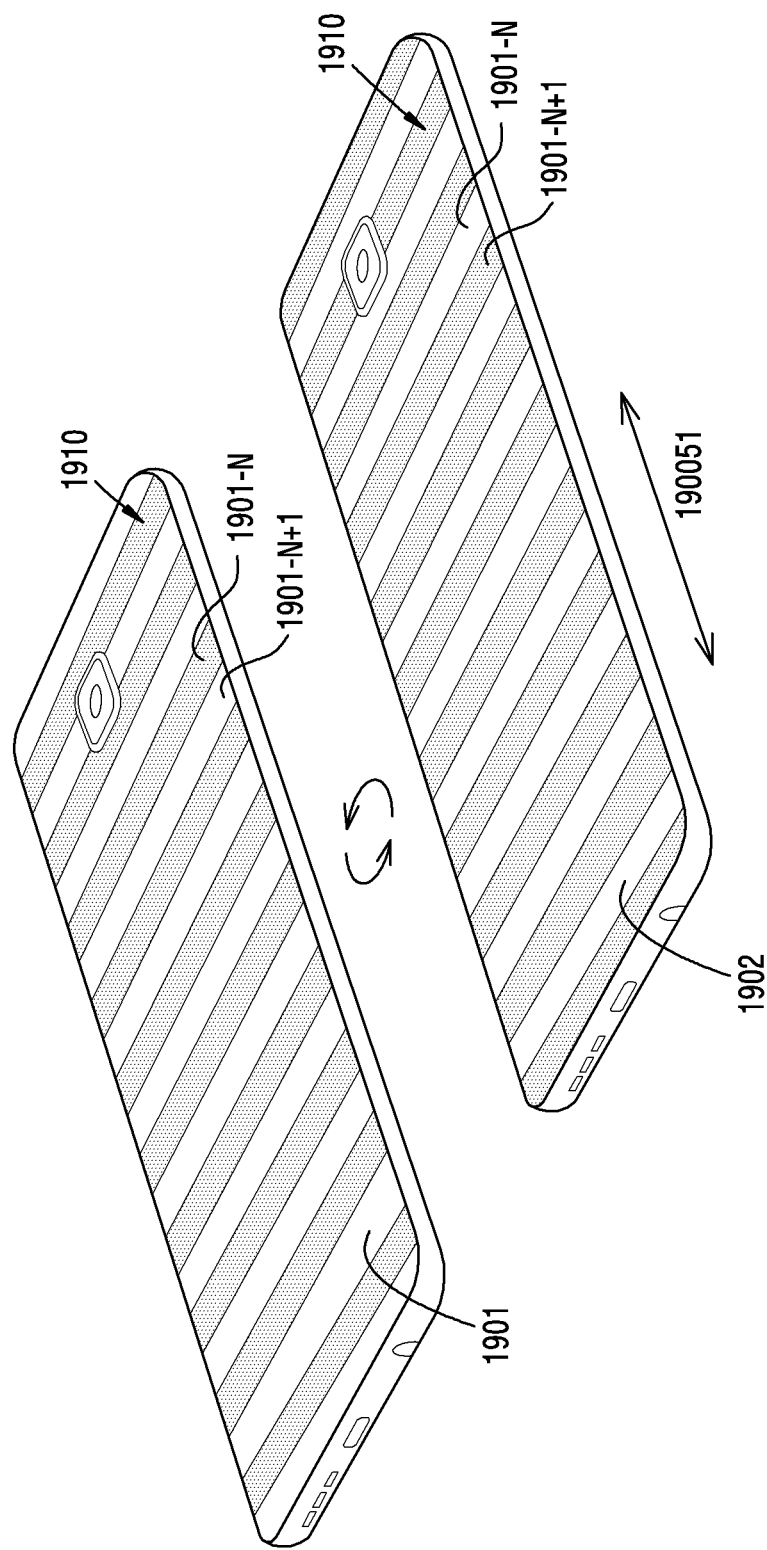
FIG. 19 is a drawing for explaining an operational flow of FIG. 16 according to various embodiments.

In an embodiment, when in the first state, the controller 723 may select various representation modes of the electronic cover on the basis of a user input, an executed application, or a trigger. Referring to FIG. 19, when a call is received in the first state, the controller 723 may alternately select a first representation mode 1901 and a second representation mode 1902, and thus may electrically control the electronic cover 1910. For example, the first representation mode 1901 and the second representation mode 1902 may be representations of different striped shapes in a vertical direction 190051. According to an embodiment, the controller 723 may cut off power to an $N^{th}$ electrode 1901-N (e.g., the second electrode 1121-N of FIG. 1A) of the electronic cover 1910, based on the first representation mode 1901, and may apply power to an $(N+1)^{th}$ electrode. The controller 723 may apply power to the $N^{th}$ electrode 1901-N of the electrode cover 1901, based on the second representation mode 1902, and may cut off power to the $(N+1)^{th}$ electrode 1901-N+1.

In an embodiment, referring to FIG. 19, until a call is received and a user input occurs to access the received call, the controller 723 may perform switching of the first representation 1901 and the second representation 1902 by the number of times (e.g., 5 times) set per second. According to an embodiment, the controller 723 may perform switching of the first representation mode 1901 and the second representation mode 1902, and may repeat an operation of stopping the switching for a specific time (e.g., 1 second).

In an embodiment, referring to FIG. 19, when a message (e.g., a Social Network Service (SNS) message) is received in a first state, the controller 723 may switch the first representation mode 1901 and the second representation mode 1902 during a set time, thereby capable of electrically controlling the electronic cover 1910.

According to an embodiment of the disclosure, a method of operating an electronic device including an electronic cover having a plurality of areas may include selecting a representation mode, based at least in part on a user input, an executed application, or a set trigger, and adjusting a light transmittance for at least one area among the plurality of areas depending on the selected representation mode. According to an embodiment, the plurality of areas may be arranged in a striped structure.

According to an embodiment of the disclosure, the adjusting of the light transmittance for the at least one area may include adjusting strength of an electrical field generated in the at least one area.

The above-described embodiments of the disclosure can be embodied in a general-purpose digital computer that can be embodied as a program that can be executed by a computer and operates the program using a computer-readable recording medium. In addition, the structure of the data used in the above-described embodiments of the disclosure can be recorded on a computer-readable recording medium through various means. The computer-readable recording medium includes a storage medium such as a magnetic storage medium (e.g., ROM, floppy disk, hard disk, etc.), optical reading medium (e.g., CD-ROM, DVD, etc.).

The disclosure has been described above with reference to preferred embodiments thereof. It will be understood by those skilled in the art that various changes in form and details may be made therein without departing from the spirit and scope of the invention as defined by the appended claims. Therefore, the disclosed embodiments should be considered in an illustrative rather than a restrictive sense. The scope of the disclosure is defined by the appended claims rather than by the foregoing description, and all differences within the scope of equivalents thereof should be construed as being included in the disclosure.

What is claimed is:

1. An electronic device comprising:
   a housing including a first face facing a first direction, a second face facing a second direction opposite to the first direction, and a third face at least partially surrounding a space between the first face and the second face;
   a display disposed inside the housing and disposed along the first face and at least part of the third face;
   an electronic cover disposed inside the housing and disposed along at least part of the second face; and
   a power management module electrically coupled with the display and the electronic cover,
   wherein the electronic cover includes:
      a light-transmissive first electrode layer disposed between the first face and the second face;
      a light-transmissive second electrode layer disposed between the first face and the light-transmissive first electrode layer;
      a liquid crystal layer disposed between the light-transmissive first electrode layer and the light-transmissive second electrode layer, and including a liquid crystal reacting to an electrical field generated when the power management module supplies power to the light-transmissive first electrode layer and the light-transmissive second electrode layer;
      a color layer disposed between the first face and the light-transmissive second electrode layer, and including a light-transmissive color material; and
      a reflective layer disposed between the first face and the color layer, and including a light-reflective material.

2. The electronic device of claim 1, wherein the color layer includes a plurality of color filters arranged in a striped structure.

3. The electronic device of claim 2, wherein the plurality of color filters include light-transmissive materials having the same color.

4. The electronic device of claim 2, wherein the color layer includes a structure in which a series of sets including at least two color filters of different colors are repeatedly arranged.

5. The electronic device of claim 2, wherein the light-transmissive second electrode layer is aligned with the plurality of color filters, and includes a plurality of electrodes arranged in the striped structure.

6. The electronic device of claim 5, wherein the light-transmissive first electrode layer includes a common electrode extended to cover the plurality of electrodes.

7. The electronic device of claim 6, further comprising a plurality of switches electrically coupled to the common electrode and the plurality of electrodes and configured to adjust strength of power supplied to the common electrode and the plurality of electrodes.

8. The electronic device of claim 7, wherein the switches are included in the power management module, or are included in the electronic cover.

9. The electronic device of claim 7, wherein the switches include Thin Film Transistors (TFTs).

10. The electronic device of claim 5, wherein the liquid crystal is divided into a plurality of portions aligned with the plurality of electrodes.

11. The electronic device of claim 1, wherein the electronic cover further includes a light-transmissive layer disposed between the light-transmissive second electrode layer and the color layer.

12. The electronic device of claim 1,
   wherein the electronic cover further includes a light-transmissive layer, and
   wherein the light-transmissive first electrode layer is disposed between the light-transmissive layer and the light-transmissive second electrode layer.

13. The electronic device of claim 1, further comprising:
   a processor electrically coupled to the display, the electronic cover, and the power management module,
   wherein the processor controls the power management module to adjust power supplied to at least part of a plurality of electrodes, based at least in part on a user input, an executed application, or a set trigger.

* * * * *